US012342122B2

(12) United States Patent
Chen et al.

(10) Patent No.: US 12,342,122 B2
(45) Date of Patent: Jun. 24, 2025

(54) HEADSET NOISE PROCESSING METHOD, APPARATUS, AND HEADSET

(71) Applicant: Huawei Technologies Co., Ltd., Shenzhen (CN)

(72) Inventors: Weibin Chen, Shenzhen (CN); Yulong Li, Shenzhen (CN); Fan Fan, Shenzhen (CN); Tianxiang Cao, Hangzhou (CN); Zhenxia Gui, Hangzhou (CN); Zhipeng Chen, Shenzhen (CN); Cunshou Qiu, Shanghai (CN); Wei Xiong, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 214 days.

(21) Appl. No.: 18/148,116

(22) Filed: Dec. 29, 2022

(65) Prior Publication Data

US 2023/0134787 A1 May 4, 2023

Related U.S. Application Data

(63) Continuation of application No. PCT/CN2021/103768, filed on Jun. 30, 2021.

(30) Foreign Application Priority Data

Jun. 30, 2020 (CN) ........................ 202010623983.X

(51) Int. Cl.
*H04R 1/10* (2006.01)
*G10K 11/178* (2006.01)

(52) U.S. Cl.
CPC ..... *H04R 1/1083* (2013.01); *G10K 11/17881* (2018.01); *G10K 2210/1081* (2013.01); *H04R 2460/01* (2013.01)

(58) Field of Classification Search
CPC .............. H04R 1/1083; H04R 2460/01; G10K 11/17881; G10K 2210/1081
(Continued)

(56) References Cited

U.S. PATENT DOCUMENTS 10,129,633 B1 11/2018 Patil et al.
10,354,640 B2 7/2019 Termeulen et al.
(Continued)

FOREIGN PATENT DOCUMENTS

CN 106792315 A 5/2017
CN 107517415 A 12/2017
(Continued)

*Primary Examiner* — Vivian C Chin
*Assistant Examiner* — Douglas J Suthers
(74) *Attorney, Agent, or Firm* — Conley Rose, P.C.

(57) ABSTRACT

A headset has at least two functions of an active noise control (ANC) function, an ambient sound hear through (HT) function, or an augment hearing (AH) function. The headset includes a first microphone and a second microphone. The first microphone is configured to collect a first signal. The first signal indicates a sound in a current external environment. The second microphone is configured to collect a second signal. The second signal indicates an ambient sound in an ear canal of a user wearing the headset. The headset can be a left earphone or a right earphone. Processing modes or processing strengths of the left earphone and the right earphone may be the same or different. The headset obtains a target mode based on a scene type of the current external environment; and obtains a second audio signal based on the target mode, the first signal, and the second signal.

20 Claims, 34 Drawing Sheets

(58) Field of Classification Search
USPC .......................................................... 381/71.6
See application file for complete search history.

(56) References Cited

U.S. PATENT DOCUMENTS

| | | | |
|---|---|---|---|
| 2011/0096939 | A1 | 4/2011 | Ichimura |
| 2014/0126733 | A1 | 5/2014 | Gauger, Jr. et al. |
| 2014/0169603 | A1 | 6/2014 | Sacha et al. |
| 2015/0264469 | A1 | 9/2015 | Murata et al. |
| 2017/0194020 | A1* | 7/2017 | Miller ................. G10L 21/0272 |
| 2018/0077482 | A1 | 3/2018 | Yuan et al. |
| 2019/0304432 | A1 | 10/2019 | Yan |
| 2020/0296500 | A1 | 9/2020 | Wang |

FOREIGN PATENT DOCUMENTS

| | | | |
|---|---|---|---|
| CN | 108391206 | A | 8/2018 |
| CN | 108475502 | A | 8/2018 |
| CN | 110430500 | A | 11/2019 |
| CN | 110972007 | A | 4/2020 |
| CN | 112770214 | A | 5/2021 |
| EP | 3188495 | A1 | 7/2017 |
| EP | 3249944 | A1 | 11/2017 |
| JP | 2011097268 | A | 5/2011 |
| JP | 2015173369 | A | 10/2015 |
| JP | 2015537466 | A | 12/2015 |
| WO | 2017101067 | A1 | 6/2017 |

* cited by examiner

HEADSET NOISE PROCESSING METHOD, APPARATUS, AND HEADSET

CROSS-REFERENCE TO RELATED APPLICATIONS

This is a continuation of International Patent Application No. PCT/CN2021/103768 filed on Jun. 30, 2021, which claims priority to Chinese Patent Application No. 202010623983.X filed on Jun. 30, 2020. The disclosures of the aforementioned applications are hereby incorporated by reference in their entireties.

TECHNICAL FIELD

Embodiments of this application relate to the field of audio processing technologies, and in particular, to a headset noise processing method, an apparatus, and a headset.

BACKGROUND

In recent years, there are more headset users, and users have increasingly differentiated requirements for headset functions. For example, if a user does not want to hear external noise when wearing a headset, the user can use an active noise control (ANC) function to block out noise from an ear. Some users want to hear sound outside the headset. A user needs to use an ambient sound hear through (HT) function to hear the sound as if the user does not wear the headset. Some users may have hearing impairments. An augment hearing (AH) function may be used to transmit wanted external signals to users and filter out unwanted signals.

However, currently the headset cannot implement the desired effect based on a user requirement.

SUMMARY

Embodiments of this application provide a headset noise processing method, an apparatus, and a headset, to implement the desired effect based on a user requirement.

According to a first aspect, an embodiment of this application provides a headset noise processing method. A headset has at least two functions of an ANC function, an ambient sound HT function, or an AH function. The headset includes a first microphone and a second microphone. The first microphone is configured to collect a first signal. The first signal indicates a sound in a current external environment. The second microphone is configured to collect a second signal. The second signal indicates an ambient sound in an ear canal of a user wearing the headset. The headset may be a left earphone or a right earphone. The left earphone and the right earphone may use a same processing mode or different processing modes. The headset receives a first audio signal from a terminal device; obtains a target mode, where the target mode is determined based on a scene type of the current external environment, the target mode indicates the headset to perform a target processing function, and the target processing function is one of the ANC function, the ambient sound HT function, or the AH function; and obtains a second audio signal based on the target mode, the first audio signal, the first signal, and the second signal.

According to the foregoing method, the target mode is determined based on the scene type of the external environment such that auditory perception effect can be optimized for the user in real time.

In a possible design, the headset further includes a speaker. The speaker is configured to play the second audio signal.

In a possible design, when the target processing function is the ANC function, the second audio signal played by the speaker can weaken user perception of the sound in the current user environment and the ambient sound in the ear canal of the user; when the target processing function is the HT function, the second audio signal played by the speaker can enhance user perception of the sound in the current user environment; or when the target processing function is the AH function, the second audio signal played by the speaker can enhance user perception of an event sound, where the event sound satisfies a preset spectrum.

It should be understood that, when the left earphone uses an ANC mode, an audio signal played by a speaker of the left earphone can weaken user left ear perception of the sound in the current user environment (namely, the sound in the current external environment) and the ambient sound in a left ear canal of the user. When the right earphone uses an ANC mode, an audio signal played by a speaker of the right earphone can weaken user right ear perception of the sound in the current user environment (namely, the sound in the current external environment) and the ambient sound in a right ear canal of the user. Similarly, for HT and AH modes, left ear perception depends on a processing mode of the left earphone, and right ear perception depends on a processing mode of the right earphone.

In a possible design, when the target processing function is the ANC function, the second audio signal is obtained based on the first audio signal, a third signal, and a fourth signal, where the third signal is an antiphase signal of the first signal, and the fourth signal is an antiphase signal of the second signal; when the target processing function is the HT function, the second audio signal is obtained based on the first audio signal, the first signal, and the second signal; or when the target processing function is the AH function, the second audio signal is obtained based on the first audio signal, a fifth signal, and a fourth signal, where the fifth signal is an event signal in the first signal, the event signal indicates a specific sound in the current external environment, and the event signal satisfies a preset spectrum.

The foregoing design provides a manner of obtaining a signal output by a speaker in different processing modes, which is simple and effective.

In a possible design, the obtaining a target mode includes receiving a first control instruction from the terminal device, where the first control instruction carries the target mode, and the target mode is determined by the terminal device based on the scene type of the current external environment.

In the foregoing design, the target mode is determined by the terminal device based on the scene type of the external environment and indicates the headset such that auditory perception effect can be optimized for the user in real time.

In a possible design, a second control instruction is received from the terminal device, where the second control instruction carries a target processing strength, and the target processing strength indicates a processing strength used when the headset performs the target processing function. Obtaining the second audio signal based on the target mode, the first audio signal, the first signal, and the second signal includes obtaining the second audio signal based on the target mode, the target processing strength, the first audio signal, the first signal, and the second signal.

According to the foregoing design, the terminal device indicates a processing strength of the headset in a corresponding processing mode. The processing strength is adjusted based on the processing mode to further improve auditory perception of the user.

In a possible design, a target event corresponding to an event sound in the current external environment is determined based on the first signal, and a target processing strength in the target mode is determined based on the target event, where the target processing strength indicates a processing strength used when the headset performs the target processing function. Obtaining a second audio signal based on the target mode, the first audio signal, the first signal, and the second signal includes obtaining the second audio signal based on the target mode, the target processing strength, the first audio signal, the first signal, and the second signal. Different processing strengths correspond to different events. The processing strengths one-to-one correspond to the events, or one processing strength corresponds to a plurality of events. For example, a same processing strength may be used for two events, and different processing strengths cannot be used for a same event.

According to the foregoing design, the headset determines the processing strength based on the event sound in the external environment, to implement different auditory perceptions in different external environments. This can reduce background noise, and enhance noise control strength.

In a possible design, the headset further includes a bone conduction sensor. The bone conduction sensor is configured to collect a bone conduction signal generated by vibration of vocal cords of the user. The identifying, based on the first signal, a first scene in which the user is currently located includes identifying, based on the first signal and the bone conduction signal, the first scene in which the user is currently located.

In a possible design, the target event is a howling event, a wind noise event, an emergency event, or a human voice event.

In a possible design, obtaining the target mode includes identifying the scene type of the current external environment as a target scene type (briefly referred to as a target scene or a target type) based on the first signal, and determining the target mode of the headset based on the target scene, where the target mode is a processing mode corresponding to the target scene. Different processing modes correspond to different scene types. The processing modes may one-to-one correspond to the scene types, or one processing mode may correspond to a plurality of scene types. For example, a same processing mode may be used for two scene types.

In the foregoing design, the headset determines the processing mode of the headset based on the identified scene type such that a delay is shortened, and auditory perception is optimized for the user in real time.

In a possible design, the target scene is one of a walking scene, a running scene, a quiet scene, a multi-person speaking scene, a cafe scene, a subway scene, a train scene, a waiting hall scene, a dialog scene, an office scene, an outdoor scene, a driving scene, a strong wind scene, an airplane scene, an alarm sound scene, a horn sound scene, and a crying sound scene.

In a possible design, the method further includes sending indication information to the terminal device, where the indication information carries the target mode; and receiving a third control signal from the terminal device, where the third control signal includes a target processing strength in the target mode, and the target processing strength indicates a processing strength used when the headset performs the target processing function. Obtaining the second audio signal based on the target mode, the first audio signal, the first signal, and the second signal includes obtaining the second audio signal based on the target mode, the target processing strength, the first audio signal, the first signal, and the second signal.

In the foregoing design, the headset determines the processing mode, and indicates the processing mode to the terminal device such that the terminal device adjusts the processing strength. This reduces processing resources occupied by the headset.

In a possible design, when the target processing function is the ANC function, a larger target processing strength indicates weaker user perception of the sound in the current user environment and the ambient sound in the ear canal of the user; when the target processing function is the HT function, a larger target processing strength indicates stronger user perception of the sound in the current user environment; or when the target processing function is the AH function, a larger target processing strength indicates stronger user perception of the event sound included in the sound in the current user environment.

In a possible design, the target mode indicates the headset to perform the ANC function. Obtaining the second audio signal based on the target mode, the first audio signal, the first signal, and the second signal includes performing first filtering processing (for example, feedforward (FF) filtering) on the first signal to obtain a first filtering signal; filtering out the first audio signal included in the second signal to obtain a first filtered signal; performing audio mixing processing on the first filtering signal and the filtered signal to obtain a third audio signal; performing third filtering processing (for example, feedback (FB) filtering) on the third audio signal to obtain a fourth audio signal; and performing audio mixing processing on the fourth audio signal and the first audio signal to obtain the second audio signal.

In the foregoing design, ANC processing is performed in a manner of FF filtering and FB serial processing, to obtain a better-denoised signal, and enhance noise control effect.

In a possible design, a filtering coefficient used for the first filtering processing is a filtering coefficient associated with the target processing strength for the first filtering processing in the case of the ANC function; or a filtering coefficient used for the third filtering processing is a filtering coefficient associated with the target processing strength for the third filtering processing in the case of the ANC function.

In the foregoing design, instead of a fixed filtering coefficient, different filtering coefficients are used in the case of different processing strengths. This implements better ANC effect, and improves auditory perception of the user.

In a possible design, the target mode indicates the headset to perform the HT function. Obtaining the second audio signal based on the target mode, the first audio signal, the first signal, and the second signal includes performing first signal processing on the first signal to obtain a first processed signal, where the first signal processing includes second filtering processing (for example, HT filtering); performing audio mixing processing on the first processed signal and the first audio signal to obtain a fifth audio signal; filtering out the fifth audio signal included in the second signal to obtain a second filtered signal; performing third filtering processing (for example, FB filtering) on the second filtered signal to obtain a third filtered signal; and performing audio mixing processing on the third filtered signal and the fifth audio signal to obtain the second audio signal.

Before the fifth audio signal included in the second signal is filtered out, filtering compensation processing may also be performed on the fifth audio signal, to reduce an auditory perception loss. In the foregoing design, during HT filtering, downlink audio mixing processing and filtering compensation processing are performed, to further reduce an auditory perception loss.

In a possible design, the performing first signal processing on the first environment signal to obtain a processed environment signal includes performing second filtering processing on the first signal to obtain a second filtering signal; and performing second signal processing on the second filtering signal to obtain a second processed signal.

The second signal processing includes unblocking effect processing.

According to the foregoing design, the unblocking effect processing is performed on the signal obtained through the HT filtering such that the user can hear clearer ambient sound.

In a possible design, the second signal processing further includes at least one of background noise control processing, wind noise control processing, gain adjustment processing, or frequency response adjustment processing.

The foregoing second signal processing reduces background noise and abnormal sound, and improves auditory perception of the user.

In a possible design, a filtering coefficient used for the second filtering processing is a filtering coefficient associated with the target processing strength for the second filtering processing in the case of the HT function; or a filtering coefficient used for the third filtering processing is a filtering coefficient associated with the target processing strength for the third filtering processing in the case of the HT function.

In a possible design, the target mode indicates the headset to perform the AH function. The obtaining a second audio signal based on the target mode, the first audio signal, the first signal, and the second signal includes performing second filtering processing (for example, HT filtering) on the first signal to obtain a second filtering signal, and performing enhancement processing on the second filtering signal to obtain a filtering enhancement signal; performing first filtering processing (for example, FF filtering) on the first signal to obtain a first filtering signal; performing audio mixing processing on the filtering enhancement signal and the first audio signal to obtain a sixth audio signal; filtering out the sixth audio signal included in the second signal to obtain a fourth filtered signal; performing third filtering processing (for example, FB filtering) on the fourth filtered signal to obtain a fifth filtered signal; and performing audio mixing processing on the fifth filtered signal, the sixth audio signal, and the first filtering signal to obtain the second audio signal.

In the foregoing design, active noise control and ambient sound hear through are implemented in parallel. Hear through filtering processing and enhancement processing make the hear through signal clearer.

Optionally, before the filtering out the sixth audio signal included in the second signal to obtain a fourth filtered signal, filtering compensation processing is performed on the sixth audio signal such that a loss caused by FB filtering can be avoided, and it is ensured to a maximum extent that the hear through signal is not distorted.

In a possible design, performing the enhancement processing on the second filtering signal to obtain a filtering enhancement signal includes performing unblocking effect processing on the second filtering signal, and performing noise control processing on a signal obtained through the unblocking effect processing, where the noise control processing includes artificial intelligence (AI) noise control processing and/or wind noise control processing; and performing gain amplification processing and frequency response adjustment on a signal obtained through the noise control processing, to obtain the filtering enhancement signal.

In the foregoing design, enhancement processing is performed on the hear through signal. This improves user perception of external needed sound.

In a possible design, the headset includes a bone conduction sensor. The bone conduction sensor is configured to collect a bone conduction signal of the headset user. The performing gain amplification processing on a signal obtained through the noise control processing includes performing harmonic extension on the bone conduction signal to obtain a harmonic extension signal; performing, based on a first gain coefficient, amplification processing on the signal obtained through the noise control processing; and filtering out, based on a fourth filtering coefficient, the harmonic extension signal included in a signal obtained through the amplification processing. The fourth filtering coefficient is determined based on the first gain coefficient.

In the foregoing design, an amplification manner of amplifying only a specific sound other than a voice of the wearer is provided to improve effect of the specific sound in the hear through ambient sound.

In a possible design, the first gain coefficient is a gain coefficient associated with the target processing strength in the target mode.

In a possible design, performing the enhancement processing on the second filtering signal to obtain a filtering enhancement signal includes performing unblocking effect processing on the second filtering signal to obtain an unblocked signal; performing audio event detection on the unblocked signal to obtain an audio event signal in the unblocked signal; and performing gain amplification processing and frequency response adjustment on the audio event signal in the unblocked signal to obtain the filtering enhancement signal.

In a possible design, the headset further includes a bone conduction sensor. The bone conduction sensor is configured to collect a bone conduction signal of the headset user. The performing gain amplification processing on the audio event signal in the unblocked signal includes performing harmonic extension on the bone conduction signal to obtain a harmonic extension signal; performing, based on a second gain coefficient, amplification on the audio event signal in the unblocked signal to obtain an amplified signal; and filtering out, based on a second filtering coefficient, the harmonic extension signal included in the amplified signal. The second filtering coefficient is determined based on the second gain coefficient.

In a possible design, the second gain coefficient is a gain coefficient associated with the target processing strength for the first filtering processing when the first noise processing is performed; or the second gain coefficient is a gain coefficient associated with a first scene identifier for the first filtering processing when the first noise processing is performed.

In a possible design, a filtering coefficient used for the first filtering processing is a filtering coefficient associated with the target processing strength for the first filtering processing in the case of the AH function; a filtering coefficient used for the second filtering processing is a filtering coefficient associated with the target processing strength for the second filtering processing in the case of the AH function; or a filtering coefficient used for the third filtering processing is a filtering coefficient associated with the target processing strength for the third filtering processing in the case of the AH function.

In a possible design, the headset further includes a bone conduction sensor. The bone conduction sensor is configured to collect a bone conduction signal of the headset user. The performing unblocking effect processing on the second filtering signal includes determining, from a speech harmonic set, a first speech harmonic signal matching the bone conduction signal, where the speech harmonic set includes a plurality of speech harmonic signals; and removing the first speech harmonic signal from the second filtering signal, and amplifying a high frequency component in the second filtering signal from which the first speech harmonic signal is removed; or performing adaptive filtering processing on the second filtering signal to remove a low frequency component in the second filtering signal to obtain a third filtering signal, and amplifying a high frequency component in the third filtering signal from which the low frequency component is removed.

According to a second aspect, an embodiment of this application provides a mode control method. The method is applied to a terminal device. The method includes: when a scene type of a current external environment is identified as a target scene, determining a target mode based on the target scene, where the target mode is one of processing modes supported by a headset, and the processing modes supported by the headset include at least two of an ANC mode, an ambient sound HT mode, or an AH mode; and sending the target mode to the headset, where the target mode indicates the headset to implement a processing function corresponding to the target mode. Different processing modes correspond to different scene types. The processing modes may one-to-one correspond to the scene types, or one processing mode may correspond to a plurality of scene types. For example, a same processing mode may be used for two scene types.

In the foregoing design, the terminal device controls a processing mode of the headset in real time based on scene identification such that auditory perception is optimized for a user in real time.

In a possible design, when the target mode corresponding to the target scene in the processing mode of the headset is determined, the method further includes displaying result prompt information, where the result prompt information is used to prompt the user that the headset implements the processing function corresponding to the target mode. In the foregoing design, the user can determine the current processing mode of the headset in real time.

In a possible design, before a first control signal is sent to the headset, the method further includes: displaying selection prompt information, where the selection prompt information is used to prompt the user whether to adjust the processing mode of the headset to the target mode; and detecting an operation that the user selects to adjust the processing mode of the headset to the target mode.

In the foregoing design, the user may determine, based on a requirement, whether to adjust the processing mode of the headset. This improves user experience.

In a possible design, a first control and a second control are displayed. Different positions of the second control on the first control indicate different processing strengths in the target mode. Before the first control signal is sent to the headset, the method further includes responding to a user operation of touching and holding the second control to move to a first position on the first control, where the first position of the second control on the first control indicates a target processing strength in the target mode; and sending the target processing strength to the headset, where the target processing strength indicates a processing strength used when the headset implements the processing function corresponding to the target mode. In the foregoing design, the user may select the processing strength of the headset based on a requirement, to meet different requirements of the user.

In a possible design, the first control is in a ring shape. When the user touches and holds the second control to move on the first control in a clockwise direction, the processing strength in the target mode increases; or when the user touches and holds the second control to move on the first control in an anticlockwise direction, the processing strength in the target mode increases.

In a possible design, the first control is in a bar shape. When the user touches and holds the second control to move from top to bottom on the first control, the processing strength in the target mode increases; when the user touches and holds the second control to move from bottom to top on the first control, the processing strength in the target mode increases; when the user touches and holds the second control to move from left to right on the first control, the processing strength in the target mode increases; or when the user touches and holds the second control to move from right to left on the first control, the processing strength in the target mode increases.

In a possible design, when a target processing function is an ANC function, a larger target processing strength indicates weaker user perception of a sound in a current user environment and an ambient sound in an ear canal of the user; when a target processing function is an HT function, a larger target processing strength indicates stronger user perception of a sound in a current user environment; or when a target processing function is an AH function, a larger target processing strength indicates stronger user perception of an event sound included in a sound in a current user environment.

It should be noted that a left earphone and a right earphone may use a same processing mode and a same processing strength, and therefore user left ear perception and user right ear perception may be the same. The left earphone and the right earphone may alternatively use different processing modes or different processing strengths, and therefore user left ear perception and user right ear perception are different.

According to a third aspect, an embodiment of this application provides a mode control method. The method is applied to a terminal device. The method includes obtaining a target mode, where the target mode is one of processing modes supported by a headset, and the processing modes supported by the headset include at least two of an ANC mode, an ambient sound HT mode, or an AH mode; determining a target processing strength in the target mode based on a scene type of a current external environment, where different scene types correspond to different processing strengths in the target mode; and sending the target processing strength to the headset, where the target processing strength indicates a processing strength used when the headset implements a processing function corresponding to the target mode.

In a possible design, the obtaining a target mode includes receiving the target mode sent by the headset; or displaying a selection control, where the selection control includes processing modes supported by the headset, and detecting a user operation of selecting the target mode from the processing modes of the headset by using the selection control. The selection control includes the processing modes supported by the headset. It means that the selection control provides options of the processing modes supported by the headset, or the selection control displays the processing modes supported by the headset, and the user may select from the processing modes supported by the headset.

In a possible design, before determining the target processing strength in the target mode based on a scene type of a current external environment, the method further includes: if the target mode sent by the headset is received, displaying selection prompt information, where the selection prompt information is used to prompt the user whether to adjust the processing mode of the headset to the target mode; and detecting an operation that the user selects to adjust the processing mode of the headset to the target mode.

In a possible design, when a target processing function is an ANC function, a larger target processing strength indicates weaker user perception of a sound in the current user environment and an ambient sound in an ear canal of the user; when a target processing function is an HT function, a larger target processing strength indicates stronger user perception of a sound in the current user environment; or when a target processing function is an AH function, a larger target processing strength indicates stronger user perception of an event sound included in a sound in the current user environment.

According to a fourth aspect, an embodiment of this application provides a mode control method. The method is applied to a terminal device. The method includes displaying a first interface, where the first interface includes a first selection control, the first selection control includes processing modes supported by a first target earphone and processing strengths corresponding to the processing modes supported by the first target earphone, and the processing modes of the first target earphone include at least two of an ANC mode, an ambient sound HT mode, or an AH mode; responding to a first operation performed by a user on the first interface, where the first operation is generated when the user selects, by using the first selection control, a first target mode from the processing modes supported by the first target earphone and selects a processing strength in the first target mode as a first target processing strength; and sending the first target mode and the first target processing strength to the first target earphone, where the first target mode indicates the first target earphone to implement a processing function corresponding to the first target mode, and the first target processing strength indicates a processing strength used when the first target earphone implements the processing function corresponding to the first target mode.

The first selection control includes the processing modes supported by the first target earphone and the processing strengths corresponding to the processing modes supported by the first target earphone. It means that the first selection control provides the user with options of a plurality of processing modes (all supported by the first target earphone) and an adjustment item of the processing strength in each processing mode.

In the foregoing design, the user may freely switch, by using a user interface (UI), the processing mode and the strength corresponding to headset effect that the user wants, to meet different requirements of the user.

In a possible design, before displaying the first interface, the method further includes displaying selection prompt information, where the selection prompt information is used to prompt the user whether to adjust the processing mode of the first target earphone; and detecting an operation that the user selects to adjust the processing mode of the first target earphone.

In the foregoing design, the user may determine, based on a requirement, whether to adjust the current processing mode.

In a possible design, before displaying the first interface, the method further includes identifying a scene type of a current external environment as a target scene, where the target scene adapts to a scene type in which the processing mode of the first target earphone needs to be adjusted.

In the foregoing design, the first interface is actively popped up in a specific scene. This reduces a manual operation process of the user.

In a possible design, before displaying the first interface, the method further includes identifying that the terminal device triggers the first target earphone to play audio. The identifying that the terminal device triggers the first target earphone to play audio may be explained as identifying that the terminal device starts to send an audio signal to the first target earphone.

In the foregoing design, the first interface is actively popped up. This reduces a manual operation process of the user.

In a possible design, before displaying the first interface, the method further includes detecting that the terminal device establishes a connection to the first target earphone.

In the foregoing design, the first interface is actively popped up. This reduces a manual operation process of the user.

In a possible design, before displaying the first interface, the method further includes: if it is detected that the terminal device establishes a connection to the first target earphone, detecting a second operation performed by the user on a home screen. The home screen includes an icon of a first application. The second operation is generated when the user touches the icon of the first application. The first interface is a display interface of the first application.

In a possible design, the first selection control includes a first control and a second control. Any two different positions of the second control on the first control indicate two different processing modes of the first target earphone, or any two different positions of the second control on the first control indicate different processing strengths in a same processing mode of the first target earphone. The first operation is generated when the user moves a first position of the second control on the first control in a region corresponding to the first target mode. The first position corresponds to the first target processing strength in the first target mode.

In a possible design, the first control is in a ring shape or a bar shape.

For example, the first control is in a ring shape. The ring includes at least two arc segments. The second control located in different arc segments indicates different processing modes of the first target earphone. Different positions of the second control on a same arc segment indicate different processing strengths in a same processing mode of the first target earphone.

For another example, the first control is in a bar shape. The bar includes at least two bar segments. The second control located in different bar segments indicates different processing modes of the first target earphone. Different positions of the second control on a same bar segment indicate different processing strengths in a same processing mode of the first target earphone.

In a possible design, the method further includes responding to a third operation performed by the user on the first interface, where the first interface further includes a second selection control, the second selection control includes processing modes supported by a second target earphone and processing strengths corresponding to the processing modes supported by the second target earphone, the processing modes supported by the second target earphone include at least two of an ANC mode, an ambient sound HT mode, or an AH mode, the third operation is generated when the user selects, by using the second selection control, a second target mode from the processing modes of the second target earphone and selects a processing strength in the second target mode as a second target processing strength, and when the first target earphone is a left earphone, the second target earphone is a right earphone, or when the first target earphone is a right earphone, the second target earphone is a left earphone; and sending the second target mode and the second target processing strength to the second target earphone, where the second target mode indicates the second target earphone to implement a processing function corresponding to the second target mode, and the second target processing strength indicates a processing strength used when the second target earphone implements the processing function corresponding to the second target mode.

In the foregoing design, the user may separately operate a processing mode and a processing strength of the left earphone and the right earphone, to meet different requirements of the user for auditory perception of the left ear and the right ear.

According to a fifth aspect, an embodiment of this application further provides a noise processing apparatus. The apparatus is applied to a headset. The headset has at least two functions of an ANC function, an ambient sound HT function, or an AH function. The headset includes a first microphone and a second microphone. The first microphone is configured to collect a first signal. The first signal indicates a sound in a current external environment. The second microphone is configured to collect a second signal. The second signal indicates an ambient sound in an ear canal of a user wearing the headset.

The noise processing apparatus includes corresponding functional modules, respectively configured to implement the steps in the foregoing method in the first aspect. For details, refer to detailed descriptions in the method example. Details are not described herein again. The function may be implemented by hardware, or may be implemented by executing corresponding software by hardware. The hardware or software includes one or more modules corresponding to the foregoing functions. For example, the noise processing apparatus includes a communication module configured to receive a first audio signal from a terminal device; an obtaining module configured to obtain a target mode, where the target mode is determined based on a scene type of the current external environment, the target mode indicates the headset to perform a target processing function, and the target processing function is one of the active noise control ANC function, the ambient sound HT function, or the AH function; and a first processing module configured to obtain a second audio signal based on the target mode, the first audio signal, the first signal, and the second signal.

According to a sixth aspect, an embodiment of this application provides a target headset including a left earphone and a right earphone. The left earphone is configured to implement the method according to any one of the first aspect or the designs of the first aspect, or the right earphone is configured to implement the method according to any one of the first aspect or the designs of the first aspect.

In a possible design, the left earphone and the right earphone use different processing modes.

According to a seventh aspect, an embodiment of this application provides a target headset. The target headset includes a left earphone and a right earphone. The left earphone or the right earphone includes a first microphone, a second microphone, a processor, a memory, and a speaker. The first microphone is configured to collect a first signal. The first signal indicates a sound in a current external environment. The second microphone is configured to collect a second signal. The second signal indicates an ambient sound in an ear canal of a user wearing the headset. The memory is configured to store a program or instructions. The processor is configured to invoke the program or the instructions, to enable an electronic device to perform the method according to any design of the first aspect to obtain a second audio signal. The speaker is configured to play the second audio signal.

According to an eighth aspect, an embodiment of this application provides a mode control apparatus. The apparatus is applied to a terminal device. The apparatus includes corresponding functional modules, respectively configured to implement the steps in the foregoing methods in the second aspect to the fourth aspect. For details, refer to detailed descriptions in the method example. Details are not described herein again. The function may be implemented by hardware, or may be implemented by executing corresponding software by hardware. The hardware or software includes one or more modules corresponding to the foregoing functions.

According to a ninth aspect, an embodiment of this application provides a terminal device including a memory, a processor, and a display. The display is configured to display an interface. The memory is configured to store a program or instructions. The processor is configured to invoke the program or the instructions, to enable the terminal device to perform the steps in the methods in the second aspect to the fourth aspect.

According to a tenth aspect, this application provides a computer-readable storage medium. The computer-readable storage medium stores a computer program or instructions. When the computer program or the instructions are executed by a headset, the headset is enabled to perform the method in any one of the first aspect or the possible designs of the first aspect.

According to an eleventh aspect, this application provides a computer-readable storage medium. The computer-readable storage medium stores a computer program or instructions. When the computer program or the instructions are executed by a terminal device, a headset is enabled to perform the method in any one possible design of the second aspect to the fourth aspect.

According to a twelfth aspect, this application provides a computer program product. The computer program product includes a computer program or instructions. When the computer program or the instructions are executed by a headset, the method in any one of the first aspect or the possible implementations of the first aspect is implemented.

According to a thirteenth aspect, this application provides a computer program product. The computer program product includes a computer program or instructions. When the computer program or the instructions are executed by a headset, the method in any possible implementation of the second aspect to the fourth aspect is implemented.

For technical effects that can be achieved in any one of the fifth aspect to the thirteenth aspect, refer to descriptions of beneficial effects in the first aspect to the fourth aspect. Details are not described herein again.

DESCRIPTION OF EMBODIMENTS

Figure 1:
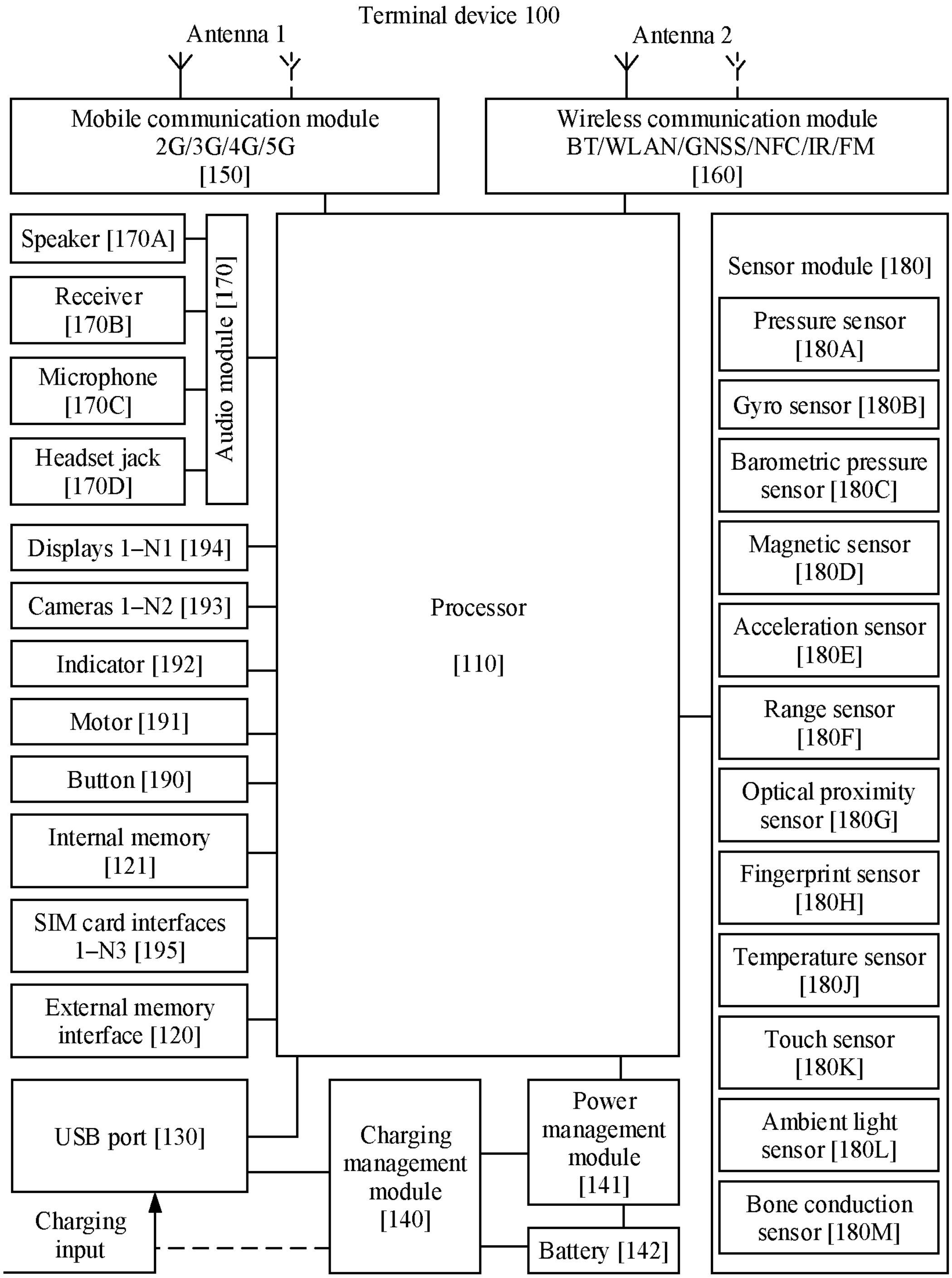
FIG. 1 is a schematic diagram of a hardware structure of a terminal device 100 according to an embodiment of this application.

The following describes in detail embodiments of this application with reference to accompanying drawings. Terms used in embodiments of this application are only used for explaining specific embodiments of this application, but are not intended to limit this application. It is clear that the described embodiments are merely some rather than all of embodiments of this application. All other embodiments obtained by a person of ordinary skill in the art based on embodiments of this application without creative efforts shall fall within the protection scope of this application.

The following first explains and describes some terms in embodiments of this application, to facilitate understanding by a person skilled in the art.

(1) An application (app) in embodiments of this application is a software program that can implement one or more specific functions. Generally, a plurality of applications may be installed on a terminal device, for example, a camera application, a mailbox application, and a headset control application. The application mentioned in the following descriptions may be a system application installed on the terminal device before delivery, or may be a third-party application downloaded from the Internet or obtained from another terminal device by a user when using the terminal device.

(2) Bark subband

The human auditory system has masking effect. In other words, a strong sound hinders alignment of human perception of weak sounds that occur at the same time in a nearby area, and a basal membrane of a cochlear has a frequency selection and tuning function for an external incoming sound signal. Therefore, a concept of a critical frequency band is introduced to measure a sound frequency from a perception perspective. It is generally considered that there are 24 critical frequency bands in a hearing threshold of 22 hertz (Hz) to 22 kilohertz (kHz), causing vibrations in different positions of the basal membrane. Each critical frequency band is referred to as a bark subband.

(3) Voice activity detection (VAD): VAD is used to accurately locate start and end points of a voice with noise. Because the voice includes long silence, the silence is separated from the actual voice. This is original processing of voice data.

(4) In embodiments of this application, "at least one (item)" means one (item) or more (items), and "a plurality of (items)" means two (items) or more (items). The term "and/or" describes an association relationship for describing associated objects and represents that three relationships may exist. For example, A and/or B may represent the following three cases: Only A exists, both A and B exist, and only B exists. A and B each may be singular or plural. The character "/" generally represents an "or" relationship between associated objects. "At least one of the following items (pieces)" or a similar expression thereof indicates any combination of these items, including any combination of a single item (piece) or a plurality of items (pieces). For example, at least one item (piece) of a, b, or c may represent a, b, c, a-b, a-c, b-c, or a-b-c, where a, b, and c may be singular or plural. In this application, a symbol "(a, b)" represents an open interval with a range greater than a and less than b, "[a, b]" represents a closed interval with a range greater than or equal to a and less than or equal to b, "(a, b]" represents a half-open and half-closed interval with a range greater than a and less than or equal to b, and "(a, b]" represents a half-open and half-closed interval with a range greater than a and less than or equal to b. In addition, unless otherwise stated, in embodiments of this application, ordinal numbers such as "first" and "second" are intended to distinguish between a plurality of objects, but are not intended to limit sizes, content, orders, time sequences, priorities, importance, or the like of the plurality of objects. For example, a first microphone and a second microphone are merely used for distinguishing between different microphones, but do not indicate different sizes, priorities, importance degrees, or the like of the two microphones.

An embodiment of this application provides a system. The system includes a terminal device 100 and a headset 200. The terminal device 100 is connected to the headset 200. The connection may be a wireless connection or a wired connection. For a wireless connection, for example, the terminal device may be connected to the headset by using a Bluetooth (BT) technology, a Wi-Fi technology, an infrared (IR) technology, or an ultra-wideband technology.

In this embodiment of this application, the terminal device 100 is a device having a display interface function. The terminal device 100 may be, for example, a product having a display interface, such as a mobile phone, a display, a tablet computer, or a vehicle-mounted device, and a wearable product with intelligent display, such as a smart watch or a smart band. A specific form of the mobile terminal is not particularly limited in this embodiment of this application.

The headset 200 includes two sound production units mounted on ears. A device adapted to a left ear may be referred to as a left earphone, and a device adapted to a right ear may be referred to as a right earphone. From a wearing perspective, the headset 200 in this embodiment of this application may be a head mounted headset, an ear-mounted headset, a neck-mounted headset, an earplug headset, or the like. The earplug headset further includes an in-ear headset (or referred to as an ear canal headset) or a half-in-ear headset. The headset 200 has at least two of an ANC function, an HT function, and an AH function. For ease of description, in this embodiment of this application, ANC, HT, and AH are collectively referred to as AHA, and may certainly have other names. This is not limited in this application.

An in-ear headset is used as an example. The left earphone and the right earphone have similar structures. Both the left earphone and the right earphone may use a headset structure described below. The headset structure (the left earphone or the right earphone) includes a rubber sleeve that can be inserted into an ear canal, an earbag close to an ear, and a headset pole suspended on the earbag. The rubber sleeve directs a sound to the ear canal. The earbag includes components such as a battery, a speaker, and a sensor. A microphone and a physical button may be disposed on the headset pole. The headset pole may be a cylinder, a cuboid, an ellipse, or the like. A microphone disposed in the ear may be referred to as an error microphone. A microphone disposed outside the headset is referred to as a reference microphone. The error microphone is configured to collect a sound in an external environment. The reference microphone collects an ambient sound in the ear canal of the user wearing the headset when the user wears the headset. The two microphones may be analog microphones or digital microphones. After the user wears the headset, the two microphones and the speaker are disposed in the following positions. The error microphone is disposed in the ear and close to the rubber sleeve of the headset. The speaker is located between the error microphone and the reference microphone. The reference microphone is close to the external structure of the ear and may be disposed on the top of the headset pole. A pipeline of the error microphone may face the speaker, or may face the inside of the ear canal. A headset hole is provided near the reference microphone, and is configured to allow the sound in the external environment to enter the reference microphone.

In this embodiment of this application, the terminal device 100 is configured to send a downlink audio signal and/or a control signal to the headset 200. For example, the control signal is used to control a processing mode of the headset 200. The processing mode of the headset 200 may include at least two of a null mode indicating that no processing is performed, an ANC mode indicating that the ANC function is implemented, an HT mode indicating that the HT function is implemented, or an AH mode indicating that the AH function is implemented.

When the headset uses the ANC mode, user perception of the sound in the current external environment and the ambient sound in the ear canal of the user wearing the headset can be weakened. When the headset uses the HT mode, user perception of the sound in the current external environment can be enhanced. When the headset uses the AH mode, user perception of an event sound included in the sound in the current external environment can be enhanced. The event sound is a preset sound in the external environment, or the event sound satisfies a preset spectrum. For example, if the event sound includes a station reporting sound or a horn sound in a railway station, the event sound satisfies a spectrum of the station reporting sound or a spectrum of the horn sound in the railway station. For another example, the event sound may include a notification sound in an airplane terminal building, a broadcast sound on an airplane, and for another example, a call sound in a hotel.

It should be understood that the headset 200 includes the left earphone and the right earphone. The left earphone and the right earphone may use a same processing mode or different processing modes. When the left earphone and the right earphone use the same processing mode, user auditory perceptions of the left ear wearing the left earphone and the right ear wearing the right earphone may be the same When the left earphone and the right earphone use the different processing modes, user auditory perceptions of the left ear wearing the left earphone and the right ear wearing the right earphone are different. For example, the left earphone uses ANC, and the right earphone uses AH. When the left earphone uses the ANC mode, user left ear perception of the sound in the current external environment and the ambient sound in the ear canal of the left ear of the user wearing the headset can be weakened. When the right earphone uses the AH mode, user right ear perception of the event sound included in the sound in the current external environment can be enhanced.

The processing mode of the headset may be determined in any one of the following possible manners.

In a first possible manner, the terminal device 100 provides a control interface such that the user selects the processing mode of the headset 200 based on a requirement. For example, the terminal device 100 is instructed by a user operation to send a control signal to the headset 200. The control signal indicates the processing mode of the headset 200.

It should be noted that the left earphone and the right earphone in the headset 200 may use a same processing mode or different processing modes. For example, a selection control in the control interface is used to select a same processing mode for the left earphone and the right earphone. For another example, the control interface may include two selection controls, where one selection control is used to select a processing mode for the left earphone, and the other selection control is used to select a processing mode for the right earphone. The control interface and the selection control are described in detail in the following descriptions. Details are not described herein again.

In a second possible manner, the terminal device identifies a scene type of the current external environment of the user. In different scenes, the headset 200 uses different processing modes. In other words, processing functions implemented by the headset are different.

In a third possible manner, the headset 200 identifies a user operation, and determines that the headset 200 selected by the user uses the ANC mode, the HT mode, or the AH mode. For example, the user operation may be a user operation of tapping the headset. Alternatively, a button is disposed on the headset, and different buttons indicate different processing modes.

In a fourth possible manner, the headset identifies a scene type of the external environment of the headset, and the headset uses different processing modes in different scenes.

The first possible manner to the fourth possible manner are described in detail subsequently. Details are not described herein again.

FIG. 1 is a schematic diagram of an optional hardware structure of a terminal device 100.

The terminal device 100 may include a processor 110, an external memory interface 120, an internal memory 121, a Universal Serial Bus (USB) port 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this application does not constitute a specific limitation on the terminal device 100. In some other embodiments of this application, the terminal device 100 may include more or fewer parts than those shown in the figure, or combine some parts, or split some parts, or have different component arrangements. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, and/or a neural-network processing unit (NPU). Different processing units may be independent components, or may be integrated into one or more processors.

The controller may generate an operation control signal based on an instruction operation code and a time sequence signal, to complete control of instruction reading and instruction execution.

A memory may be further disposed in the processor 110, and is configured to store instructions and data. In some embodiments, the memory in the processor 110 is a cache memory. The memory may store instructions or data that has been used or is cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a SIM interface, a USB interface, and/or the like.

The I2C interface is a two-way synchronous serial bus, including a serial data line (SDA) and a serial clock line (SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through an I2C interface, so that the processor 110 communicates with the touch sensor 180K through the I2C bus interface to implement a touch function of the terminal device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call through the headset 200 (for example, a BT headset).

The PCM interface may also be configured to perform audio communication, and sample, quantize, and code an analog signal. In some embodiments, the audio module 170 may be coupled to the wireless communication module 160 through a PCM bus interface. In some embodiments, the audio module 170 may also transmit an audio signal to the wireless communication module 160 through the PCM interface, to implement a function of answering a call through the BT headset 200. Both the I2S interface and the PCM interface may be used for audio communication.

The UART interface is a universal serial data bus, and is configured to perform asynchronous communication. The bus may be a two-way communication bus. The bus converts to-be-transmitted data between serial communication and parallel communication. In some embodiments, the UART interface is usually configured to connect the processor 110 to the wireless communication module 160. For example, the processor 110 communicates with a BT module in the wireless communication module 160 through the UART interface, to implement a BT function. In some embodiments, the audio module 170 may transmit an audio signal to the wireless communication module 160 through the UART interface, to implement a function of playing music through the BT headset 200.

The MIPI interface may be configured to connect the processor 110 to a peripheral component such as the display 194 or the camera 193. The MIPI interface includes a camera serial interface (CSI), a display serial interface (DSI), and the like. In some embodiments, the processor 110 communicates with the camera 193 through the CSI interface, to implement an image shooting function of the terminal device 100. The processor 110 communicates with the display 194 through the DSI interface, to implement a display function of the terminal device 100.

The GPIO interface may be configured by software. The GPIO interface may be configured as a control signal or a data signal. In some embodiments, the GPIO interface may be configured to connect the processor 110 to the camera 193, the display 194, the wireless communication module 160, the audio module 170, the sensor module 180, or the like. The GPIO interface may alternatively be configured as an I2C interface, an I2S interface, a UART interface, an MIPI interface, or the like.

The USB port 130 is a port that conforms to a USB standard specification, and may be specifically a mini USB port, a micro USB port, a USB type-C port, or the like. The USB port 130 may be used to connect to the charger to charge the terminal device 100, or may be used to transmit data between the terminal device 100 and a peripheral device, or may be configured to connect to the headset 200 for playing audio through the headset 200. The interface may alternatively be used to connect to another terminal device, for example, an AR device.

It may be understood that an interface connection relationship between the modules in this embodiment of this application is merely an example for description, and does not constitute a limitation on the structure of the terminal device 100. In some other embodiments of this application, the terminal device 100 may alternatively use an interface connection manner different from that in the foregoing embodiment, or may use a combination of a plurality of interface connection manners.

The charging management module 140 is configured to receive a charging input from the charger. The charger may be a wireless charger or a wired charger. In some embodiments of wired charging, the charging management module 140 may receive a charging input of a wired charger through the USB port 130. In some embodiments of wireless charging, the charging management module 140 may receive a wireless charging input through a wireless charging coil of the terminal device 100. When charging the battery 142, the charging management module 140 may further supply power to the terminal device by using the power management module 141.

The power management module 141 is configured to connect the battery 142 and the charging management module 140 to the processor 110. The power management module 141 receives an input from the battery 142 and/or the charging management module 140, and supplies power to the processor 110, the internal memory 121, the display 194, the camera 193, the wireless communication module 160, and the like. The power management module 141 may be further configured to monitor parameters such as a battery capacity, a battery cycle count, and a battery status of health (electric leakage and impedance). In some other embodiments, the power management module 141 may alternatively be disposed in the processor 110. In some other embodiments, the power management module 141 and the charging management module 140 may alternatively be disposed in a same component.

A wireless communication function of the terminal device 100 may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the terminal device 100 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 150 may provide a wireless communication solution that includes second generation (2G)/third generation (3G)/fourth generation (4G)/fifth generation (5G) or the like and that is applied to the terminal device 100. The mobile communication module 150 may include at least one filter, a switch, a power amplifier, a low-noise amplifier (LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules in the mobile communication module 150 may be disposed in the processor 110. In some embodiments, at least some functional modules of the mobile communication module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (which is not limited to the speaker 170A, the receiver 170B, or the like), or displays an image or a video by using the display 194. In some embodiments, the modem processor may be an independent component. In some other embodiments, the modem processor may be independent of the processor 110, and is disposed in a same device as the mobile communication module 150 or another functional module.

The wireless communication module 160 may provide a wireless communication solution that is applied to the terminal device 100, and that includes a wireless local area network (WLAN) (for example, Wi-Fi network), BT, a global navigation satellite system (GNSS), frequency modulation (FM), a near-field communication (NFC) technology, an IR technology, or the like. The wireless communication module 160 may be one or more components integrating at least one communication processor module. The wireless communication module 160 receives an electromagnetic wave by the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2. For example, the wireless communication module 160 includes a BT module, and the terminal device 100 establishes a wireless connection to the headset 200 by using BT. For another example, the wireless communication module 160 includes an infrared module, and the terminal device 100 may establish a wireless connection to the headset 200 by using the infrared module.

In some embodiments, in the terminal device 100, the antenna 1 and the mobile communication module 150 are coupled, and the antenna 2 and the wireless communication module 160 are coupled, so that the terminal device 100 can communicate with a network and another device by using a wireless communication technology. The wireless communication technology may include a Global System for Mobile Communications (GSM), a General Packet Radio Service (GPRS), code-division multiple access (CDMA), wideband CDMA (WCDMA), time-division CDMA (TD-SCDMA), Long-Term Evolution (LTE), BT, a GNSS, a WLAN, NFC, FM, an IR technology, and/or the like. The GNSS may include a Global Positioning System (GPS), a global navigation satellite system (GLONASS), a BEIDOU navigation satellite system (BDS), a quasi-zenith satellite system (QZSS), and/or a satellite based augmentation system (SBAS).

The terminal device 100 implements a display function by using the GPU, the display 194, the application processor, and the like. The GPU is a microprocessor for image processing, and is connected to the display 194 and the application processor. The GPU is configured to perform mathematical and geometric computation, and render an image. The processor 110 may include one or more GPUs, which execute program instructions to generate or change display information.

The display 194 is configured to display an image, a video, and the like. The display 194 includes a display panel. The display panel may be a liquid-crystal display (LCD), an organic light-emitting diode (LED)(OLED), an active-matrix OLED (AMOLED), a flexible LED (FLED), a mini-LED, a micro-LED, a micro-OLED, a quantum dot LED (QLED), or the like. In some embodiments, the terminal device 100 may include one or N1 displays 194, where N1 is a positive integer greater than 1.

The terminal device 100 may implement an image shooting function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scene. In some embodiments, the ISP may be disposed in the camera 193.

The camera 193 is configured to capture a static image or a video. An optical image of an object is generated through a lens, and is projected onto a photosensitive element. The photosensitive element may be a charge-coupled device (CCD) or a complementary metal-oxide-semiconductor (CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as a red, green, and blue (RGB) or a luma, blue projection, red projection (YUV). In some embodiments, the processor 110 may trigger the camera 193 based on a program or instructions in the internal memory 121, so that the camera 193 captures at least one image, and correspondingly processes the at least one image based on the program or the instructions. In some embodiments, the terminal device 100 may include one or N2 cameras 193, where N2 is a positive integer greater than 1.

The digital signal processor is configured to process a digital signal, and may process another digital signal in addition to the digital image signal. For example, when the terminal device 100 selects a frequency, the digital signal processor is configured to perform Fourier transform on frequency energy.

The video codec is configured to compress or decompress a digital video. The terminal device 100 may support one or more video codecs. In this way, the terminal device 100 may play or record videos in a plurality of encoding formats, for example, Moving Picture Experts Group (MPEG)-1, MPEG-2, MPEG-3, and MPEG-4.

The NPU is a neural-network (NN) processing unit. The NPU quickly processes input information with reference to a structure of a biological neural network, for example, a transfer mode between human brain neurons, and may further continuously perform self-learning. The NPU can implement applications such as intelligent cognition of the terminal device 100, for example, image recognition, facial recognition, speech recognition, and text understanding.

The external memory interface 120 may be configured to connect to an external memory card, for example, a micro SanDisk (SD) card, to extend a storage capability of the terminal device 100. The external memory card communicates with the processor 110 through the external memory interface 120, to implement a data storage function. For example, files such as music and videos are stored in the external storage card.

The internal memory 121 may be configured to store computer-executable program code. The executable program code includes instructions. The internal memory 121 may include a program storage region and a data storage region. The program storage region may store an operating system, an application (for example, a camera application) required by at least one function, and the like. The data storage region may store data (such as an image captured by a camera) created during use of the terminal device 100, and the like. In addition, the internal memory 121 may include a high-speed random access memory, or may include a nonvolatile memory such as at least one disk storage device, a flash memory, or a universal flash storage (UFS). The processor 110 runs instructions stored in the internal memory 121 and/or instructions stored in the memory disposed in the processor, to perform various function applications of the terminal device 100 and data processing. The internal memory 121 may further store a downlink audio signal provided in this embodiment of this application. The internal memory 121 may further store code used to implement a function of controlling the headset 200. When the code that is stored in the internal memory 121 and that is used to implement the function of controlling the headset 200 is run by the processor 110, the headset 200 is controlled to implement a corresponding function, for example, the ANC function, the HT function, or the AH function. Certainly, code for controlling a function of the headset 200 provided in this embodiment of this application may alternatively be stored in an external memory. In this case, the processor 110 may run, by using the external memory interface 120, corresponding data that is stored in the external memory and that is used to control a function of the headset 200, to control the headset 200 to implement the corresponding function.

The terminal device 100 may implement an audio function such as music playing or recording through the audio module 170, the speaker 170A, the receiver 170B, the microphone 170C, the headset jack 170D, the application processor, and the like.

The audio module 170 is configured to convert digital audio information into an analog audio signal for output, and is also configured to convert analog audio input into a digital audio signal. The audio module 170 may be further configured to code and decode an audio signal. In some embodiments, the audio module 170 may be disposed in the processor 110, or some functional modules in the audio module 170 are disposed in the processor 110.

The speaker 170A, also referred to as a "loudspeaker", is configured to convert an audio electrical signal into a sound signal. The terminal device 100 may listen to music or answer a call in a hands-free mode by using the speaker 170A.

The receiver 170B, also referred to as an "earpiece", is configured to convert an audio electrical signal into a sound signal. When a call is answered or voice information is received by using the terminal device 100, the receiver 170B may be put close to a human ear to listen to a voice.

The microphone 170C, also referred to as a "mike" or a "mic", is configured to convert a sound signal into an electrical signal. When making a call or sending a voice message, a user may make a sound near the microphone 170C through the mouth of the user, to input a sound signal to the microphone 170C. At least one microphone 170C may be disposed in the terminal device 100. In some other embodiments, two microphones 170C may be disposed in the terminal device 100, to collect a sound signal and implement a noise control function. In some other embodiments, three, four, or more microphones 170C may alternatively be disposed in the terminal device 100, to collect a sound signal, implement noise control, identify a sound source, implement a directional recording function, and the like.

The headset jack 170D is configured to connect to a wired headset. When the headset 200 provided in this embodiment of this application is a wired headset, the terminal device 100 is connected to the headset through the headset jack 170D. The headset jack 170D may be the USB port 130, or may be a 3.5 millimeter (mm) Open Mobile Terminal Platform (OMTP) standard interface or cellular telecommunications industry association (CTIA) of the United States of America (USA) standard interface.

The pressure sensor 180A is configured to sense a pressure signal, and may convert the pressure signal into an electrical signal. In some embodiments, the pressure sensor 180A may be disposed on the display 194. There is a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The terminal device 100 determines pressure strength based on the change of the capacitance. When a touch operation is performed on the display 194, the terminal device 100 detects strength of the touch operation by using the pressure sensor 180A. The terminal device 100 may also calculate a touch location based on a detection signal of the pressure sensor 180A. In some embodiments, touch operations that are performed on a same touch location but have different touch operation strengths may correspond to different operation instructions. For example, when a touch operation whose touch operation strength is less than a first pressure threshold is performed on an SMS message application icon, an instruction for viewing an SMS message is executed. When a touch operation whose touch operation strength is greater than or equal to the first pressure threshold is performed on the SMS message application icon, an instruction for creating a new SMS message is executed.

The gyro sensor 180B may be configured to determine a motion posture of the terminal device 100. In some embodiments, angular velocities of the terminal device 100 around three axes (namely, x, y, and z axes) may be determined by using the gyro sensor 180B. The gyro sensor 180B may be configured to implement image stabilization during photographing. For example, when the shutter is pressed, the gyro sensor 180B detects an angle at which the terminal device 100 jitters, calculates, based on the angle, a distance for which a lens module needs to compensate, and allows the lens to cancel the jitter of the terminal device 100 through reverse motion, to implement image stabilization. The gyro sensor 180B may also be used in a navigation scene and a somatic game scene.

The barometric pressure sensor 180C is configured to measure barometric pressure. In some embodiments, the terminal device 100 calculates an altitude by using a barometric pressure value measured by the barometric pressure sensor 180C, to assist in positioning and navigation.

The magnetic sensor 180D includes a Hall sensor. The terminal device 100 may detect opening and closing of a flip cover by using the magnetic sensor 180D. In some embodiments, when the terminal device 100 is a flip phone, the terminal device 100 may detect opening and closing of a flip cover based on the magnetic sensor 180D. Further, a feature such as automatic unlocking of the flip cover is set based on a detected opening or closing state of a leather case or a detected opening or closing state of the flip cover.

The acceleration sensor 180E may detect magnitudes of accelerations of the terminal device 100 in various directions (usually on three axes). A magnitude and a direction of gravity may be detected when the terminal device 100 is still. The acceleration sensor 180E may be further configured to identify a posture of the terminal device, and is applied to an application such as switching between a landscape mode and a portrait mode or a pedometer.

The distance sensor 180F is configured to measure a distance. The terminal device 100 may measure a distance in an infrared manner or a laser manner. In some embodiments, in a photographing scene, the terminal device 100 may measure a distance by using the range sensor 180F, to implement quick focusing.

The optical proximity sensor 180G may include, for example, a LED and an optical detector, for example, a photodiode. The light-emitting diode may be an infrared emitting diode. The terminal device 100 emits infrared light outward by using the light-emitting diode. The terminal device 100 detects infrared reflected light from a nearby object by using the photodiode. When sufficient reflected light is detected, it is determined that there is an object near the terminal device 100. When insufficient reflected light is detected, the terminal device 100 may determine that there is no object near the terminal device 100. The terminal device 100 may detect, by using the optical proximity sensor 180G, that the user holds the terminal device 100 close to an ear to make a call, to automatically perform screen-off for power saving. The optical proximity sensor 180G may also be used in a leather case mode or a pocket mode to automatically perform screen unlocking or locking.

The ambient light sensor 180L is configured to sense ambient light brightness. In some embodiments, the terminal device 100 may determine exposure time of an image based on brightness of ambient light sensed by the ambient optical sensor 180L. In some embodiments, the terminal device 100 may adaptively adjust brightness of the display 194 based on the brightness of the sensed ambient light. The ambient light sensor 180L may also be configured to automatically adjust white balance during photographing. The ambient light sensor 180L may further cooperate with the optical proximity sensor 180G to detect whether the terminal device 100 is in a pocket, to prevent accidental touch.

The fingerprint sensor 180H is configured to collect a fingerprint. The terminal device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the terminal device 100 executes a temperature processing policy by using the temperature detected by the temperature sensor 180J. For example, when the temperature reported by the temperature sensor 180J exceeds a threshold, the terminal device 100 reduces performance of a processor located near the temperature sensor 180J, to reduce power consumption and implement heat protection. In some other embodiments, when the temperature is lower than another threshold, the terminal device 100 heats the battery 142, to avoid abnormal shutdown of the terminal device 100 caused by a low temperature. In some other embodiments, when the temperature is lower than still another threshold, the terminal device 100 boosts an output voltage of the battery 142, to avoid abnormal shutdown caused by a low temperature.

The touch sensor 180K may also be referred to as a "touch component". The touch sensor 180K may be disposed on the display 194, and the touch sensor 180K and the display 194 constitute a touchscreen, which is also referred to as a "touch screen". The touch sensor 180K is configured to detect a touch operation performed on or near the touch sensor. The touch sensor may transfer the detected touch operation to the application processor to determine a type of the touch event. A visual output related to the touch operation may be provided through the display 194. In some other embodiments, the touch sensor 180K may alternatively be disposed on a surface of the terminal device 100 at a location different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a body pulse to receive a blood pressure beating signal. In some embodiments, the bone conduction sensor 180M may also be disposed in the headset, to obtain a bone conduction headset. The audio module 170 may obtain a speech signal through parsing based on the vibration signal that is of the vibration bone of the vocal-cord part and that is obtained by the bone conduction sensor 180M, to implement a speech function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The terminal device 100 may receive button input, and generate button signal input related to a user setting and function control of the terminal device 100.

The motor 191 may generate a vibration prompt. The motor 191 may be configured to provide an incoming call vibration prompt and a touch vibration feedback. For example, touch operations performed on different applications (for example, photographing and audio playing) may correspond to different vibration feedback effects. The motor 191 may also correspond to different vibration feedback effects for touch operations performed on different regions of the display 194. Different application scenes (for example, a time reminder, information receiving, an alarm clock, and a game) may also correspond to different vibration feedback effects. Touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or detached from the SIM card interface 195, to implement contact with or separation from the terminal device 100. The terminal device 100 may support one or N3 SIM card interfaces, where N3 is a positive integer greater than 1. The SIM card interface 195 may support a nano-SIM card, a micro-SIM card, a SIM card, and the like. A plurality of cards may be inserted into a same SIM card interface 195 at the same time. The plurality of cards may be of a same type or different types. The SIM card interface 195 may be compatible with different types of SIM cards. The SIM card interface 195 may also be compatible with an external storage card. The terminal device 100 interacts with a network by using the SIM card, to implement functions such as calling and data communication. In some embodiments, the terminal device 100 uses an embedded SIM (eSIM) card, namely, an embedded SIM card. The eSIM card may be embedded in the terminal device 100, and cannot be separated from the terminal device 100.

A software system of the terminal device 100 may use a layered architecture, an event-driven architecture, a microkernel architecture, a microservice architecture, or a cloud architecture. In embodiments of this application, an ANDROID system with a layered architecture is used as an example to describe a software structure of the terminal device 100.

Figure 2:
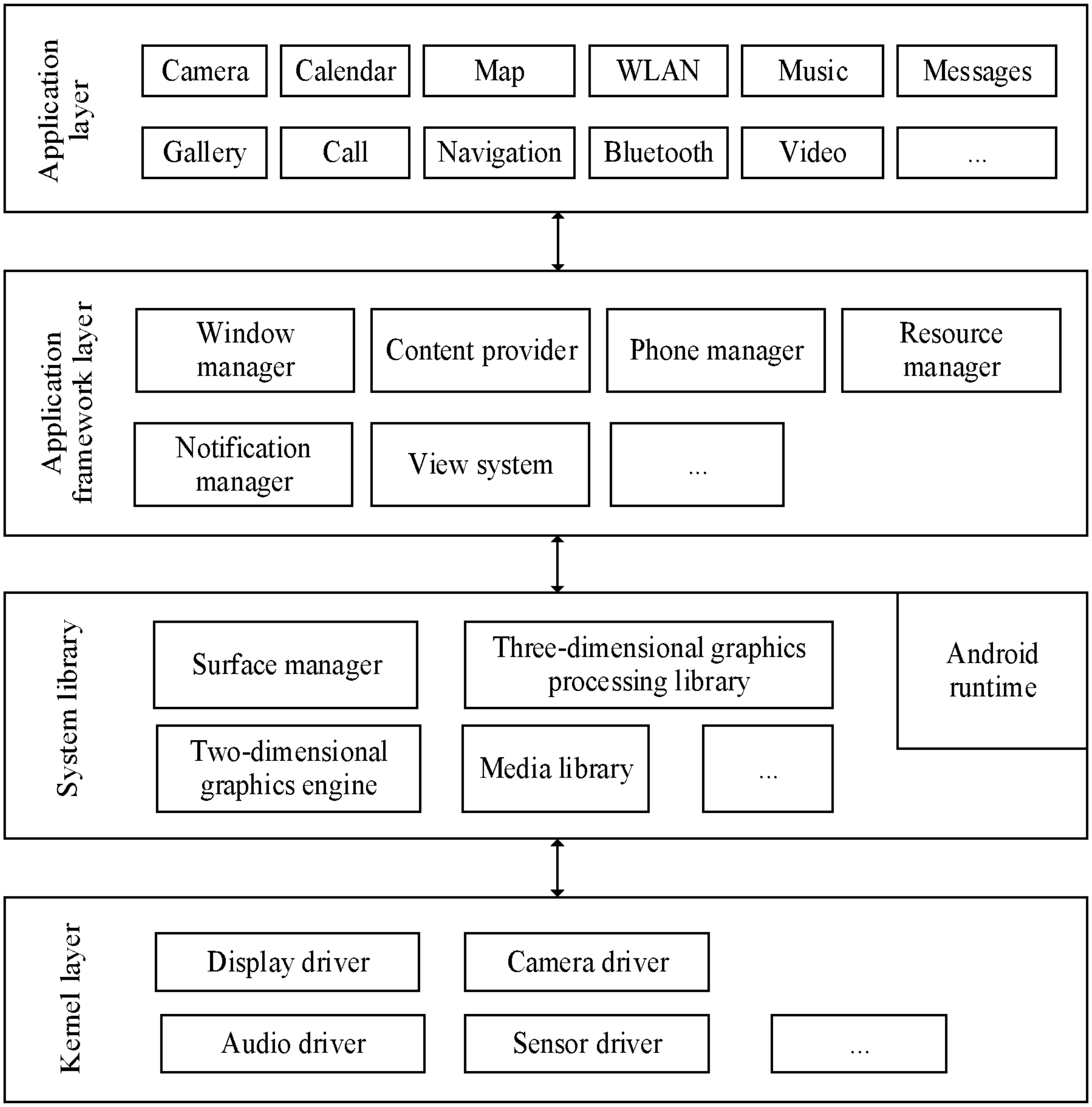
FIG. 2 is a schematic diagram of a software structure of a terminal device 100 according to an embodiment of this application.

FIG. 2 is a block diagram of a software structure of a terminal device 100 according to an embodiment of this application.

In a layered architecture, software is divided into several layers, and each layer has a clear role and task. The layers communicate with each other through a software interface. In some embodiments, the ANDROID system is divided into four layers: an application layer, an application framework layer, an ANDROID runtime and a system library, and a kernel layer from top to bottom. The application layer may include a series of application packages.

As shown in FIG. 2, the application packages may include applications such as Camera, Gallery, Calendar, Phone, Maps, Navigation, WLAN, BT, Music, Videos, and Messages.

The application framework layer provides an application programming interface (API) and a programming framework for an application at the application layer. The application framework layer includes some predefined functions.

As shown in FIG. 2, the application framework layer may include a window manager, a content provider, a view system, a phone manager, a resource manager, a notification manager, and the like.

The window manager is configured to manage a window program. The window manager may obtain a size of the display, determine whether there is a status bar, perform screen locking, take a screenshot, and the like.

The content provider is configured to store and obtain data, and enable the data to be accessed by an application program. The data may include a video, an image, an audio, calls that are made and answered, a browsing history and bookmarks, an address book, and the like.

The view system includes visual controls such as a control for displaying a text and a control for displaying an image. The view system may be configured to construct an application program. A display interface may include one or more views. For example, a display interface including an SMS message notification icon may include a text display view and an image display view.

The phone manager is configured to provide a communication function of the terminal device 100, for example, management of a call status (including answering, declining, or the like).

The resource manager provides various resources such as a localized character string, an icon, an image, a layout file, and a video file for an application program.

The notification manager enables an application program to display notification information in a status bar, and may be configured to convey a notification message. The notification manager may automatically disappear after a short pause without requiring a user interaction. For example, the notification manager is configured to notify download completion, give a message notification, and the like. The notification manager may alternatively be a notification that appears in a top status bar of the system in a form of a graph or a scroll bar text, for example, a notification of an application that is run on a background, or may be a notification that appears on the screen in a form of a dialog window. For example, text information is displayed in the status bar, an announcement is given, the terminal device vibrates, or an indicator light blinks.

The ANDROID runtime includes a kernel library and a virtual machine. The Android runtime is responsible for scheduling and management of the ANDROID system.

The kernel library includes two parts: a function that needs to be invoked in java language and a kernel library of ANDROID.

The application layer and the application framework layer run on the virtual machine. The virtual machine executes java files of the application layer and the application framework layer as binary files. The virtual machine is configured to implement functions such as object lifecycle management, stack management, thread management, security and exception management, and garbage collection.

The system library may include a plurality of functional modules, for example, a surface manager, a media library, a three-dimensional (3D) graphics processing library (for example, OpenGL ES), and a two-dimensional (2D) graphics engine (for example, SGL).

The surface manager is configured to manage a display subsystem and provide fusion of 2D and 3D layers for a plurality of applications.

The media library supports playback and recording in a plurality of commonly used audio and video formats, and static image files. The media library may support a plurality of audio and video coding formats, for example, MPEG-4, H.264, MPEG-1 Audio Layer III (MP3), Advanced Audio Coding (AAC), Adaptive Multi-Rate (AMR), Joint Photographic Experts Group (JEPG), and Portable Network Graphics (PNG).

The 3D graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, a headset driver, and a sensor driver.

The following describes an example of a working procedure of software and hardware of the terminal device 100 with reference to a scene of capturing and playing audio.

When the touch sensor 180K receives a touch operation, a corresponding hardware interrupt is sent to the kernel layer. The kernel layer processes the touch operation into an original input event (including information such as touch coordinates and a timestamp of the touch operation). The original input event is stored at the kernel layer. The application framework layer obtains the original input event from the kernel layer, and identifies a control corresponding to the input event. For example, the touch operation is a touch tap operation, and a control corresponding to the tap operation is a control of an audio application icon. The audio application invokes an interface at the application framework layer to start the headset to control the application, and then invokes the kernel layer to start the headset driver, send an audio signal to the headset, and play the audio signal by using the headset 200.

Figure 3:
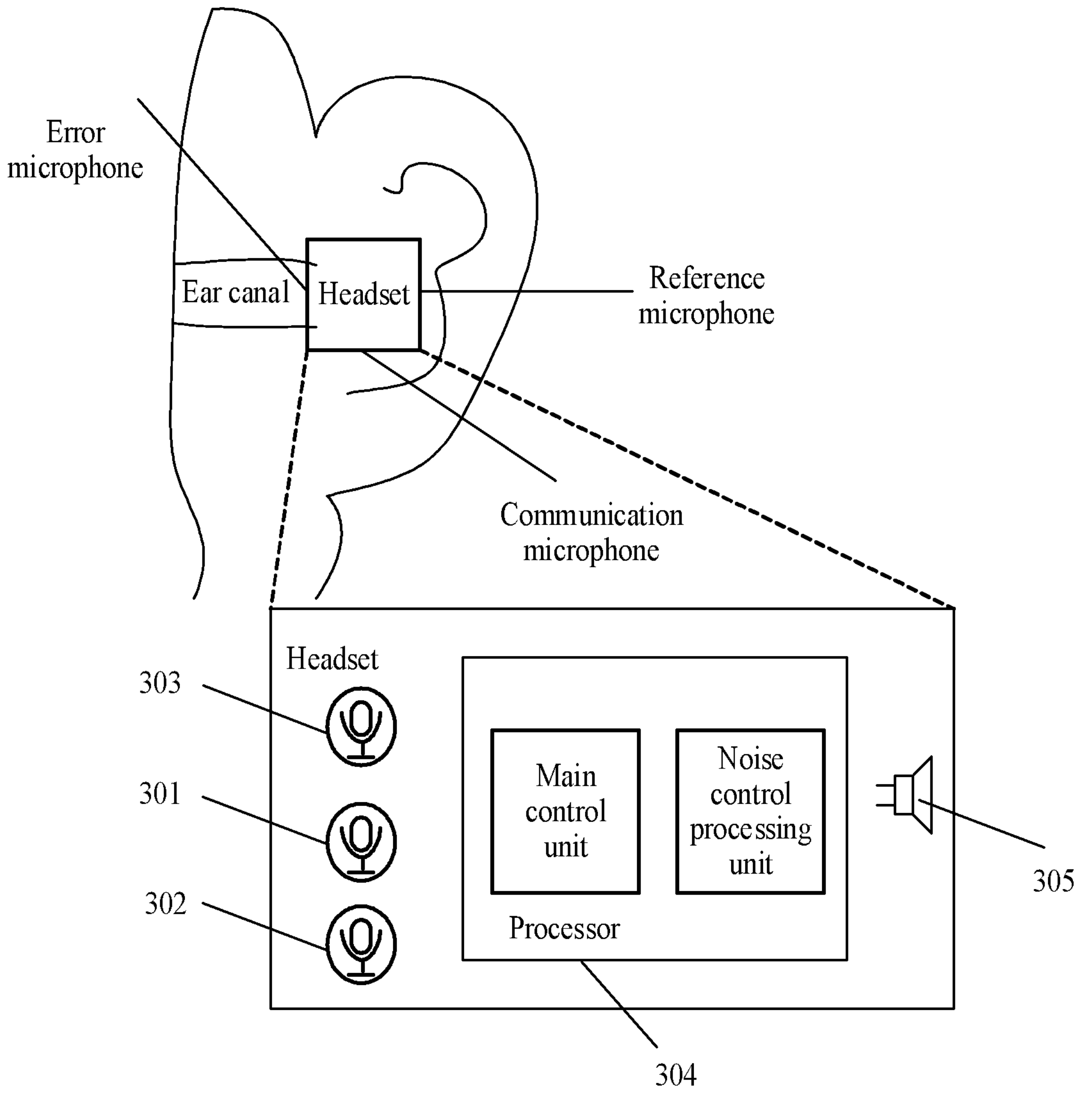
FIG. 3 is a schematic diagram of a structure of a headset 200 according to an embodiment of this application.

FIG. 3 is a schematic diagram of an optional hardware structure of the headset 200. The headset 200 includes a left earphone and a right earphone. The left earphone and the right earphone have similar structures. The headset (including the left earphone and the right earphone) structurally includes a first microphone 301, a second microphone 302, and a third microphone 303. The headset may further include a processor 304 and a speaker 305. It should be understood that the headset described subsequently may be interpreted as the left earphone, or may be interpreted as the right earphone.

The first microphone 301 is configured to collect a sound in a current external environment. The first microphone 301 may also be referred to as a reference microphone. When a user wears the headset, the first microphone 301 is located outside the headset, or the first microphone 301 is located outside an ear. When the user wears the headset, the second microphone 302 collects an ambient sound in an ear canal of the user. The second microphone 302 may also be referred to as an error microphone. When the user wears the headset, the second microphone 302 is located inside the headset and close to the ear canal. The third microphone 303 is configured to collect a call signal. The third microphone 303 may be located outside the headset. When the user wears the headset, the third microphone 303 is closer to the mouth of the user than the first microphone 301.

It should be noted that the first microphone 301 is configured to collect the sound in the current external environment, and may be explained as a sound in an external environment in which the user wears the headset. For example, on a train, the sound in the external environment is a sound in an environment around the user wearing the headset. The first microphone 301 on the left earphone collects a sound in an external environment of the left earphone. The first microphone 301 on the right earphone collects a sound in an external environment of the right earphone.

For ease of distinguishing, a signal collected by the first microphone 301 (the reference microphone) is referred to as a first signal, and a signal collected by the second microphone 302 (the error microphone) is referred to as a second signal. The microphone in this embodiment of this application may be an analog microphone, or may be a digital microphone. When the microphone is the analog microphone, before filtering processing is performed on a signal collected by the microphone, an analog signal may be converted into a digital signal. In this embodiment of this application, for example, both the first microphone and the second microphone are digital microphones, and both the first signal and the second signal are digital signals.

The processor 304 is configured to perform processing, for example, ANC processing, HT processing, or AH processing, on a downlink audio signal and/or a signal collected by a microphone (including the first microphone 301, the second microphone 302, or the third microphone 303). For example, the processor 304 may include a main control unit and a noise control processing unit. The main control unit is configured to generate a control command for a user operation on the headset, receive a control command from a terminal device, or the like. The noise control processing unit is configured to perform, based on the control command, the ANC processing, the HT processing, or the AH processing on a downlink audio signal and/or a signal collected by a microphone (including the first microphone 301, the second microphone 302, or the third microphone 303).

The left earphone and the right earphone may further include a memory. The memory is configured to store a program or instructions executed by the processor 304. The processor 304 performs the ANC processing, the HT processing, or the AH processing based on the program or the instructions stored in the memory. The memory may include one or more of a random-access memory (RAM), a flash memory, a read-only memory (ROM), a programmable ROM (PROM), an erasable PROM (EPROM), an electrically EPROM (EEPROM), a register, a hard disk, a removable hard disk, a compact disc (CD)-ROM, or a storage medium of any other form well-known in the art.

The main control unit may be implemented, for example, by one or more of an ARM processing chip, a central processing unit (CPU), a system on chip (SoC), a digital signal processor (DSP), or a micro controller unit (MCU). The noise control processing unit may include, for example, a coder-decoder (CODEC) chip or a high-fidelity (Hi-Fi) chip. For example, the noise control processing unit includes a codec chip. A filter, an equalizer (EQ), a dynamic range controller (DRC), a limiter, a gain regulator (gain), a mixer, and the like are hardened in the codec, and are mainly configured to perform processing such as filtering, audio mixing, and gain adjustment on a signal. The noise control processing unit may further include a DSP. The DSP may be configured to perform processing such as scene detection, voice enhancement, and unblocking.

The headset may further include a wireless communication unit, configured to establish a communication connection to the terminal device 100 through the wireless communication module 160 in the terminal device 100. The wireless communication unit may provide a wireless communication solution that is applied to the headset, and that includes a WLAN (for example, a Wi-Fi network), BT, a NFC technology, an IR technology, or the like. The wireless communication unit may be one or more components integrating at least one communication processor module. For example, the wireless communication module 160 may be Bluetooth, the wireless communication unit may also be BT, and the headset 200 is connected to the terminal device 100 by using BT.

Figure 4:
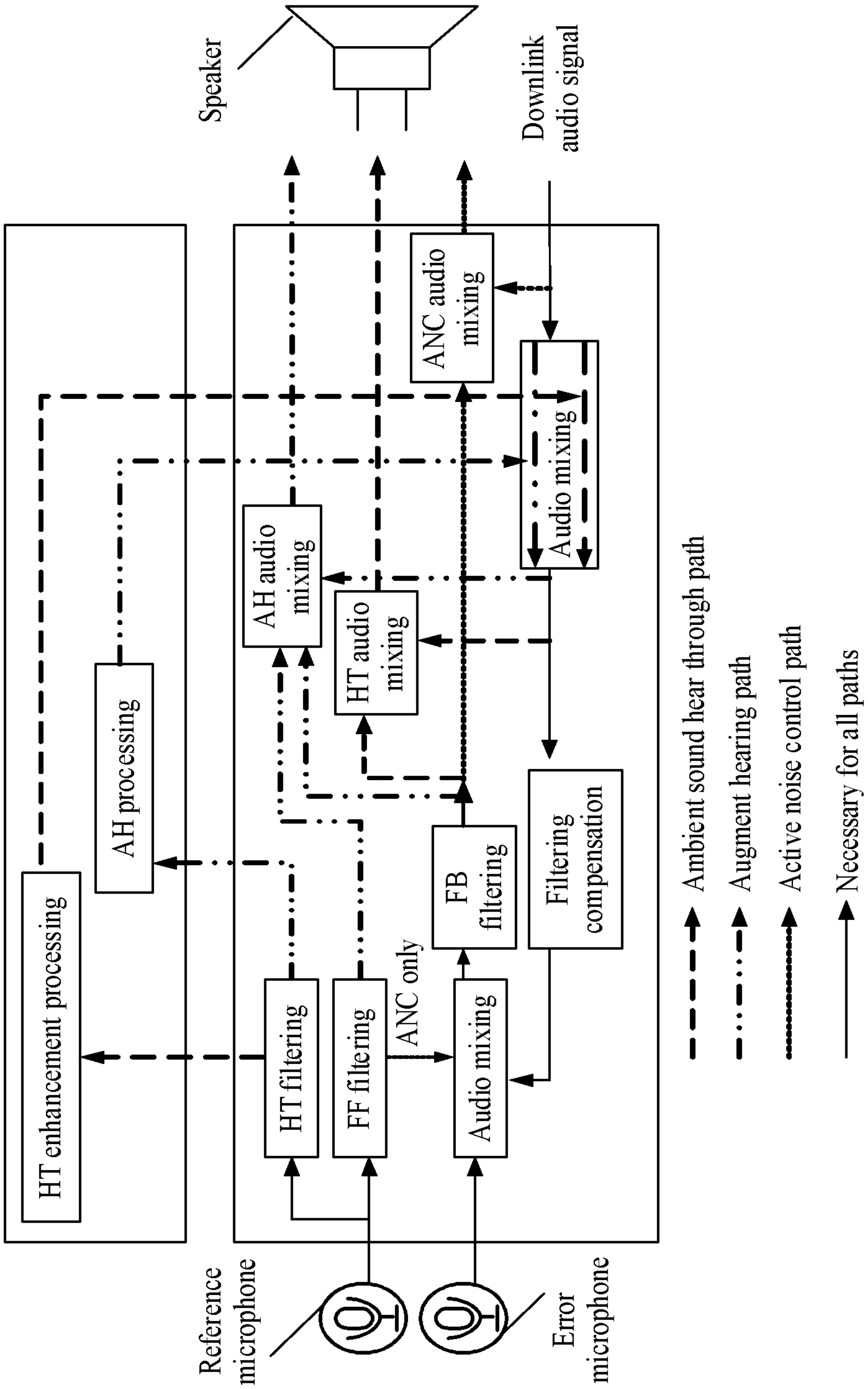
FIG. 4 is a schematic diagram of an ANC, HT, and AH (AHA) path according to an embodiment of this application.

In a possible example, for three different noise processing, output is performed by using three paths: an ANC output path, an ambient sound HT output path, and an AH output path. For example, different output paths use different processing manners, as shown in FIG. 4.

The active noise control processing in the active noise control output path may include but is not limited to: performing noise suppression by using an antiphase signal of the first signal collected by the reference microphone and an antiphase signal of the second signal collected by the error microphone. The active noise control output path includes the antiphase signal of the first signal and the antiphase signal of the second signal. It should be noted that a phase difference between the first signal and the antiphase signal of the first signal is 180 degrees. The speaker outputs a signal obtained by superimposing the antiphase signal of the first signal and the antiphase signal of the second signal, so that the sound in the current external environment played by the speaker is counteracted by the sound in the external environment actually heard by the ear, and active noise control effect is implemented. Therefore, when the headset uses the ANC mode, user perception of the sound in the current user environment and the ambient sound in the ear canal of the user can be weakened.

Optionally, when there is a downlink audio signal, filtering compensation may be performed on the downlink audio signal. In addition, impact of the downlink audio signal may be eliminated when the antiphase signal of the ambient sound is obtained.

When the antiphase signal of the first signal and the antiphase signal of the second signal are obtained, first filtering processing and third filtering processing may be used. For example, the first filtering processing may be FF filtering processing, and may be implemented by a feedforward filter. The third filtering processing may be FB filtering processing, and may be implemented by a feedback filter. As shown in FIG. 4, FF filtering and FB filtering use a parallel processing architecture to enhance noise control effect. The ANC processing procedure is described in detail in the following descriptions. Details are not described herein again.

The ambient sound HT processing in the ambient sound hear through output path may include but is not limited to performing third filtering processing on the signal collected by the error microphone to implement a part of an ANC function, and performing second filtering processing and HT enhancement processing on the signal collected by the reference microphone. For example, the second filtering processing may be HT filtering processing, and may be implemented by a hear through filter. The audio signal played by the speaker is obtained based on the first signal and the second signal, so that after the audio signal is played by the speaker, the user can hear the sound in the external environment by using the headset. Compared with the sound in the external environment heard when HT processing is not performed, this sound has a higher strength and better effect. Therefore, when the headset uses the HT mode, user perception of the strength of the sound in the current user environment can be enhanced. The HT processing procedure is described in detail in the following descriptions. Details are not described herein again.

The ambient sound HT processing in the AH output path may include but is not limited to implementing a part of an active noise control function by using the signal collected by the error microphone, performing first filtering processing and augment hearing processing on the signal collected by the reference microphone, to enhance an event sound in the sound in the user environment, and performing second filtering processing on the signal collected by the reference microphone. The output signal of the speaker is obtained based on a signal that is obtained after mixing the event signal in the first signal and the antiphase signal of the second signal. It should be noted that a phase difference between the second signal and the antiphase signal of the second signal is 180 degrees. The speaker outputs a signal that is obtained by superimposing the antiphase signal of the second signal, the antiphase signal of the first signal, and the event signal in the first signal such that the signal output by the speaker counteracts the sound in the environment actually heard by the ear, and active noise control effect is implemented. In addition, the speaker outputs the event sound in the environment such that the user can clearly hear a preset signal needed by the user in the environment. Therefore, when the headset uses the AH mode, headset user perception of the event sound included in the sound in the current external environment can be enhanced. The AH processing procedure is described in detail in the following descriptions. Details are not described herein again.

It should be understood that the downlink audio signal, the first signal, and the second signal may be all signals of one frame or signals of a period of time. For example, when the downlink audio signal, the first signal, and the second signal are all signals of one frame, the downlink audio signal, the first signal, and the second signal belong to three signal streams respectively, and the signal frame of the downlink audio signal, the signal frame of the first signal, and the signal frame of the second signal are in a same period of time or overlap in time. In this embodiment of this application, when function processing (for example, ANC, HT, or AH) is performed, function processing is continuously performed on a signal stream in which the downlink audio signal is located, a signal stream in which the first signal is located, and a signal stream of the second signal.

First, the following describes in detail a processing procedure of the active noise control path.

Figure 5A:
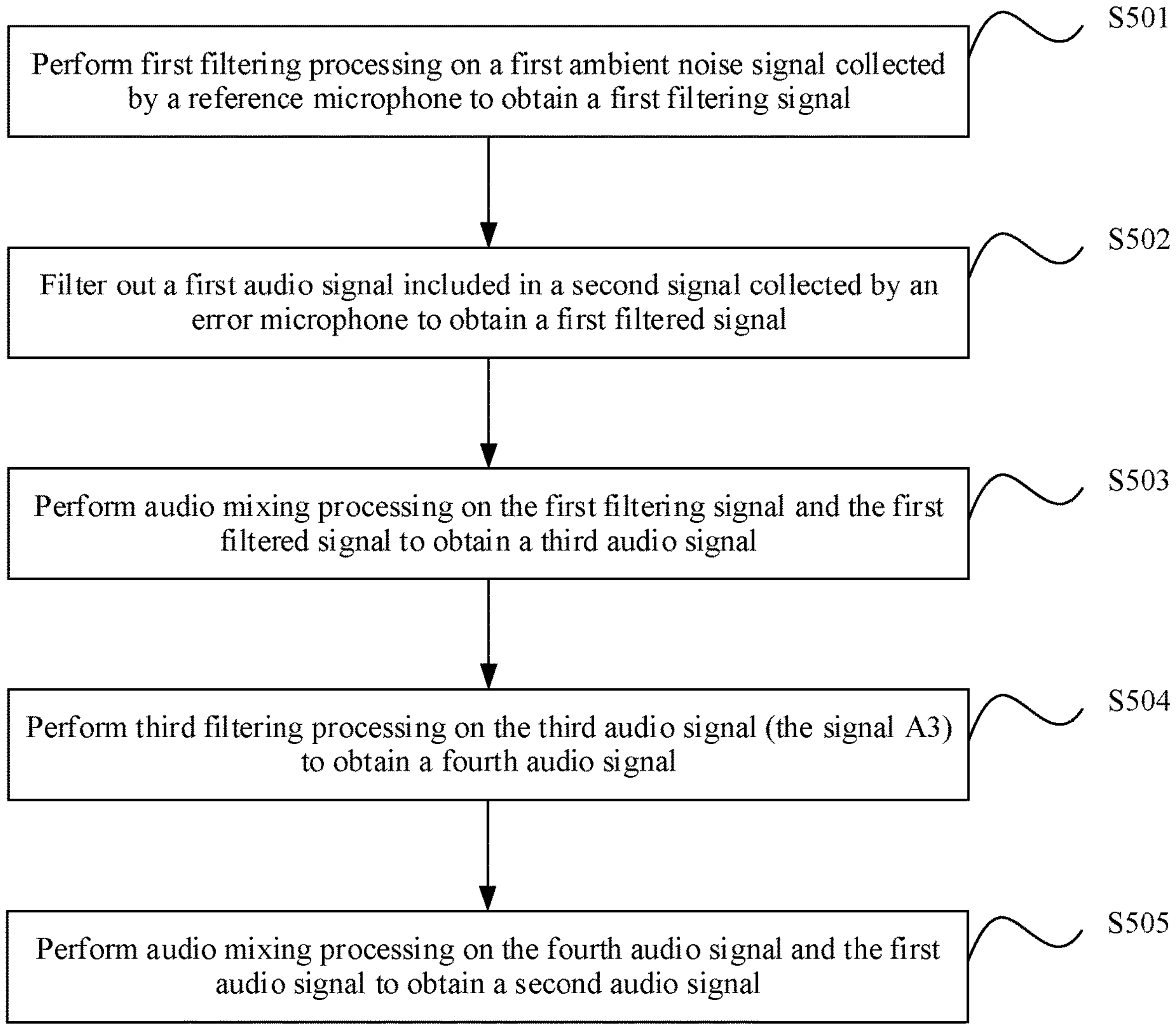
FIG. 5A is a flowchart of ANC processing according to an embodiment of this application.
Figure 5B:
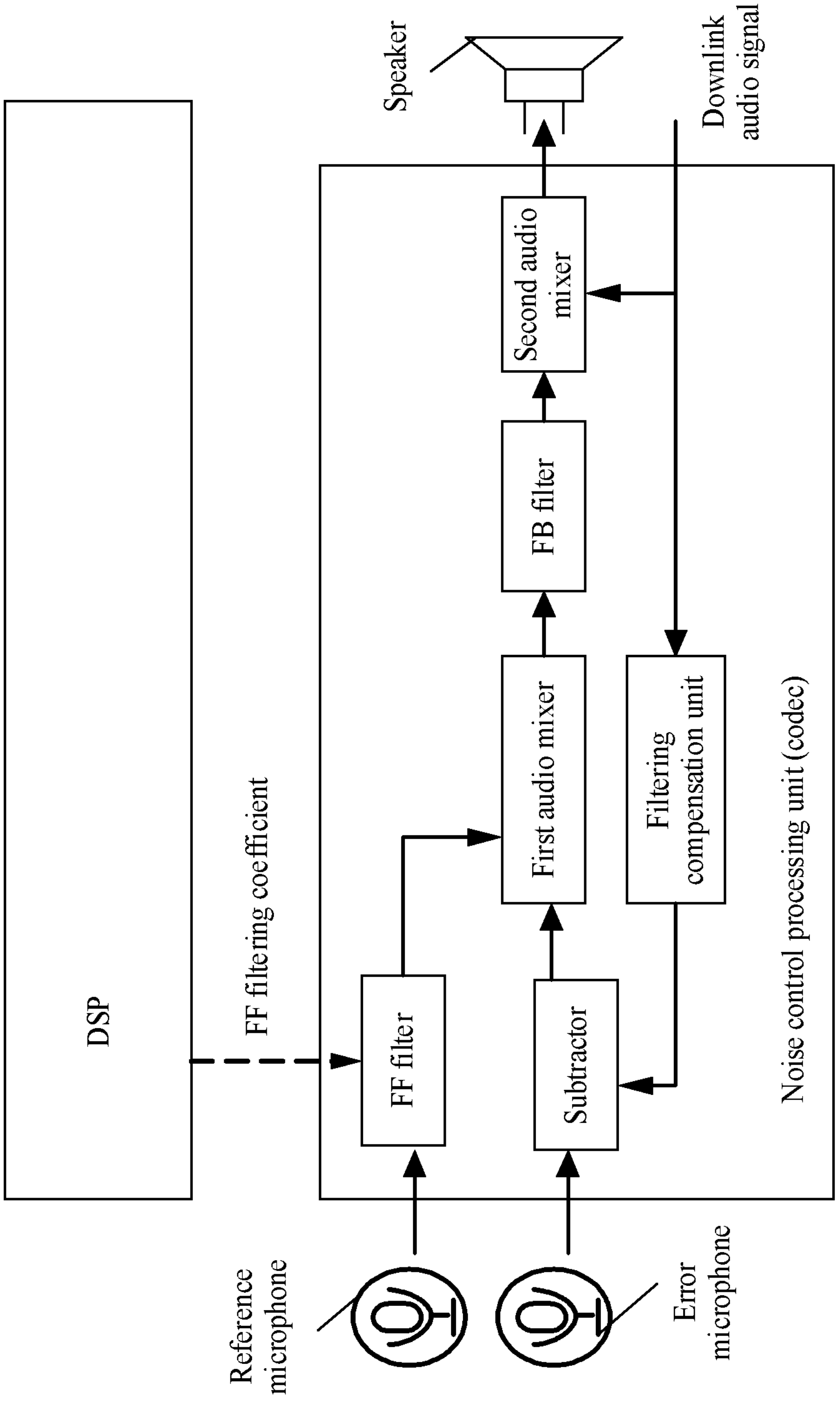
FIG. 5B is a schematic flowchart of ANC processing according to an embodiment of this application.

FIG. 5A and FIG. 5B are schematic flowcharts of active noise control processing. For example, the downlink audio signal sent by the terminal device 100 to the headset 200 is referred to as a first audio signal in subsequent descriptions. The first audio signal may be a call signal, a music signal, or the like. For example, the signal collected by the reference microphone is referred to as the first signal, and the signal collected by the error microphone is referred to as the second signal. The headset uses the ANC mode.

It should be noted that the downlink audio signals sent by the terminal device 100 to the left earphone and the right earphone in the headset 200 may be a same signal, or may be different signals. For example, the terminal device uses stereo effect. The terminal device 100 sends different downlink audio signals to the headset 200, to implement the stereo effect. Certainly, the terminal device may alternatively send a same downlink audio signal to the left earphone and the right earphone. The left earphone and the right earphone use stereo processing, to implement the stereo effect. The left earphone or the right earphone may perform processing in FIG. 5A or FIG. 5B in the case of the control of the user.

S501: Perform first filtering processing on the first signal collected by the reference microphone to obtain a first filtering signal. In FIG. 5B, the first filtering signal is briefly referred to as a signal A1.

S502: Filter out the first audio signal included in the second signal collected by the error microphone to obtain a first filtered signal. In FIG. 5B, the first filtered signal is briefly referred to as a signal A2.

Optionally, when the first audio signal included in the second signal collected by the error microphone is filtered out, filtering compensation processing may be first performed on the first audio signal.

S503: Perform audio mixing processing on the first filtering signal and the first filtered signal to obtain a third audio signal. In FIG. 5B, the third audio signal is briefly referred to as a signal A3. In other words, the signal A3 is obtained by performing audio mixing processing on the signal A1 and the signal A2.

S504: Perform third filtering processing on the third audio signal (the signal A3) to obtain a fourth audio signal. In FIG. 5B, the fourth audio signal is briefly referred to as a signal A4.

S505: Perform audio mixing processing on the fourth audio signal and the first audio signal to obtain the second audio signal. The speaker is responsible for playing the second audio signal. In FIG. 5B, the second audio signal is briefly referred to as a signal A5.

It should be noted that when there is no downlink audio signal, namely, when the terminal device does not send the first audio signal to the headset, and when the headset uses the ANC mode, the signal output by the speaker is the fourth audio signal on which audio mixing processing is not performed. In this case, S502 and S505 do not need to be performed.

In FIG. 5B, for example, the first filtering processing is FF filtering processing, and is implemented by an FF filter, and the third filtering processing is FB filtering processing, and is implemented by an FB filter. The reference microphone in the headset 200 picks up the first signal, and inputs the first signal to the FF filter for FF filtering processing to obtain the signal A1. The error microphone picks up the second signal, and inputs the second signal to a subtractor. A downlink audio signal obtained through filtering compensation is also input to the subtractor. The subtractor removes the downlink audio signal that is included in the second signal and that is obtained through filtering compensation, to eliminate impact of the downlink audio signal to obtain the signal A2. An audio mixer performs audio mixing processing on the signal A1 and the signal A2 to obtain the signal A3, and inputs the signal A3 to the FB filter for FB filtering processing to obtain the signal A4. Audio mixing is performed on the signal A4 and the downlink audio signal to obtain the signal A5, and the signal A5 is input to the speaker for playing.

ANC processing is performed in a manner of FF filtering and FB serial processing, to obtain a better-denoised signal, and enhance noise control effect.

In a possible implementation, ANC effect may be determined by a processing strength of ANC processing. The processing strength of ANC processing depends on an FF filtering coefficient used for FF filtering and/or an FB filtering coefficient used for FB filtering.

For the FF filtering coefficient, in one manner, a default FF filtering coefficient in the ANC mode may be used. In another manner, an FF filtering coefficient used when the ANC mode is selected last time may be used. In still another manner, the headset determines, based on an identified scene, the FF filtering coefficient used in the ANC mode. In further still another manner, the user indicates, to the headset by using a UI control provided by the terminal device, the FF filtering coefficient used in the ANC mode. For example, the user selects, by using the UI control provided by the terminal device, the processing strength in the ANC mode as a target processing strength. Different processing strengths correspond to different FF filtering coefficients.

For the FB filtering coefficient, in one manner, a default FB filtering coefficient in the ANC mode may be used. In another manner, an FB filtering coefficient used when the ANC mode is selected last time may be used. In still another manner, the headset determines the FB filtering coefficient based on an identified scene. In further still another manner, the user indicates, to the headset by using the UI control provided by the terminal device, the FF filtering coefficient used in the ANC mode. For example, the user selects, by using the UI control provided by the terminal device, the processing strength in the ANC mode as a target processing strength. Different processing strengths correspond to different FB filtering coefficients.

In the ANC mode, the FF filtering coefficient and the FB filtering coefficient may be obtained in any combination of the foregoing provided manners. In an example, the FF filtering coefficient uses the default filtering coefficient in the ANC mode, and the FB filtering coefficient is determined by the headset based on the identified scene. In another example, the FB filtering coefficient uses the default filtering coefficient in the ANC mode, and the FF filtering coefficient is determined by the user by using the UI control provided by the terminal device. In another example, the FB filtering coefficient uses the default filtering coefficient in the ANC mode, and the FF filtering coefficient is indicated to the headset by the user by using the UI control provided by the terminal device. The determining of the processing strength in the ANC mode is subsequently described in detail by using a specific example. Details are not described herein again.

Second, the following describes in detail a processing procedure of the ambient sound hear through path.

Figure 6A:
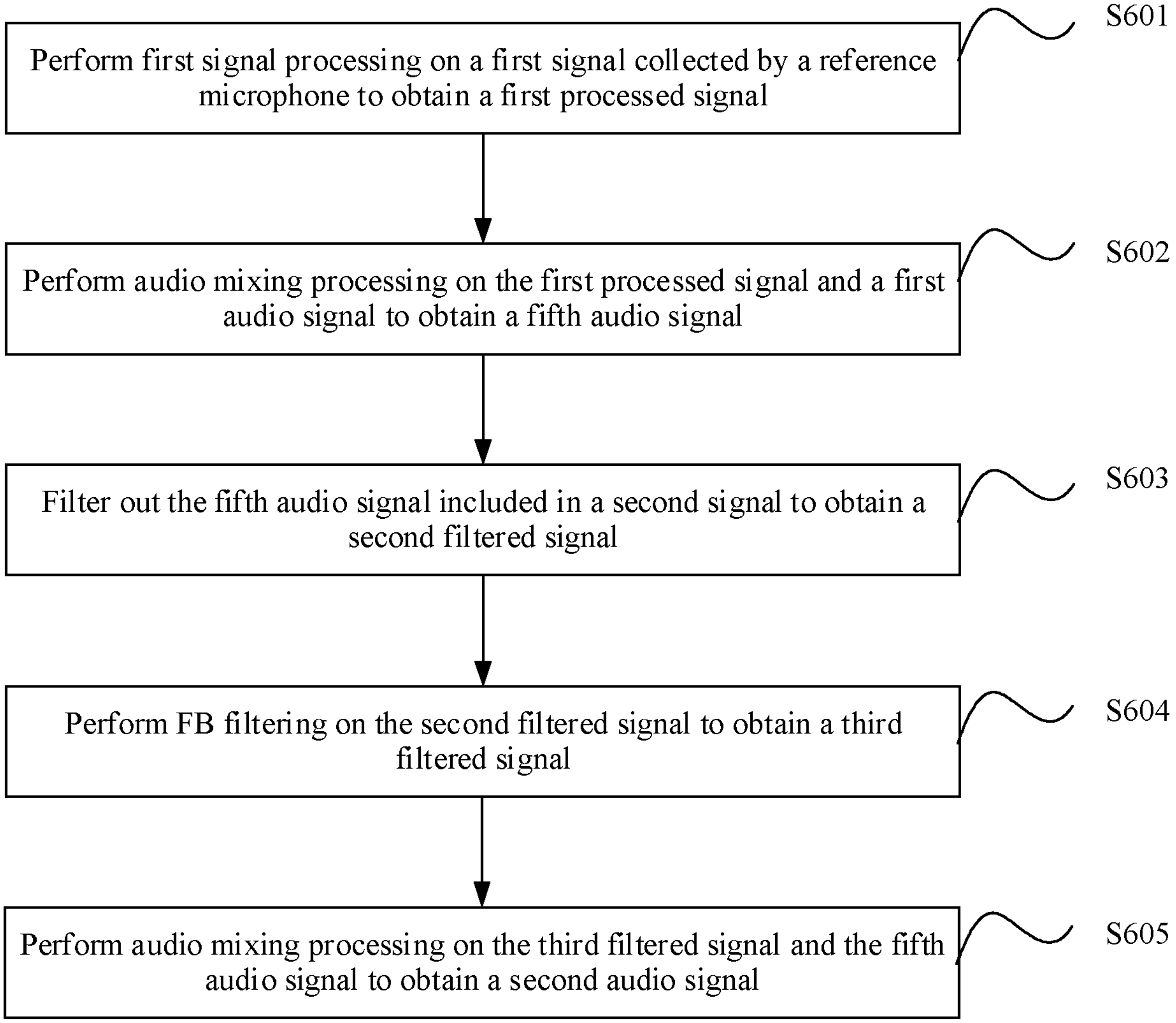
FIG. 6A is a flowchart of HT processing according to an embodiment of this application.
Figure 6B:
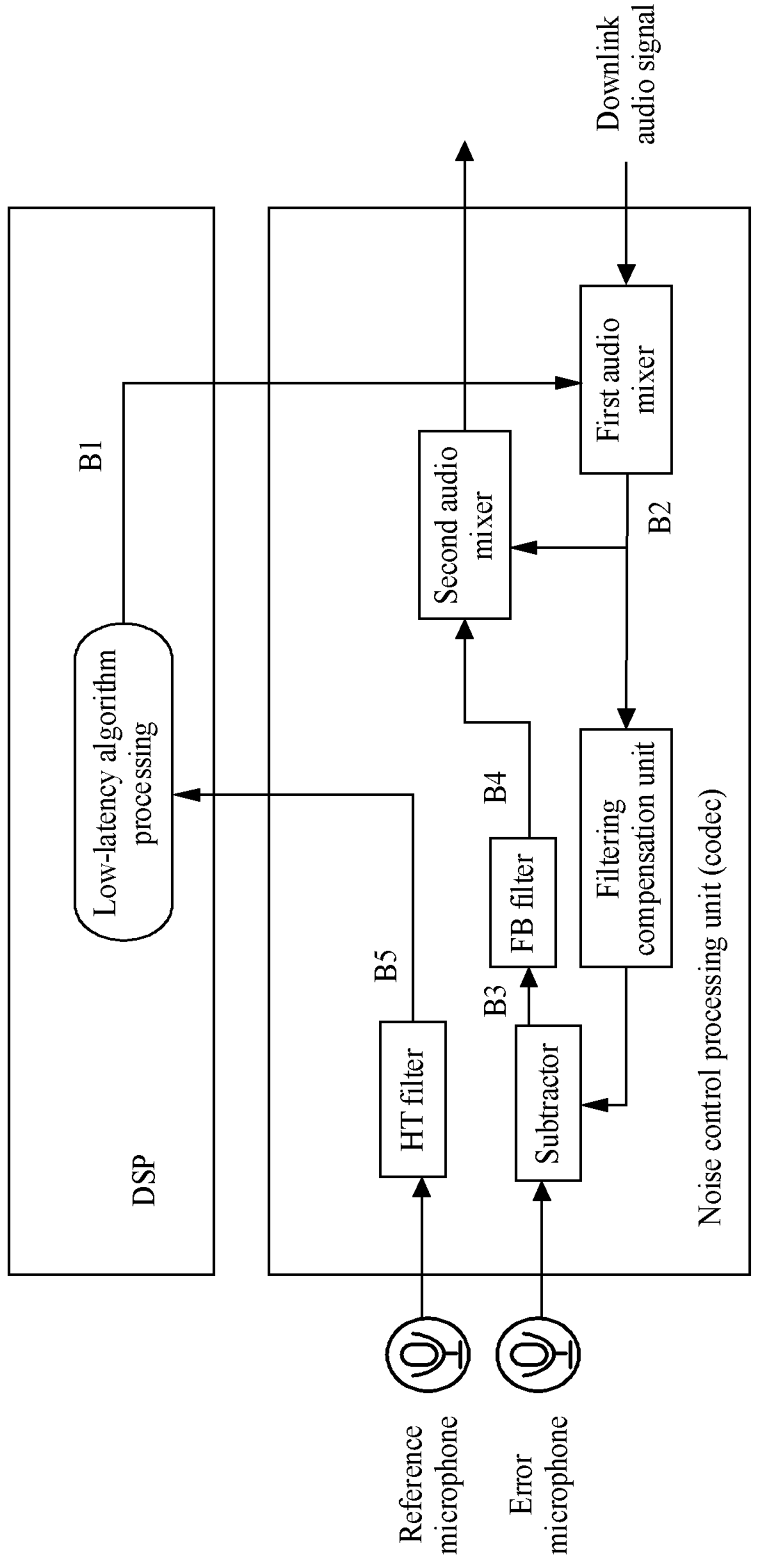
FIG. 6B is a schematic flowchart of HT processing according to an embodiment of this application.
Figure 6C:
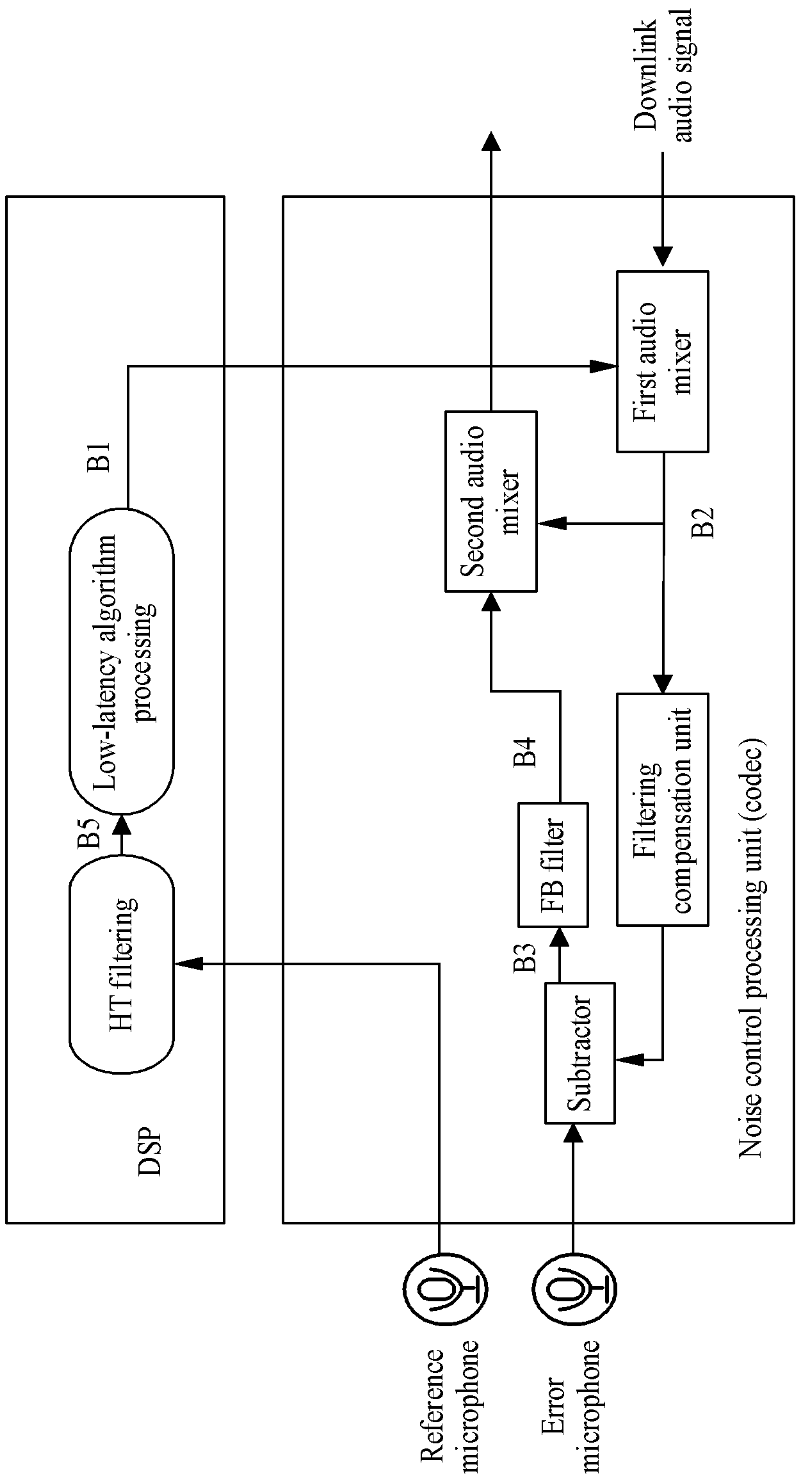
FIG. 6C is a schematic flowchart of another HT processing according to an embodiment of this application.

FIG. 6A, FIG. 6B, and FIG. 6C are schematic flowcharts of ambient sound hear through processing. For example, the downlink audio signal sent by the terminal device 100 to the headset 200 is referred to as a first audio signal in subsequent descriptions. The first audio signal may be a call signal, a music signal, or the like. For example, the signal collected by the reference microphone is referred to as the first signal, and the signal collected by the error microphone is referred to as the second signal. The left earphone or the right earphone in the headset 200 may perform processing in FIG. 6A, FIG. 6B, or FIG. 6C in the case of the control of the user.

S601: Perform first signal processing on the first signal collected by the reference microphone to obtain a first processed signal. In FIG. 6B and FIG. 6C, the first processed signal is referred to as a signal B 1. The first signal processing includes HT filtering.

S602: Perform audio mixing processing on the first processed signal and the first audio signal to obtain a fifth audio signal. In FIG. 6B and FIG. 6C, the fifth audio signal is referred to as a signal B2.

In other words, audio mixing processing is performed on the signal B1 and the downlink audio signal (namely, the first audio signal) to obtain the signal B2.

S603: Filter out the fifth audio signal included in the second signal to obtain a second filtered signal. In FIG. 6B and FIG. 6C, the second filtered signal is referred to as a signal B3. In other words, the signal B2 included in the second ambient signal is filtered out to obtain the signal B3.

Optionally, before the fifth audio signal included in the second signal is filtered out, filtering compensation processing may also be performed on the fifth audio signal, to reduce an auditory perception loss.

S604: Perform FB filtering on the second filtered signal to obtain a third filtered signal. In FIG. 6B and FIG. 6C, the third filtered signal is referred to as a signal B4. In other words, FB filtering is performed on the signal B3 to obtain the signal B4.

S605: Perform audio mixing processing on the third filtered signal and the fifth audio signal to obtain the second audio signal. In other words, audio mixing processing is performed on the signal B4 and the signal B2 to obtain the second audio signal.

In an example, first signal processing may be performed on the first signal collected by the reference microphone to obtain the first processed signal in the following manner.

HT filtering processing is performed on the first signal to obtain a second filtering signal. In FIG. 6B and FIG. 6C, the second filtering signal is referred to as a signal B5. Further, second signal processing is performed on the second filtering signal to obtain a second processed signal. The second signal processing may also be referred to as low-delay algorithm processing or HT enhancement processing. The low-delay algorithm processing includes one or more of unblocking effect processing, background noise control processing, wind noise control processing, gain adjustment processing, or frequency response adjustment processing. The low-delay algorithm processing is further performed on a signal obtained through HT filtering. This reduces background noise and an abnormal sound, and improves user auditory perception.

In a possible manner, HT filtering processing may be implemented by a noise control processing unit, as shown in FIG. 6B. For example, the noise control processing unit of the headset includes a CODEC. The CODEC includes an HT filter, an FB filter, a subtractor, a first audio mixer, a second audio mixer, and a filtering compensation unit. FIG. 6B illustrates an example in which the noise control processing unit further includes a DSP. The DSP may be configured to perform low-delay algorithm processing. The reference microphone in the headset 200 picks up the first signal, and inputs the first signal to the HT filter for HT filtering processing to obtain the signal B5. The signal B5 is input to the DSP. The DSP performs low-delay algorithm processing on the signal B5 to obtain the signal B 1. The signal B1 is input to the first audio mixer. The first audio mixer performs audio mixing processing on the downlink audio signal and the signal B1 to obtain the signal B2. The signal B2 on which filtering compensation is performed by the filtering compensation unit is input to the subtractor. The subtractor is configured to filter out the signal B2 that is included in the second ambient signal picked up by the error microphone and on which filtering compensation processing is performed, to obtain the signal B3. The signal B3 is input to the FB filter. The FB filter performs FB filtering processing on the signal B3 to obtain the signal B4. The signal B4 is input to the second audio mixer. In addition, an input to the second audio mixer further includes the signal B2. The second audio mixer performs audio mixing processing on the signal B2 and the signal B4 to obtain the second audio signal. The second audio signal is input to the speaker for playing.

In another possible manner, HT filtering processing may be implemented by the DSP, as shown in FIG. 6C. The DSP may be configured to perform HT filtering processing and low-delay algorithm processing. The noise control processing unit of the headset includes an FB filter, a subtractor, a first audio mixer, a second audio mixer, and a filtering compensation unit. The reference microphone in the headset picks up the first signal, and inputs the first signal to the DSP. The DSP performs HT filtering processing and low-delay algorithm processing on the first signal to obtain the signal B 1. The signal B1 is input to the first audio mixer. The first audio mixer performs audio mixing processing on the downlink audio signal and the signal B1 to obtain the signal B2. The signal B2 on which filtering compensation is performed by the filtering compensation unit is input to the subtractor. The subtractor is configured to filter out the signal B2 included in the second signal picked up by the error microphone, to obtain the signal B3. The signal B3 is input to the FB filter. The FB filter performs FB filtering processing on the signal B3 to obtain the signal B4. The signal B4 is input to the second audio mixer. In addition, an input to the second audio mixer further includes the signal B2. The second audio mixer performs audio mixing processing on the signal B2 and the signal B4 to obtain the second audio signal. The second audio signal is input to the speaker for playing.

In an example, the low-latency algorithm processing includes unblocking effect processing. Before the unblocking effect processing method is introduced, a generation principle of blocking effect is described first. There are two ways to perceive voice of a headset wearer: 1. A signal is conducted from the bone to the periosteum for perception. The signal is only a low-frequency signal. 2: A signal is propagated from the external air to the periosteum for perception. The signal includes a low-frequency signal and a medium-high-frequency signal. After the low-frequency signal and the medium-high-frequency signal are superimposed, the low-frequency signal is too large, and the low-frequency signal cannot be transmitted when the headset is worn. As a result, the low-frequency signal is chaotic in the ear, causing the blocking effect.

The unblocking effect processing is performed on the signal B5 obtained through the HT filtering processing. Specifically, the following manners may be used.

Figure 7:
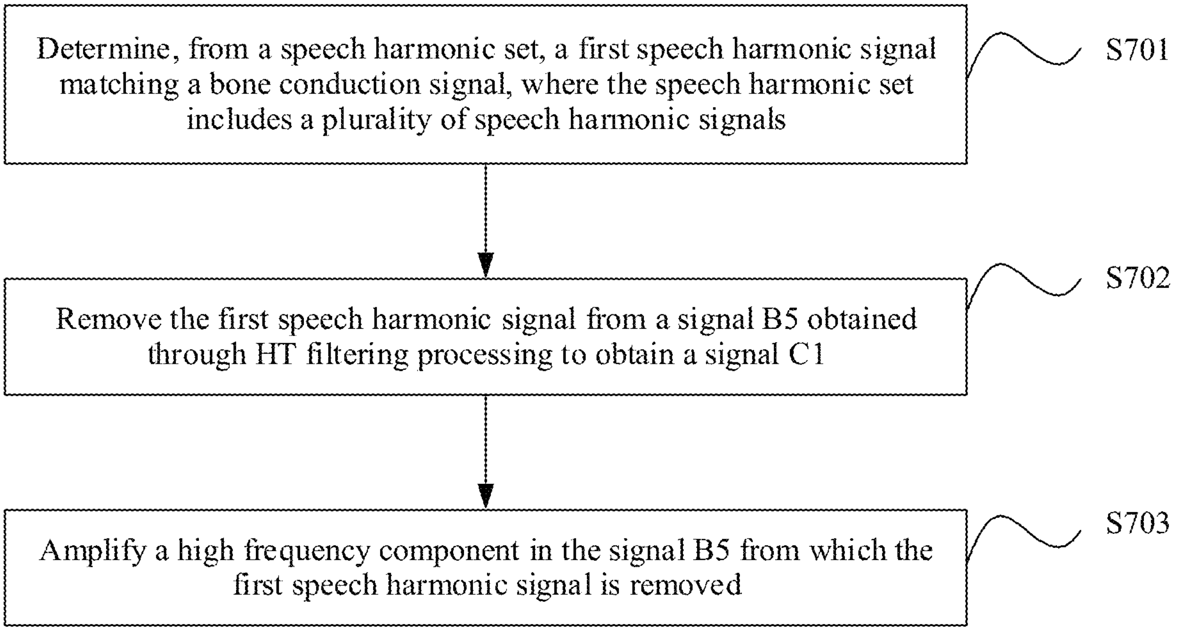
FIG. 7 is a schematic flowchart of unblocking effect processing according to an embodiment of this application.

Manner 1: Refer to FIG. 7.

S701: Determine, from a speech harmonic set, a first speech harmonic signal matching a bone conduction signal, where the speech harmonic set includes a plurality of speech harmonic signals. The plurality of speech harmonic signals included in the speech harmonic set correspond to different frequencies. Further, a frequency of the bone conduction signal may be determined, and a first speech harmonic signal is determined from the speech harmonic set based on the frequency of the bone conduction signal. The speech harmonic signal may also be referred to as a speech harmonic component.

S702: Remove the first speech harmonic signal from the signal B5 obtained through the HT filtering processing. For example, the first speech harmonic signal in the signal B5 obtained through the HT filtering processing is removed to obtain a signal C1. Generally, human voice collected by the bone conduction sensor is a low-frequency harmonic component. Therefore, in S702, the low-frequency harmonic component is removed from the signal B5, to obtain the signal C1 that includes no low-frequency harmonic component.

S703: Amplify a high frequency component in the signal B5 from which the first speech harmonic signal is removed. In other words, the high frequency component in the signal C1 is amplified.

The first speech harmonic signal matching the bone conduction signal can be determined in the speech harmonic set. In other words, the bone conduction sensor can detect the bone conduction signal, indicating that the headset wearer is currently making a sound, for example, speaking or singing. A signal obtained by amplifying the high frequency component based on the signal C1 includes only a medium-high-frequency component, so that the signal heard by the headset wearer has no blocking effect.

The speech harmonic set may be pre-stored in the headset. In an example, the speech harmonic set may be obtained in an offline manner or in an online manner.

When the speech harmonic set is obtained in the offline manner, bone conduction signals of multiple persons may be collected by the bone conduction sensor. The following processing is performed for the bone conduction signal of each person. Using a first bone conduction signal as an example, Fast Fourier Transform (FFT) is performed on the first bone conduction signal to obtain a frequency domain signal. A fundamental frequency signal in the frequency domain signal is determined by searching for a fundamental frequency by using a pilot. A harmonic component of the bone conduction signal is determined based on the fundamental frequency signal. In this case, a mapping relationship between frequencies and harmonic components of the bone conduction signals is obtained, and the speech harmonic set is obtained. The speech harmonic set may include a mapping relationship between different frequencies and different harmonic components.

When the speech harmonic set is obtained in the online manner, a second bone conduction signal may be collected within specified duration by the bone conduction sensor in the headset. Within the specified duration, the headset may be used by multiple persons, or may be used by only one person, namely, the user. The following processing is performed for the second bone conduction signal.

FFT is performed on the second bone conduction signal to obtain a frequency domain signal; and a fundamental frequency signal in the frequency domain signal is determined by searching for a fundamental frequency by using a pilot. If the headset is used by multiple persons within the specified duration, a plurality of fundamental frequency signals respectively corresponding to a plurality of different time periods within the specified duration may be determined. A plurality of harmonic components of the bone conduction signal may be determined based on the plurality of fundamental frequency signals. In this case, a mapping relationship between frequencies and harmonic components is obtained, and the speech harmonic set is obtained. The speech harmonic set may include a mapping relationship between different frequencies and different harmonic components.

Manner 2: Adaptive filtering processing may be performed on the signal B5 obtained through the HT filtering processing, to remove a low frequency component from the signal B5 to obtain the signal C1, namely, to remove a sound signal of the headset wearer from the signal B5. A high frequency component in the third filtering signal from which the low frequency component is removed is amplified. In other words, the high frequency component in the signal C1 is amplified. A signal obtained by amplifying the high frequency component based on the signal C1 includes only a medium-high-frequency component, so that the signal heard by the headset wearer has no blocking effect.

In a possible implementation, HT effect may be determined by a processing strength of HT processing. The processing strength of HT processing depends on an HT filtering coefficient used for HT filtering and/or an FB filtering coefficient used for FB filtering.

For the HT filtering coefficient, in one manner, a default HT filtering coefficient in the HT mode may be used. In another manner, an HT filtering coefficient used when the HT mode is selected last time may be used. In still another manner, the headset determines, based on an identified scene, the HT filtering coefficient used in the HT mode. In further still another manner, the user indicates, to the headset by using a UI control provided by the terminal device, the HT filtering coefficient used in the HT mode. For example, the user selects, by using the UI control provided by the terminal device, the processing strength in the HT mode as a target processing strength. Different processing strengths correspond to different HT filtering coefficients. For the FB filtering coefficient, in one manner, a default FB filtering coefficient in the HT mode may be used. In another manner, an FB filtering coefficient used when the HT mode is selected last time may be used. In still another manner, the headset determines the FB filtering coefficient based on an identified scene. In further still another manner, the user indicates, to the headset by using the UI control provided by the terminal device, the HT filtering coefficient used in the HT mode. For example, the user selects, by using the UI control provided by the terminal device, the processing strength in the HT mode as a target processing strength. Different processing strengths correspond to different FB filtering coefficients.

In the HT mode, the HT filtering coefficient and the FB filtering coefficient may be obtained in any combination of the foregoing provided manners.

Third, the following describes in detail a processing procedure of the augment hearing path.

Figure 8A:
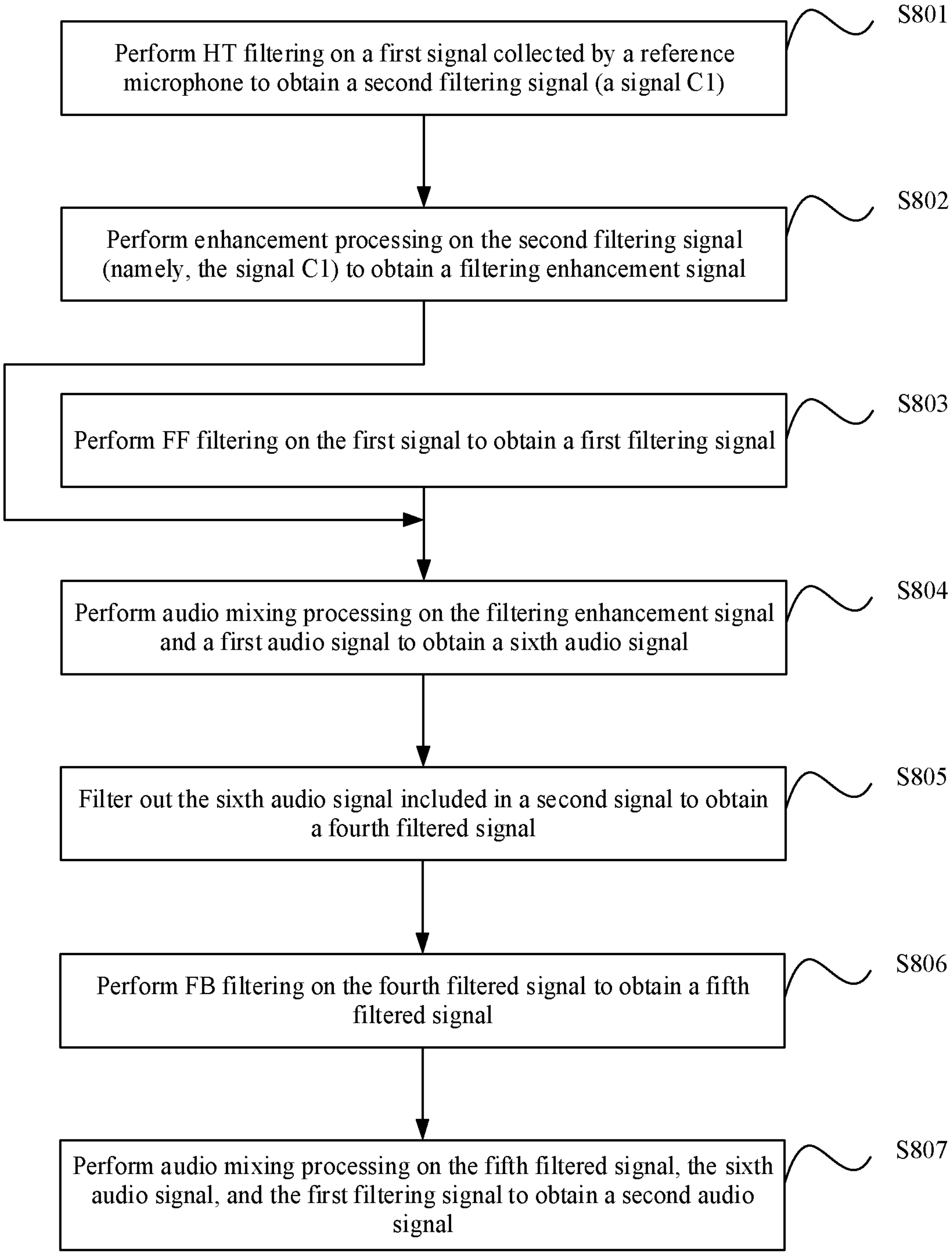
FIG. 8A is a flowchart of AH processing according to an embodiment of this application.
Figure 8B:
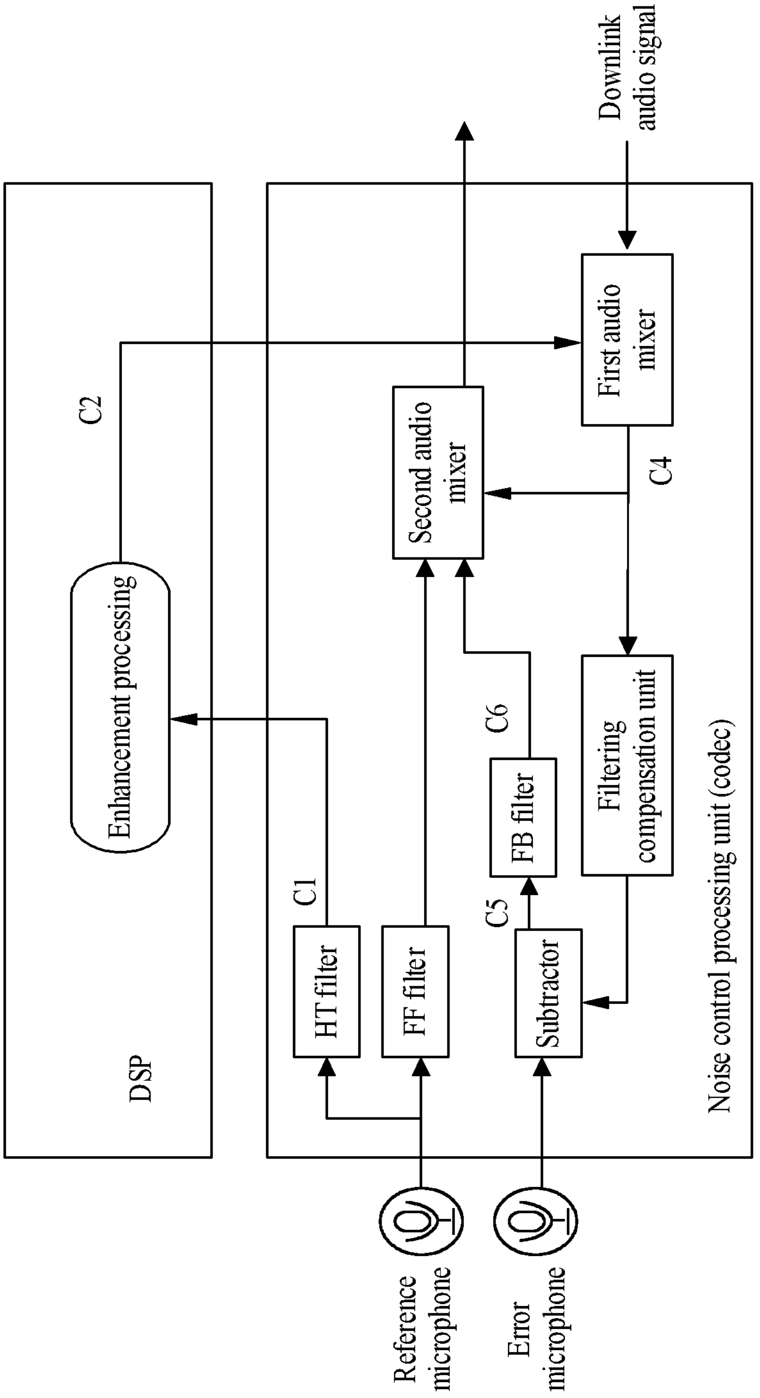
FIG. 8B is a schematic flowchart of AH processing according to an embodiment of this application.
Figure 8C:
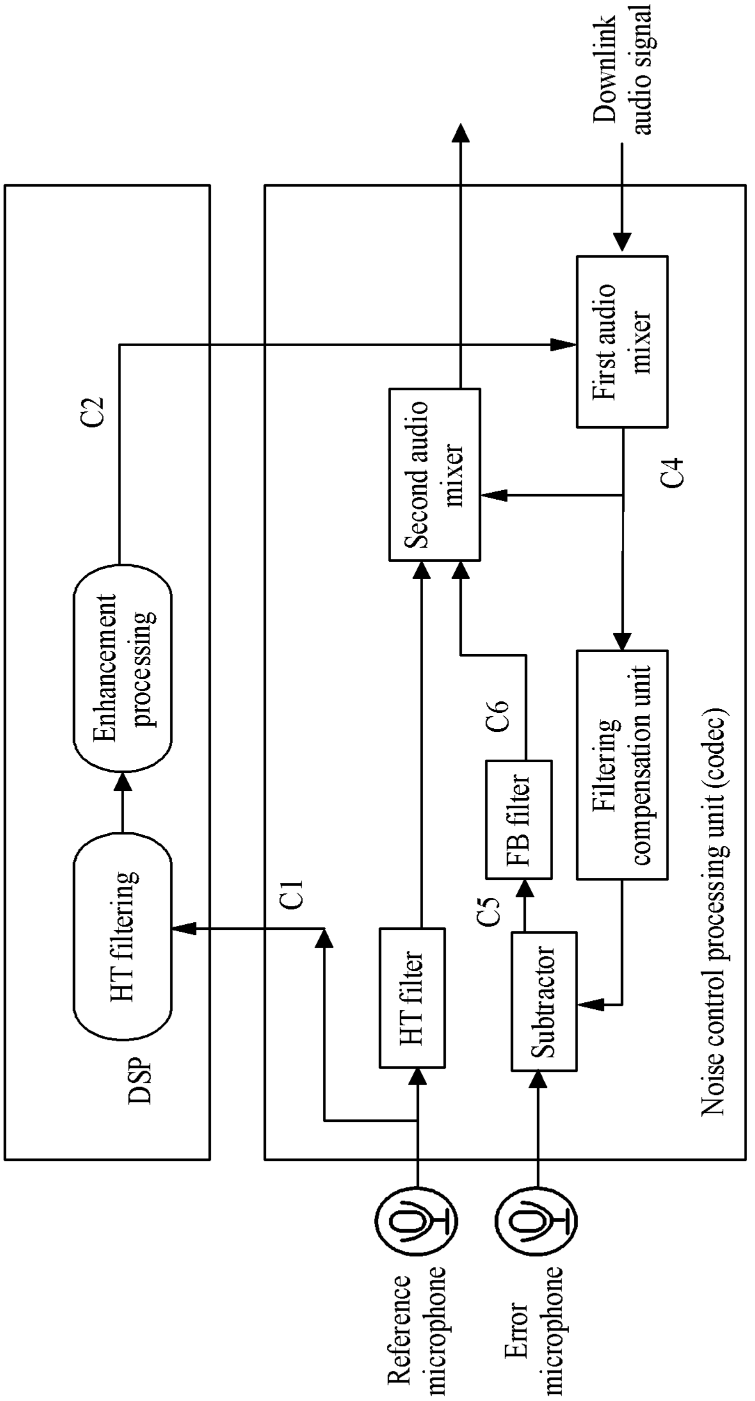
FIG. 8C is a schematic flowchart of another AH processing according to an embodiment of this application.

FIG. 8A, FIG. 8B, and FIG. 8C are schematic flowcharts of augment hearing processing. For example, the downlink audio signal sent by the terminal device 100 to the headset 110 is referred to as a first audio signal in subsequent descriptions. The first audio signal may be a call signal, a music signal, an alert sound, or the like. For example, the signal collected by the reference microphone is referred to as the first signal, and the signal collected by the error microphone is referred to as the second signal. The left earphone or the right earphone in the headset 200 may perform processing in FIG. 8A, FIG. 8B, or FIG. 8C in the case of the control of the user.

S801: Perform HT filtering on the first signal collected by the reference microphone to obtain a second filtering signal (a signal C1). In FIG. 8B and FIG. 8C, the second filtering signal is referred to as the signal C1.

S802: Perform enhancement processing on the second filtering signal (namely, the signal C1) to obtain a filtering enhancement signal. In FIG. 8B and FIG. 8C, the filtering enhancement signal is briefly referred to as a signal C2.

S803: Perform FF filtering on the first signal to obtain a first filtering signal. In FIG. 8B and FIG. 8C, the first filtering signal is briefly referred to as a signal C3.

S804: Perform audio mixing processing on the filtering enhancement signal and the first audio signal to obtain a sixth audio signal. In FIG. 8B and FIG. 8C, the sixth audio signal is briefly referred to as a signal C4. In other words, in step S804, audio mixing processing is performed on the signal C2 and the downlink audio signal to obtain the signal C4.

S805: Filter out the sixth audio signal included in the second signal to obtain a fourth filtered signal. In FIG. 8B and FIG. 8C, the fourth filtered signal is briefly referred to as a signal C5. In other words, in step S805, the signal C4 included in the second ambient signal is filtered out to obtain the signal C5.

In an example, when step S805 is performed, filtering compensation processing may be first performed on the signal C4 to obtain a compensated signal, and then the compensated signal included in the second signal is filtered out to obtain the signal C5.

S806: Perform FB filtering on the fourth filtered signal to obtain a fifth filtered signal.

In FIG. 8B and FIG. 8C, the fifth filtered signal is briefly referred to as a signal C6. In other words, in step S806, FB filtering is performed on the signal C5 to obtain the signal C6.

S807: Perform audio mixing processing on the fifth filtered signal, the sixth audio signal, and the first filtering signal to obtain the second audio signal. In other words, in step S806, audio mixing processing is performed on the signal C6, the signal C4, and the signal C3 to obtain the second audio signal.

In a possible implementation, enhancement processing may be performed on the second filtering signal (namely, the signal C1) to obtain the filtering enhancement signal (the signal C2) in the following manner 1 or manner 2.

Figure 9:
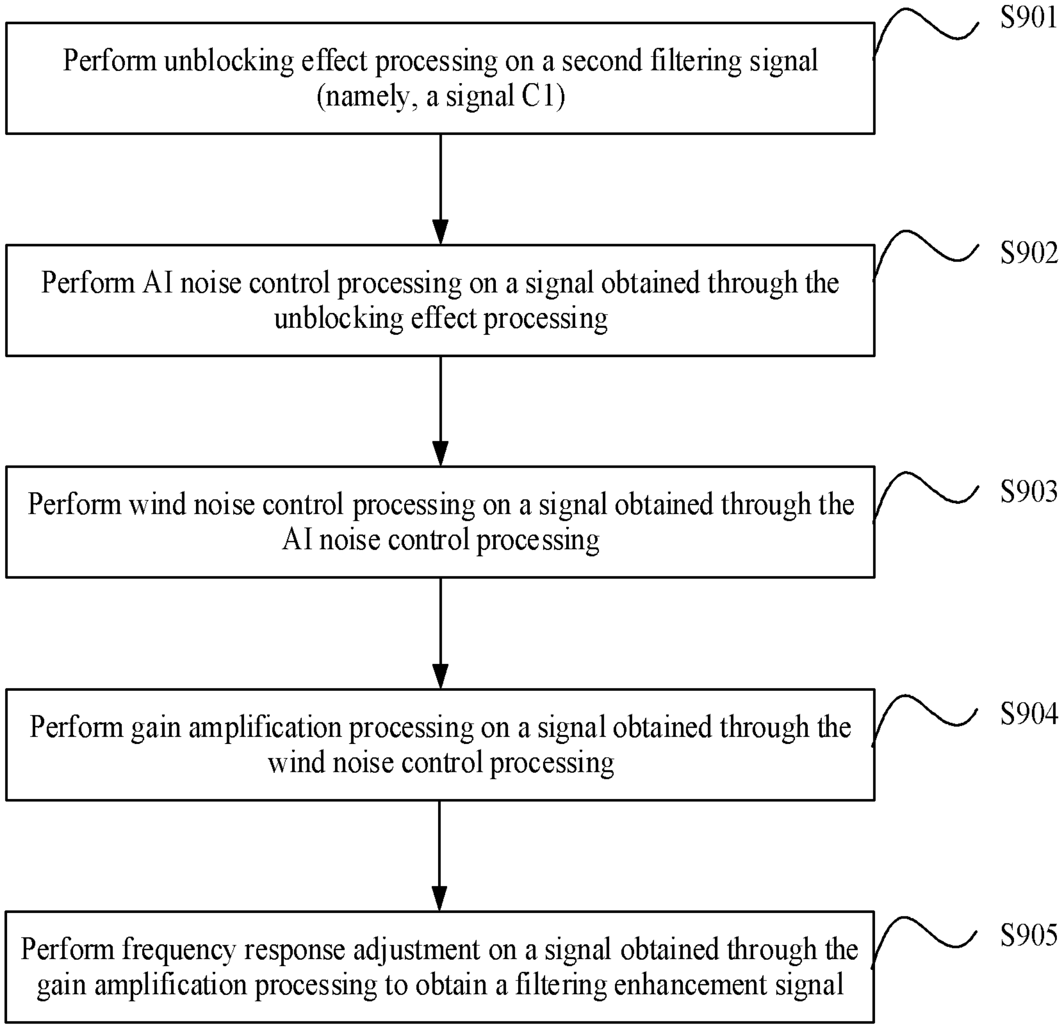
FIG. 9 is a schematic flowchart of noise control processing according to an embodiment of this application.

Manner 1: Refer to FIG. 9.

S901: Perform unblocking effect processing on the second filtering signal (namely, the signal C1).

A manner of performing the unblocking effect processing on the signal C1 may be the same as the manner of performing the unblocking effect processing on the signal B5. For details, refer to manner 1 and manner 2 in the scene 2. Details are not described herein again.

Then, noise control processing is performed on the signal obtained through the unblocking effect processing. The noise control processing includes artificial intelligence AI noise control processing and/or wind noise control processing. In FIG. 9, for example, the noise control processing includes AI noise control processing and wind noise control processing.

S902: Perform AI noise control processing on the signal obtained through the unblocking effect processing.

S903: Perform wind noise control processing on a signal obtained through the AI noise control processing.

S904: Perform gain amplification processing on a signal obtained through the wind noise control processing.

S905: Perform frequency response adjustment on a signal obtained through the gain amplification processing to obtain the filtering enhancement signal.

Figure 10:
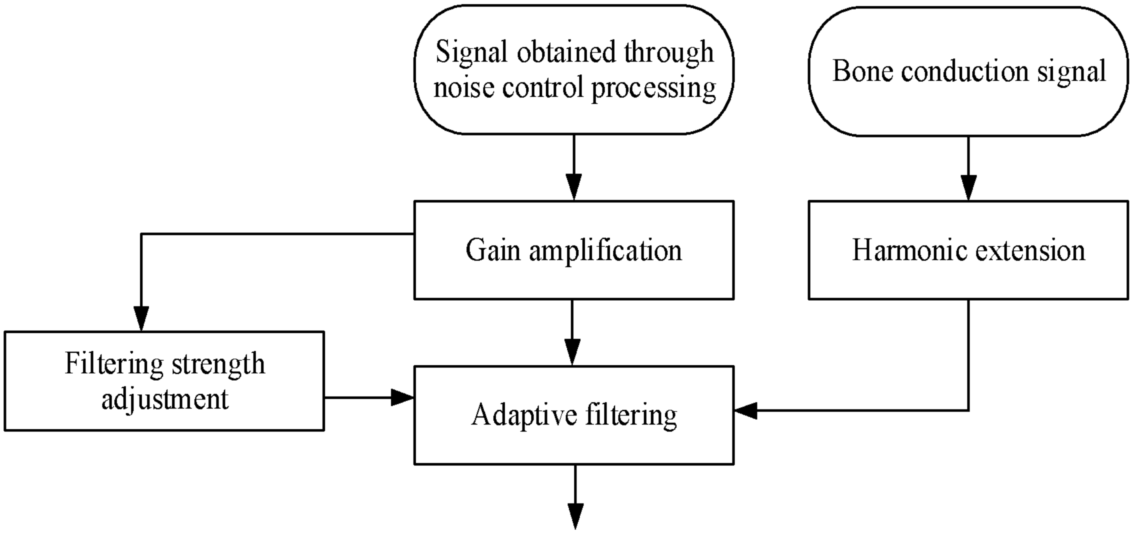
FIG. 10 is a schematic flowchart of gain amplification processing according to an embodiment of this application.

In the foregoing S904, a feasible manner of performing gain amplification processing on the signal obtained through the wind noise processing is to directly amplify the signal obtained through the wind noise processing. In the manner of directly amplifying the signal, an external signal is amplified, and a voice of a wearer is also amplified. This embodiment of this application provides a gain amplification processing manner in which only the external signal is amplified and a voice signal of the wearer is not amplified. For example, as shown in FIG. 10, when gain amplification processing is performed on the signal obtained through the noise control processing, the following manner may be used for implementation.

The voice signal of the wearer is conducted to the periosteum through the bone, and the voice signal is concentrated at a low frequency, and is denoted as a bone conduction signal D1. The bone conduction signal D1 is collected by a bone conduction sensor.

1. Harmonic extension is performed on the bone conduction signal D1 to obtain a harmonic extension signal. For example, the harmonic extension signal is referred to as a signal D2. For example, the harmonic extension may be a harmonic enhancement method or a method of directly upward extending a harmonic wave of the bone conduction signal D1.

2. Amplification processing is performed, based on a first gain coefficient (gain), on the signal obtained through the noise control processing. For ease of description, the signal obtained through the noise control processing is referred to as a signal D3. Amplification processing is performed on the signal D3 based on the first gain coefficient to obtain a signal D4. The amplification processing herein may be direct amplification of the signal. A value of the first gain coefficient may be related to a value of a processing strength of AH processing. For example, a mapping relationship between the first gain coefficient and the value of the processing strength of AH processing is stored in the headset.

3. The harmonic extension signal included in the signal obtained through the amplification processing is filtered out based on a first filtering coefficient to obtain a signal D5. The signal D2 included in the signal D4 is filtered out based on the first filtering coefficient in an adaptive filtering manner. In this case, the signal D5 is a signal in which the voice of the wearer is filtered out. The first filtering coefficient is determined based on the first gain coefficient. The first gain coefficient (gain) is used to adjust an adaptive filtering strength, and may also be referred to as a first filtering coefficient. In other words, a quantity of decibels (dBs) in which the signal is amplified based on the first gain coefficient is the same as a quantity of dBs in which filtering is performed through adaptive filtering, so that the voice signal of the wearer can be balanced, and is not amplified or reduced.

Figure 11:
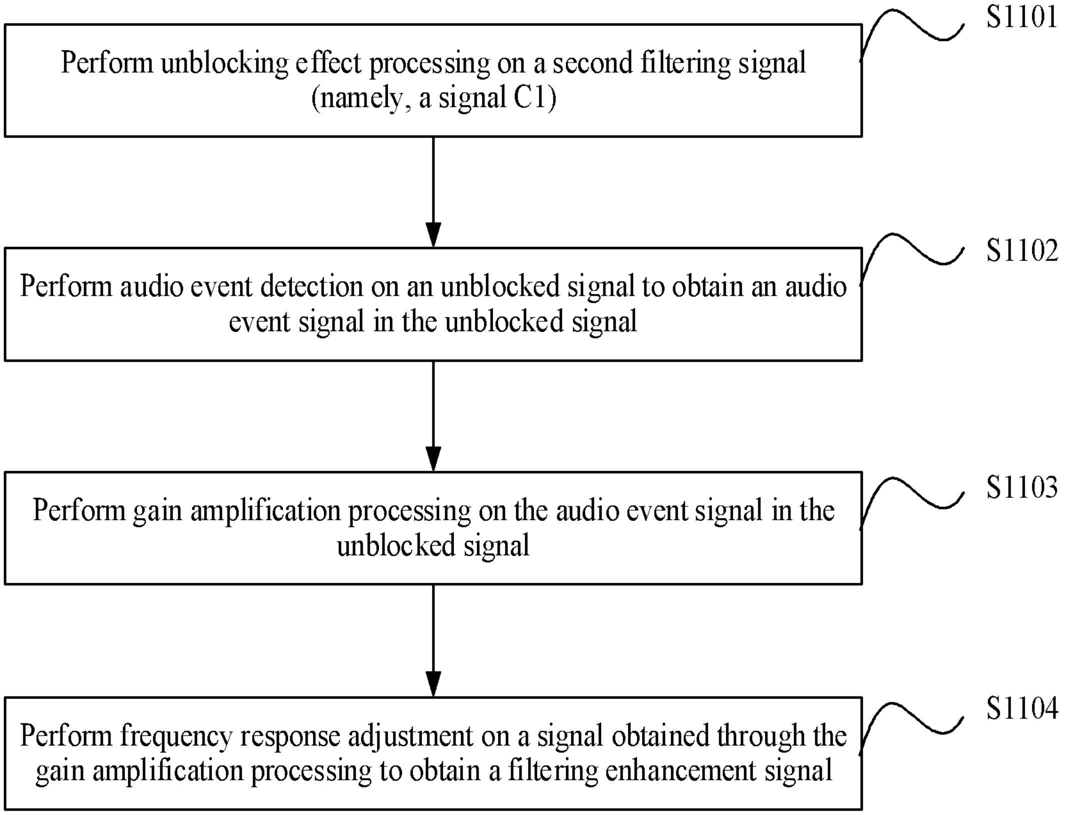
FIG. 11 is a schematic flowchart of another gain amplification processing according to an embodiment of this application.

Manner 2: Refer to FIG. 11.

S1101: Perform unblocking effect processing on the second filtering signal (namely, the signal C1) to obtain an unblocked signal.

A manner of performing the unblocking effect processing on the signal C1 may be the same as the manner of performing the unblocking effect processing on the signal B5. For details, refer to manner 1 and manner 2 in the scene 2. Details are not described herein again.

S1102: Perform audio event detection on the unblocked signal to obtain an audio event signal (which may be briefly referred to as an event signal) in the unblocked signal. The audio event signal is, for example, a station reporting sound and a horn sound.

S1103: Perform gain amplification processing on the audio event signal in the unblocked signal.

The gain amplification processing is performed on the audio event signal in the unblocked signal, for example, the station reporting sound and the horn sound, so that the headset wearer can clearly hear the station reporting sound or the horn sound.

S1104: Perform frequency response adjustment on a signal obtained through the gain amplification processing to obtain the filtering enhancement signal.

In manner 2, a manner of performing the gain amplification processing on the audio event signal in the unblocked signal may be the same as the manner of performing the gain amplification processing on the signal obtained through the noise control processing. Details are not described herein again.

In a possible manner, as shown in FIG. 8B, for example, the noise control processing unit includes a CODEC and a DSP. The CODEC of the headset includes an HT filter, an FB filter, an FF filter, a subtractor, a first audio mixer, a second audio mixer, and a filtering compensation unit. HT filtering processing is performed by the CODEC. The DSP may be configured to perform enhancement processing. The reference microphone in the headset 110 picks up the first signal, and inputs the first signal to the HT filter for HT filtering processing to obtain the signal C1. The signal C1 is input to the DSP. The DSP performs enhancement processing on the signal C1 to obtain a signal C2. The signal C2 is input to the first audio mixer. The first audio mixer performs audio mixing processing on the downlink audio signal and the signal C2 to obtain a signal C4. The signal C4 on which filtering compensation is performed by the filtering compensation unit is input to the subtractor. The subtractor is configured to filter out the signal C4 that is included in the second ambient signal picked up by the error microphone and on which filtering compensation is performed, to obtain a signal C5. The signal C5 is input to the FB filter. The FB filter performs FB filtering processing on the signal C5 to obtain a signal C6. The signal C6 is input to the second audio mixer. In addition, an input to the second audio mixer further includes the signal C4 and the signal C3. The second audio mixer performs audio mixing processing on the signal C3, the signal C4, and the signal C6 to obtain the second audio signal. The second audio signal is input to the speaker for playing.

In another possible manner, as shown in FIG. 8C, for example, the noise control processing unit includes a CODEC and a DSP. The DSP may be configured to perform HT filtering processing and enhancement processing. The CODEC of the headset includes an FB filter, an FF filter, a subtractor, a first audio mixer, a second audio mixer, and a filtering compensation unit. The reference microphone in the headset 110 picks up the first signal, and inputs the first signal to the DSP. The DSP performs HT filtering processing on the first signal to obtain a signal C1. The DSP performs enhancement processing on the signal C1 to obtain a signal C2. The signal C2 is input to the first audio mixer. The first audio mixer performs audio mixing processing on the downlink audio signal and the signal C2 to obtain a signal C4. The signal C4 on which filtering compensation is performed by the filtering compensation unit is input to the subtractor. The subtractor is configured to filter out the signal C4 that is included in the second ambient signal picked up by the error microphone and on which filtering compensation is performed, to obtain a signal C5. The signal C5 is input to the FB filter. The FB filter performs FB filtering processing on the signal C5 to obtain a signal C6. The signal C6 is input to the second audio mixer. In addition, an input to the second audio mixer further includes the signal C4 and the signal C3. The second audio mixer performs audio mixing processing on the signal C3, the signal C4, and the signal C6 to obtain the second audio signal. The second audio signal is input to the speaker for playing.

In a possible implementation, AH effect may be determined by a processing strength of AH processing. The processing strength of AH processing depends on at least one of an HT filtering coefficient, an FB filtering coefficient, or an FF filtering coefficient.

For the FF filtering coefficient, in one manner, a default FF filtering coefficient in the AH mode may be used. In another manner, an FF filtering coefficient used when the AH mode is selected last time may be used. In still another manner, the headset determines, based on an identified scene, the FF filtering coefficient used in the AH mode. In further still another manner, the user indicates, to the headset by using a UI control provided by the terminal device, the FF filtering coefficient used in the AH mode. For example, the user selects, by using the UI control provided by the terminal device, the processing strength in the AH mode as a target processing strength. Different processing strengths correspond to different FF filtering coefficients. For the HT filtering coefficient, in one manner, a default HT filtering coefficient in the AH mode may be used. In another manner, an HT filtering coefficient used when the AH mode is selected last time may be used. In still another manner, the headset determines, based on an identified scene, the HT filtering coefficient used in the AH mode. In further still another manner, the user indicates, to the headset by using a UI control provided by the terminal device, the HT filtering coefficient used in the AH mode. For example, the user selects, by using the UI control provided by the terminal device, the processing strength in the AH mode as a target processing strength. Different processing strengths correspond to different HT filtering coefficients. For the FB filtering coefficient, in one manner, a default FB filtering coefficient in the AH mode may be used. In another manner, an FB filtering coefficient used when the AH mode is selected last time may be used. In still another manner, the headset determines the FB filtering coefficient based on an identified scene. In further still another manner, the user indicates, to the headset by using the UI control provided by the terminal device, the HT filtering coefficient used in the AH mode. For example, the user selects, by using the UI control provided by the terminal device, the processing strength in the AH mode as a target processing strength. Different processing strengths correspond to different FB filtering coefficients.

In the AH mode, the HT filtering coefficient, the FB filtering coefficient, or the FF filtering coefficient may be obtained in any combination of the foregoing provided manners.

A processing mode of the headset 200 (including the left earphone and the right earphone) may be determined by the user by using the UI control on the terminal device 100 and indicated to the headset, or may be determined by the terminal device based on an adaptively identified scene and indicated to the headset, or may be determined by the headset based on an adaptively identified scene.

The following describes examples of a manner of determining the processing mode of the headset.

Example 1: A single control controls the left earphone and the right earphone.

The terminal device 100 provides a control interface for a user to select a processing mode of the headset 200 (including the left earphone and the right earphone) based on a requirement. The processing mode includes a null mode, an ANC mode, an HT mode, or an AH mode. In the null mode, no processing is performed. It should be understood that all processing modes of the headset that are in the control interface and that are selected by the user are processing modes supported by the headset. In example 1, the left earphone and the right earphone have a same processing function, or support a same processing mode. For example, both the left earphone and the right earphone support AHA. For example, a headset application adapted to the headset 200 is installed on the terminal device. In an adaptation process, a processing function of the headset can be learned. For another example, in a communication process in which the headset 200 establishes a connection to the terminal device, a function parameter is transmitted to the terminal device, so that the terminal device can determine, based on the function parameter, a processing function of the headset.

For example, the user selects the ANC mode. The control interface includes the UI control. The UI control is used for the user to select the processing mode of the headset 200. For ease of distinguishing, the UI control used for the user to select the processing mode of the headset is referred to as a selection control. The processing mode includes at least two of the ANC mode, the HT mode, or the AH mode. The terminal device 100 separately sends a control signal 1 to the left earphone and the right earphone in response to a user operation of selecting, by using the selection control, a target mode from the processing modes supported by the headset. The control signal 1 carries the target mode. The selection control may also be used to select a processing strength in the target mode. The selection control may be in a ring shape, a bar shape, or another shape. The selection control may include a first control and a second control. Any two different positions of the second control on the first control correspond to different processing modes of the headset, or two different positions of the second control on the first control correspond to different processing strengths in a same processing mode of the headset. The user selects different processing modes and controls processing strengths by moving a position that is of the second control representing the user selection and that is on the first control of a display.

In a possible implementation, a headset APP is used to control the processing modes of the left earphone and the right earphone.

Figure 12A:
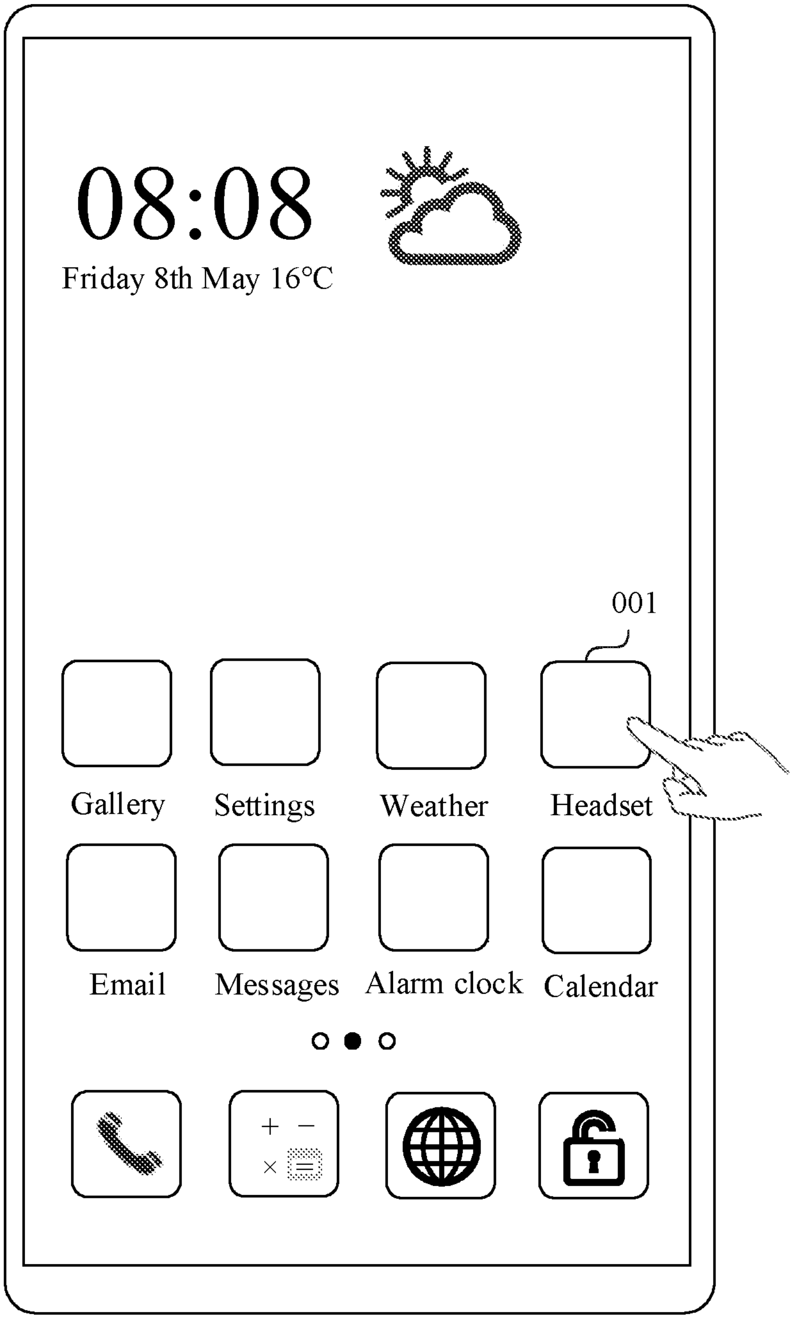
FIG. 12A is a schematic diagram of a home screen of a terminal device according to an embodiment of this application.

The terminal device 100 includes a headset control application that is used to control the headset and that is briefly referred to as a headset application. For example, refer to a home screen of the terminal device shown in FIG. 12A. After the headset is connected to the terminal device, when the user taps an icon 001 of the headset APP on a desktop, the terminal device may start the headset application in response to the user operation of tapping the icon 001 and display a control interface of the headset application on the display, or pop up the control interface of the headset application when the headset application is started.

Figure 12B:
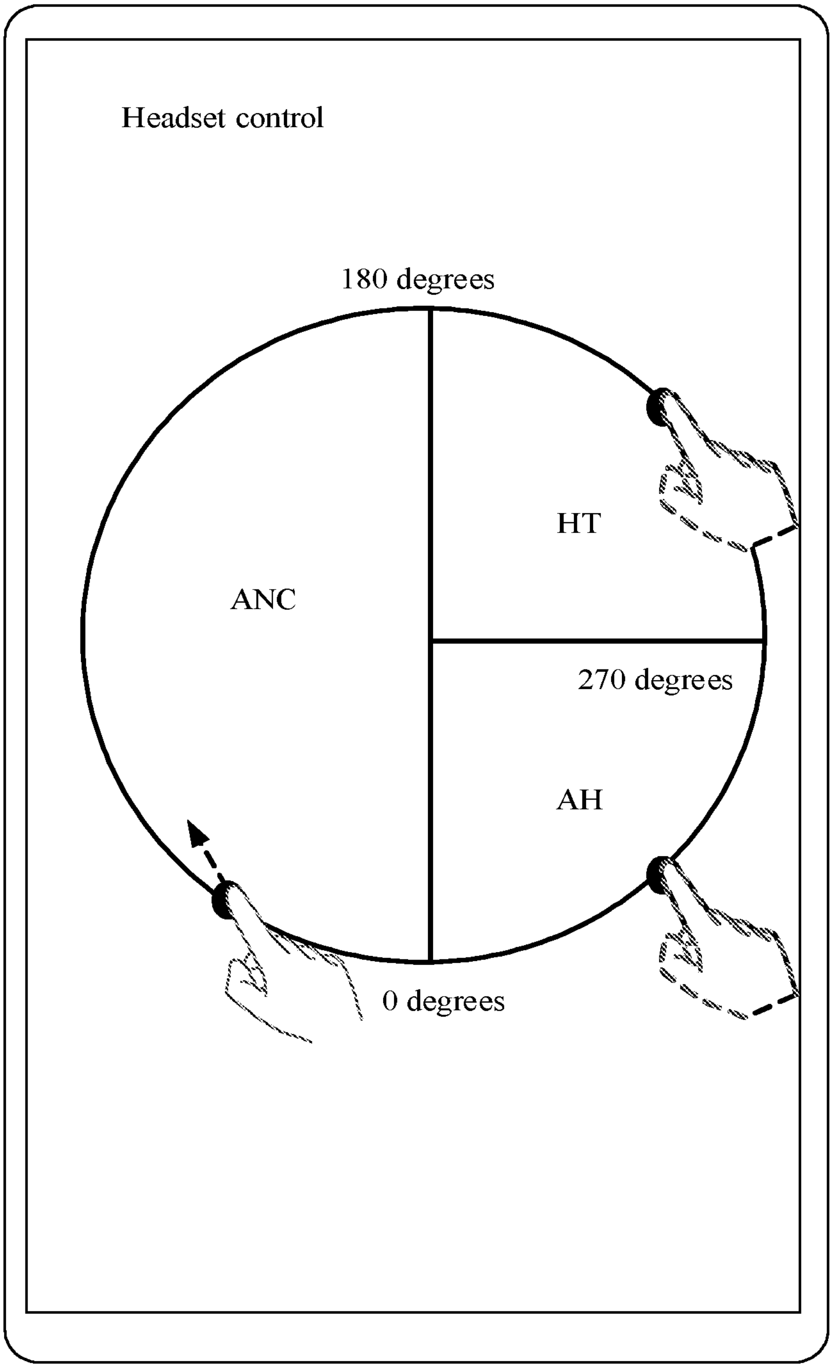
FIG. 12B is a schematic diagram of a control interface of a headset application according to an embodiment of this application.

For example, as shown in FIG. 12B, the selection control is in a ring shape. In FIG. 12B, for example, both the left earphone and the right earphone support the ANC mode, the HT mode, and the AH mode. A first control in the ring-shaped selection control in FIG. 12B includes three arc segments, separately corresponding to the ANC mode, the HT mode, and the AH mode. If the second control is located on the arc segment of the ANC mode, it is determined that the ANC mode is used. Different positions of the second control on the arc segment of the ANC mode correspond to different processing strengths in the ANC mode. If the second control is located on the arc segment of the HT mode, it is determined that the HT mode is used. Different positions of the second control on the arc segment of the HT mode correspond to different processing strengths in the HT mode. If the second control is located on the arc segment of the AH mode, it is determined that the AH mode is used. Different positions of the second control on the arc segment of the AH mode correspond to different processing strengths in the AH mode.

A highlighted black dot on the ring (or the circumference) represents the second control by using which the user selects the processing strength. The user may select different processing modes and control the processing strengths by moving the position of the black dot on the circumference. The terminal device 100 (for example, a processor) responds to an operation 1 performed by the user in the control interface. For example, the operation 1 is generated when the user moves the position that is of the second control representing the user selection and that is on the second control of the display. The terminal device 100 separately sends a control instruction 1 to the left earphone and the right earphone. The control instruction 1 indicates the target mode and the target processing strength. In FIG. 12B, the target mode is the ANC mode.

In an example, the control instruction 1 may include an ANC identifier and a parameter value indicating the target processing strength of ANC processing. In the ANC mode, different processing strengths (namely, different values of the processing strengths) correspond to different FB filtering coefficients and/or FF filtering coefficients.

In another example, the control instruction 1 includes a radian. A corresponding processing mode may be determined based on a range of the radian. Different radian values correspond to the processing strength in the processing mode. As shown in FIG. 12B, a processing mode corresponding to (0, 180] is the ANC mode, a processing mode corresponding to (180, 270] is the HT mode, and a processing mode corresponding to (270, 360] is the AH mode. The left earphone and the right earphone may include a mapping relationship between radian ranges and processing modes, and a mapping relationship between radian values and filtering coefficients. In an example of the ANC mode, different radian values correspond to different FB filtering coefficients and FF filtering coefficients.

FIG. 12B is used as an example. The user may touch and hold the black dot in a disk, and rotate the black dot clockwise from 0 degrees to 360 degrees. Based on the FF filtering coefficient and the FB filtering coefficient corresponding to 0 degrees, ANC effect is strongest. In other words, user perception of the sound in the current user environment and the ambient sound in the ear canal of the user are weakened. After the rotation, the FF filtering coefficient and the FB filtering coefficient change. As a result, the active noise control effect is weakened gradually. At 180 degrees, the active noise control effect is weakest. This is similar to that no noise control is performed after the headset is worn. From 180 degrees to 270 degrees, ambient sound hear through is controlled. The user touches and holds the black dot in the disk, and rotates clockwise from 180 degrees to 270 degrees. Based on the HT filtering coefficient and the FB filtering coefficient corresponding to 180 degrees, ambient sound hear through effect is weakest. In other words, user perception of the sound in the current user environment is weakened. This is similar to that the null mode is used after the headset is worn. After the clockwise rotation, the HT filtering coefficient and the FB filtering coefficient change, so that the ambient sound hear through effect is improved. From 270 degrees to 360 degrees, augment hearing is controlled. The user touches and holds the black dot in the disk. Based on the FF filtering coefficient, the HT filtering coefficient, and the FB filtering coefficient corresponding to 180 degrees, augment hearing effect is weakest. In other words, user perception of the event sound included in the ambient sound in the current user environment is weakened. After the clockwise rotation, the FF filtering coefficient, the HT filtering coefficient, and the FB filtering coefficient change. This improves the augment hearing effect. In other words, the event signal that the user expects to hear becomes stronger. This facilitates hearing.

For example, the terminal device 100 is connected to the left earphone and the right earphone by using Bluetooth.

Figure 12C:
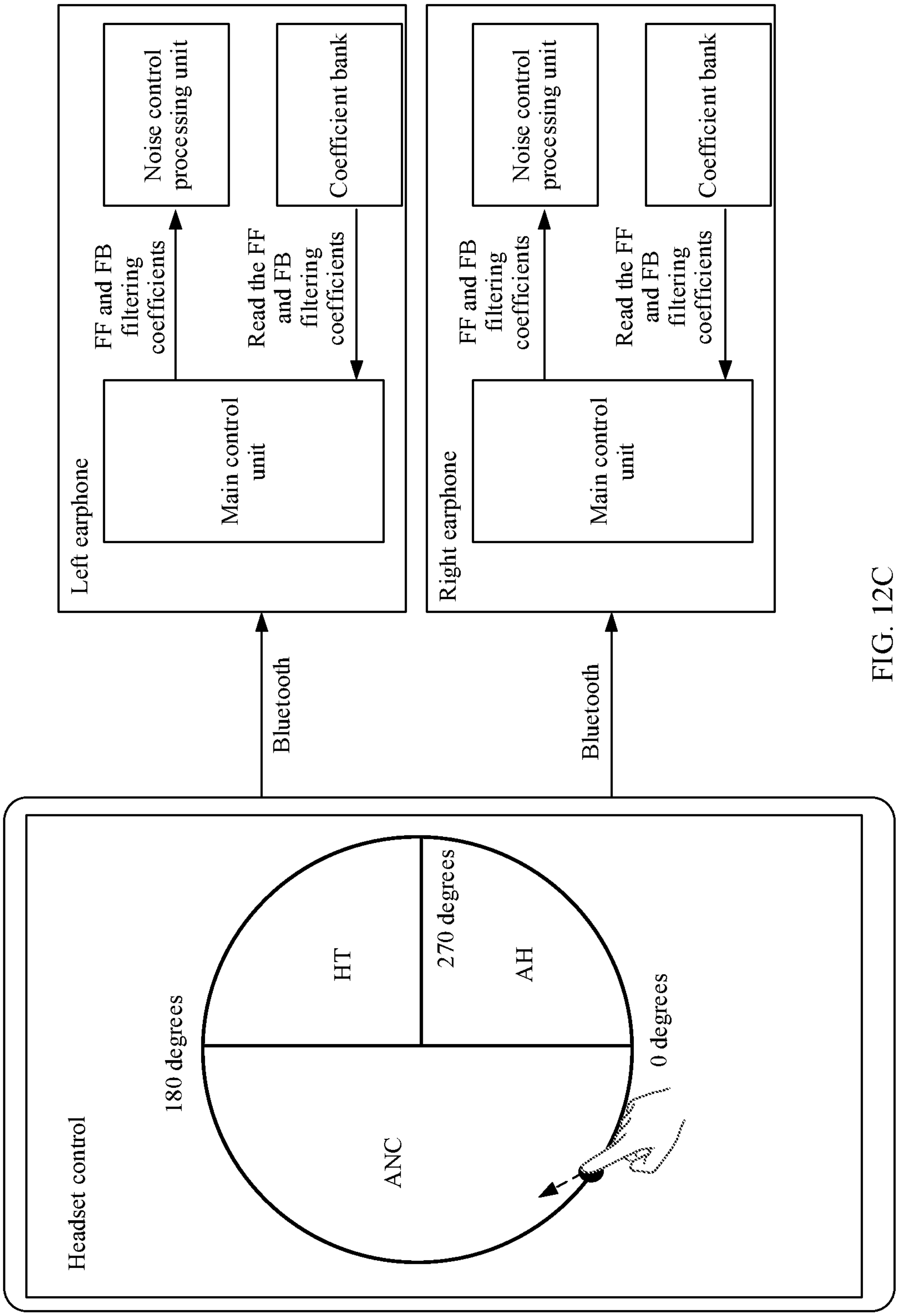
FIG. 12C is a schematic control diagram in which a terminal device controls a headset in an ANC mode according to an embodiment of this application.

For example, the ANC mode is selected. As shown in FIG. 12C, the terminal device 100 separately sends the control instruction 1 to the left earphone and the right earphone by using Bluetooth in response to the operation 1 of the user. The control instruction 1 may include the ANC identifier and the parameter value of the target processing strength. The left earphone and the right earphone perform similar operations after receiving the control instruction 1. Processing of the left earphone is used as an example in subsequent descriptions. After receiving the control instruction 1, the main control unit of the left earphone obtains the FF filtering coefficient and the FB filtering coefficient of ANC processing from a coefficient bank based on the ANC identifier and the target processing strength.

For example, the coefficient bank includes a mapping relationship shown in Table 1. Table 1 is merely an example, and constitutes a specific limitation on the mapping relationship. For example, the parameter value of the target processing strength is a strength 1. The main control unit of the left earphone obtains an FF filtering coefficient FF1 and an FB filtering coefficient FB1 corresponding to the strength 1 according to Table 1. The main control unit controls the FF filter to perform, based on the coefficient FF1, FF filtering processing on the first signal collected by the reference microphone, to obtain the signal A1. The main control unit controls the FB filter to perform FB filtering processing on the signal A3 based on the coefficient FB1, to obtain the second audio signal. Specifically, the main control unit writes the coefficient FF1 and the coefficient FB1 into an AHA kernel, so that the AHA kernel executes steps S501 to S504 to obtain the second audio signal.

TABLE 1

| Processing mode | Processing strength parameter value | FF filtering coefficient | FB filtering coefficient | HT filtering coefficient |
|---|---|---|---|---|
| ANC | Strength 1 | Coefficient FF1 | Coefficient FB1 | |
| | Strength 2 | Coefficient FF2 | Coefficient FB2 | |
| | Strength 3 | Coefficient FF3 | Coefficient FB3 | |
| | Strength 4 | Coefficient FF4 | Coefficient FB4 | |
| HT | Strength 5 | NA | Coefficient FB5 | Coefficient HT1 |
| | Strength 6 | NA | Coefficient FB6 | Coefficient HT2 |
| AH | Strength 7 | Coefficient FF5 | Coefficient FB7 | Coefficient HT3 |
| | Strength 8 | Coefficient FF6 | Coefficient FB8 | Coefficient HT4 |

Figure 12D:
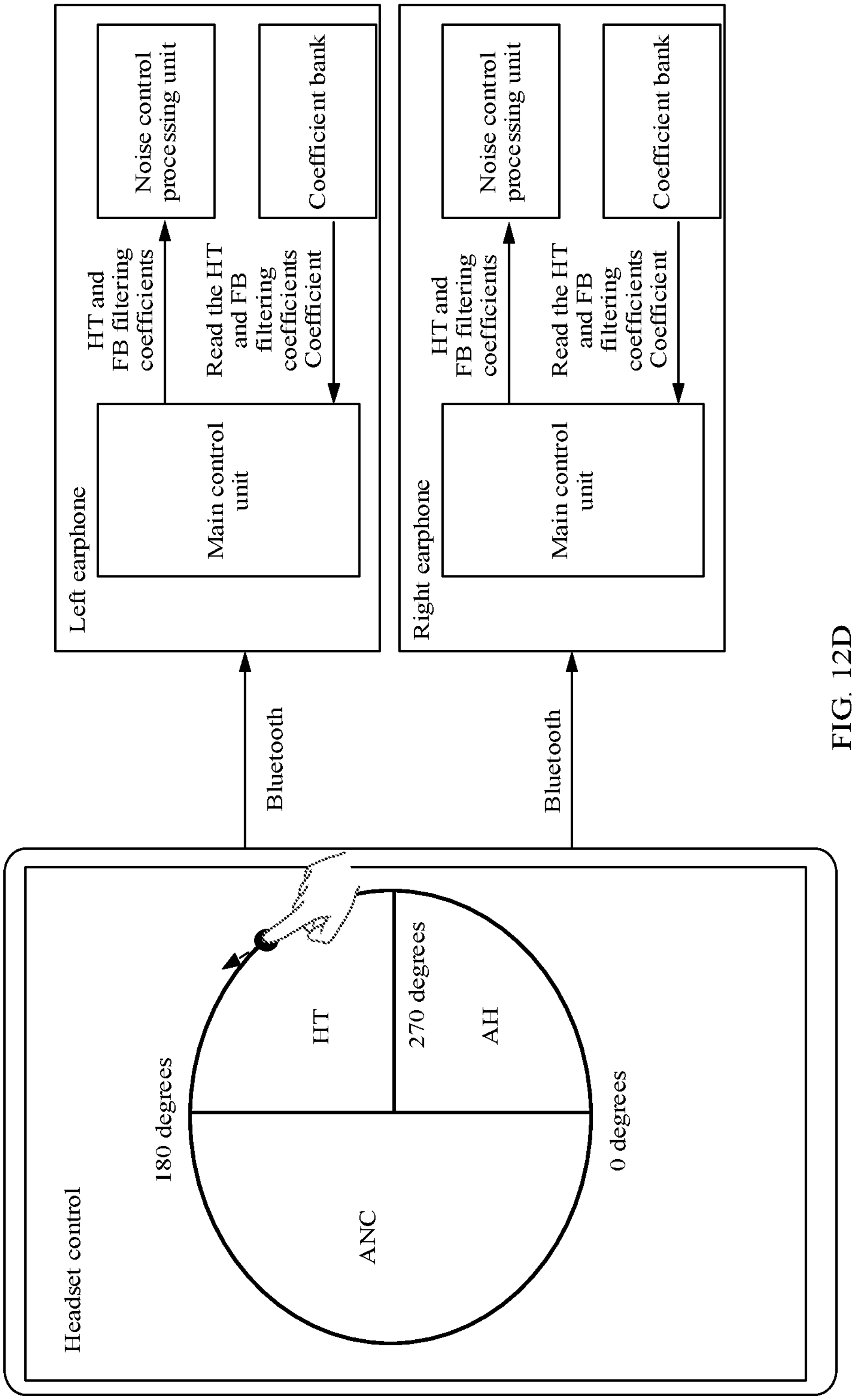
FIG. 12D is a schematic control diagram in which a terminal device controls a headset in an HT mode according to an embodiment of this application.

For example, the HT mode is selected. As shown in FIG. 12D, the terminal device 100 separately sends the control instruction 1 to the left earphone and the right earphone by using Bluetooth in response to the operation 1 of the user. The control instruction 1 may include an HT identifier and a target processing strength. The target processing strength indicates a processing strength of HT processing. The left earphone and the right earphone perform similar operations after receiving the control instruction 1. Processing of the left earphone is used as an example in subsequent descriptions. After receiving the control instruction 1, the main control unit of the left earphone obtains the HT filtering coefficient and/or the FB filtering coefficient of HT processing from the coefficient bank based on the HT identifier and the target processing strength.

Table 1 is used as an example, a value of the target processing strength is a strength 5. The main control unit of the left earphone obtains an HT filtering coefficient HT1 and an FB filtering coefficient FB5 corresponding to the strength 5 according to Table 1. The main control unit controls the HT filter to perform, based on the coefficient HT1, HT filtering processing on the first signal collected by the reference microphone. The main control unit controls the FB filter to perform FB filtering processing on the signal B3 based on the coefficient FB5. Specifically, the main control unit writes the coefficient HT1 and the coefficient FB5 into the AHA kernel, so that the AHA kernel executes steps S601 to S605 to obtain the second audio signal.

Figure 12E:
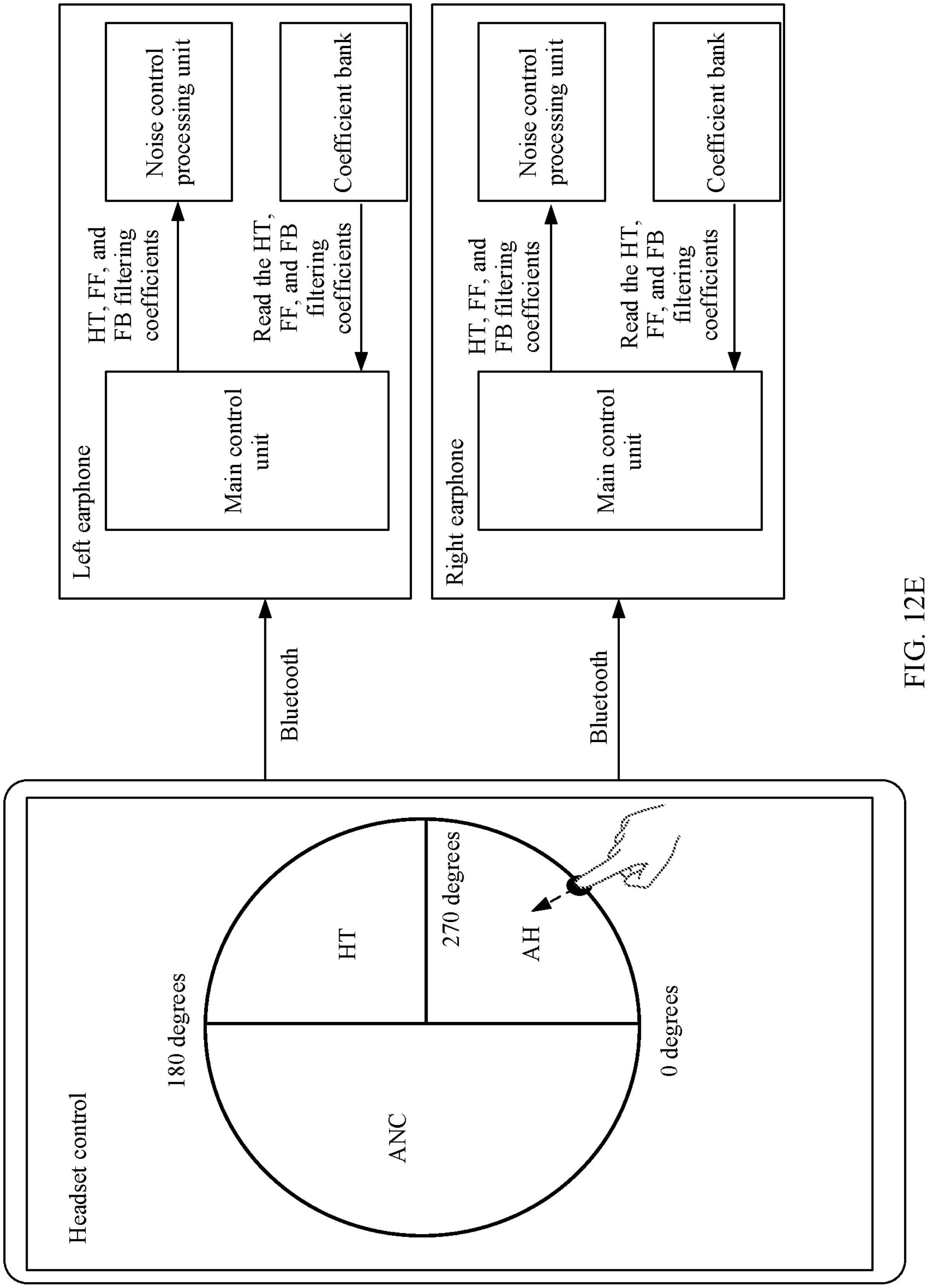
FIG. 12E is a schematic control diagram in which a terminal device controls a headset in an AH mode according to an embodiment of this application.

For example, the AH mode is selected. As shown in FIG. 12E, the terminal device 100 separately sends the control instruction 1 to the left earphone and the right earphone by using Bluetooth in response to the operation 1 of the user. The control instruction 1 may include the AH identifier and the parameter value of the target processing strength. The left earphone and the right earphone perform similar operations after receiving the control instruction 1. Processing of the left earphone is used as an example in subsequent descriptions. After receiving the control instruction 1, the main control unit of the left earphone obtains the HT filtering coefficient, the FF filtering coefficient, and the FB filtering coefficient of AH processing from the coefficient bank based on the HT identifier and the target processing strength.

Table 1 is used as an example. A value of the target processing strength is an indication 7. The main control unit of the left earphone obtains an HT filtering coefficient HT3, an FB filtering coefficient FB7, and an FF filtering coefficient FF5 corresponding to the indication 7 according to Table 1. The main control unit controls the HT filter to perform, based on the coefficient HT3, HT filtering processing on the first signal collected by the reference microphone. The main control unit controls the FB filter to perform FB filtering processing on the signal C5 based on the coefficient FB7. The main control unit controls the FF filter to perform FF filtering processing on the first signal based on the coefficient FF5. Specifically, the main control unit writes the coefficient HT3, the coefficient FB7, and the coefficient FF5 into the AHA kernel, so that the AHA kernel executes steps S801 to S807 to obtain the second audio signal.

Figure 12F:
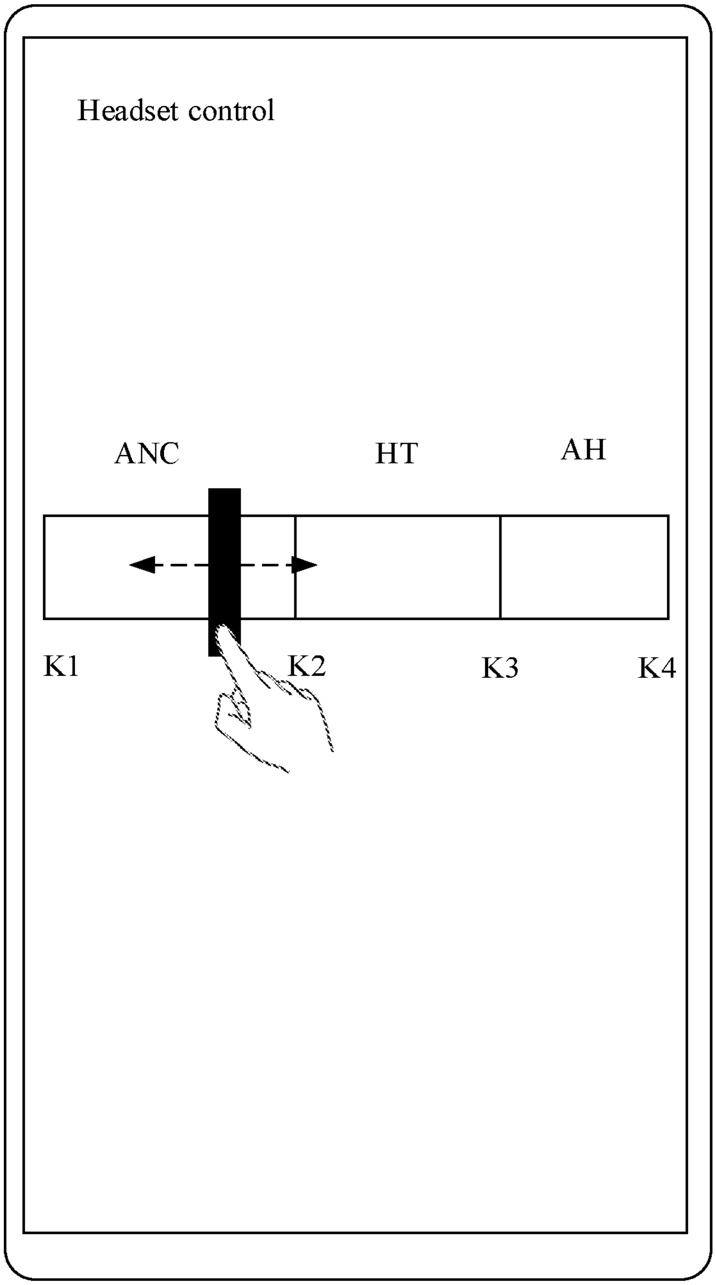
FIG. 12F is a schematic diagram of a selection control according to an embodiment of this application.

For example, as shown in FIG. 12F, the selection control may be in a bar shape. The selection control includes a first control and a second control. The bar of the first control may be divided into a plurality of bar segments based on a quantity of the processing modes supported by the headset. The second control on different bar segments of the first control indicates different processing modes. Different positions of the second control on a same bar segment of the first control indicate different processing strengths in a same processing mode. In FIG. 12F, for example, both the left earphone and the right earphone support AHA. The bar of the first control includes three bar segments.

FIG. 12F is used as an example. The user may touch and hold the black bar, and slide the black bar leftward or rightward. Based on the FF filtering coefficient and the FB filtering coefficient corresponding to the black bar located at a position K1, ANC effect is strongest. When the black bar slides rightward, the FF filtering coefficient and the FB filtering coefficient change, so that the active noise control effect gradually decreases. At a position K2, the active noise control effect is weakest. This is similar to that no noise control processing is performed after the headset is worn. In a region between the position K2 and a position K3, ambient sound hear through is controlled. The user touches and holds the black bar, and moves the black bar from the position K2 to the position K3. Based on the HT filtering coefficient and the FB filtering coefficient corresponding to the black bar at the position K2, ambient sound hear through effect is weakest. When the black bar is moved to the position K3, the HT filtering coefficient and the FB filtering coefficient change, so that the ambient sound hear through effect is improved. From the position K3 to a position K4, augment hearing is controlled. The user touches and holds the black bar, and moves the black bar from the position K3 to the position K4. Based on the FF filtering coefficient, the HT filtering coefficient, and the FB filtering coefficient corresponding to the black bar at the position K3, augment hearing effect is weakest. When the black bar is moved from the position K3 to the position K4, the FF filtering coefficient, the HT filtering coefficient, and the FB filtering coefficient change, so that the augment hearing effect is improved. In other words, the voice signal that the user expects to hear becomes stronger. This facilitates hearing.

Figure 12G:
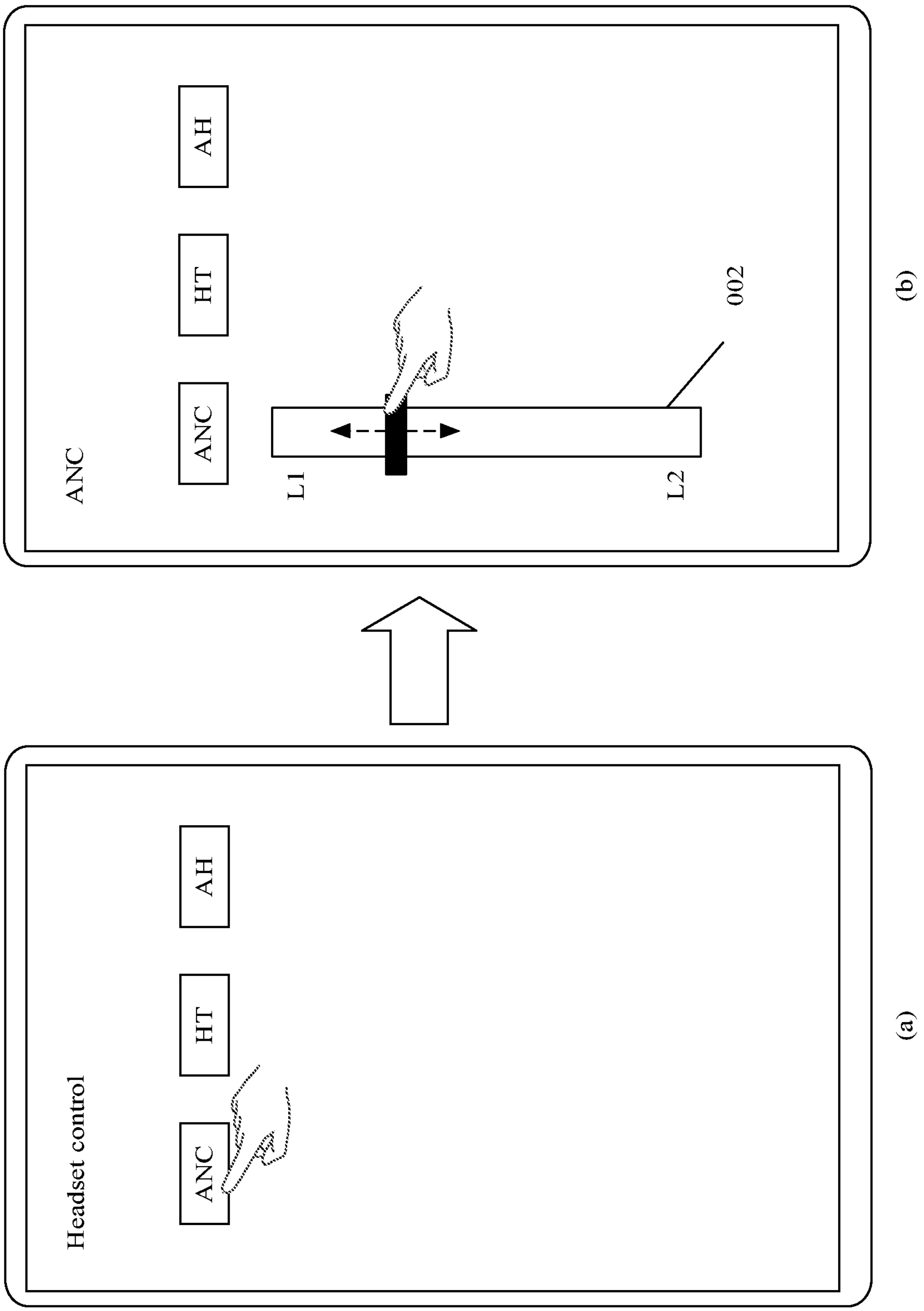
FIG. 12G is a schematic diagram of another selection control according to an embodiment of this application.

For example, as shown in FIG. 12G, the selection control in (a) includes buttons corresponding to different processing modes, including an ANC button, an HT button, and an AH button. The ANC mode is used as an example. The terminal device 100 displays a display interface in (b) in FIG. 12G in response to a user operation of tapping the ANC button. The display interface in (b) includes a control 002 used to select a processing strength. The user may touch and hold the black bar, and slide the black bar up and down, to determine a processing strength of ANC processing, namely, to select the corresponding FF filtering coefficient and the corresponding FB filtering coefficient. The black bar slides in a region L1-L2. Based on the FF filtering coefficient and the FB filtering coefficient corresponding to the black bar located at a position L1, ANC effect is strongest. When the black bar slides downward, the FF filtering coefficient and the FB filtering coefficient change such that the active noise control effect gradually decreases. At a position L2, the active noise control effect is weakest. This is similar to that no noise control processing is performed after the headset is worn.

In another possible implementation, when the headset 200 establishes a connection to the terminal device, the headset APP may be triggered, and the control interface including the selection control is displayed, for example, the control interface shown in FIG. 12A, FIG. 12B, FIG. 12F, or FIG. 12G.

For example, an interface displayed by the terminal device is an interface 1. When the terminal device identifies that the headset 200 establishes a connection to the terminal device, the interface 1 is switched to the control interface.

In still another possible implementation, after the headset establishes a connection to the terminal device, when triggering the headset to play audio, the terminal device may trigger the headset APP, and display the control interface including the selection control, for example, the display interface shown in FIG. 12A, FIG. 12B, FIG. 12C, or FIG. 12D. For example, when triggering the headset to play audio, the terminal device may play a song after establishing a connection to the headset, and may display the control interface including the selection control. For another example, after establishing a connection to the headset, the terminal device plays a video, and may display the control interface including the selection control.

Figure 12H:
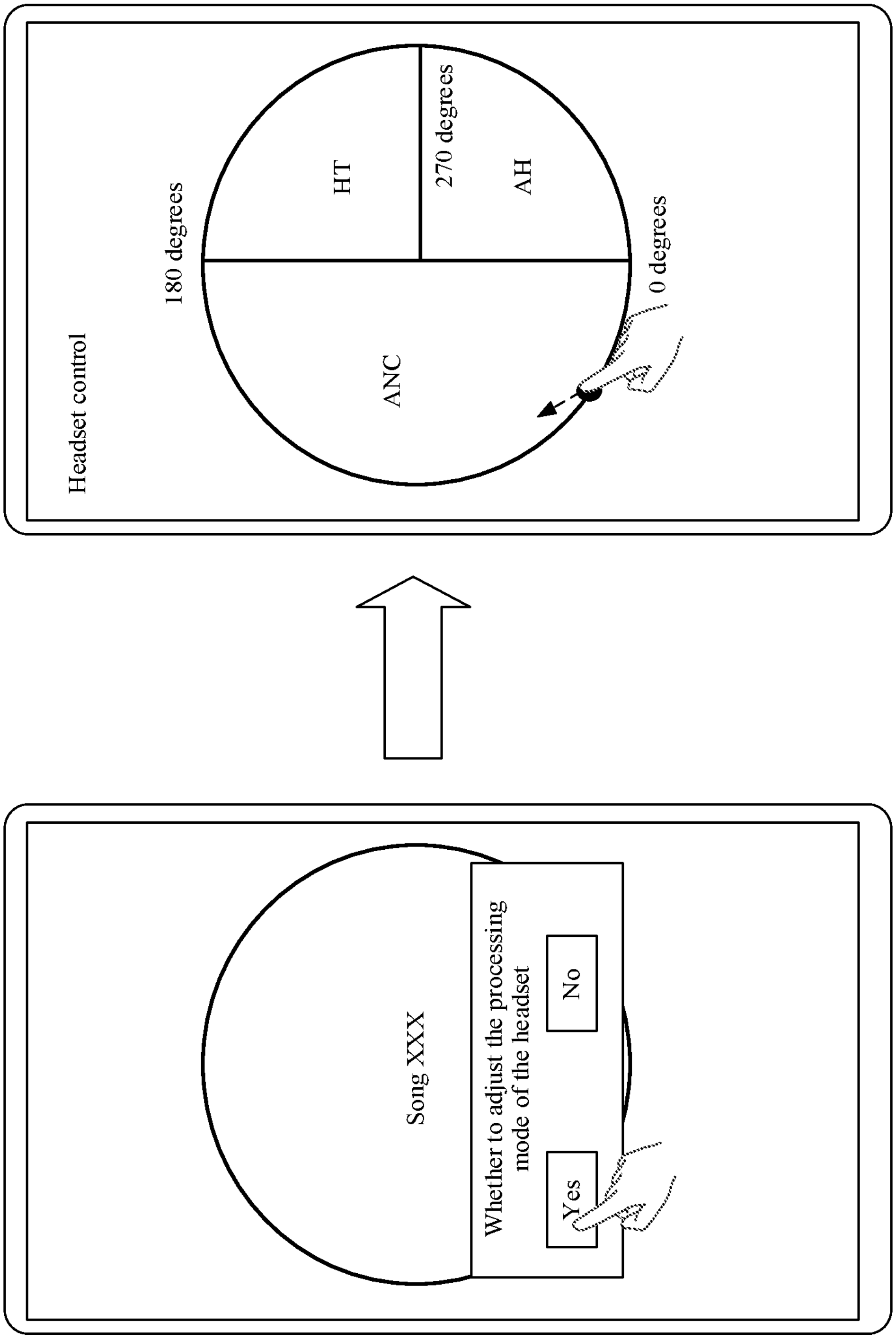
FIG. 12H is a schematic diagram of triggering a headset control interface according to an embodiment of this application.

In still another possible implementation, after the headset establishes a connection to the terminal device, when the terminal device plays audio by using the headset, the identified scene type of the current external environment is a target scene, the target scene adapts to a scene type in which a processing mode of a first target earphone needs to be adjusted, and prompt information may be displayed. The prompt information is used to prompt the user whether to adjust the processing mode of the headset. As shown in FIG. 12H, for example, the prompt information is a prompt box. In response to a user operation of selecting to adjust the processing mode of the headset, the control interface including the selection control may be displayed, for example, the control interface shown in FIG. 12A, FIG. 12B, FIG. 12C, or FIG. 12D. FIG. 12E illustrates an example of the control interface shown in FIG. 12A.

For example, the terminal device identifies a current user scene as a noisy scene. In this scene, the user may need to enable the processing mode, to display the selection prompt information (for example, the prompt box) to prompt the user whether to adjust the processing mode of the headset. For example, the terminal device identifies the scene type of the external environment as a noisy scene. In this scene, the user may need to enable the processing mode, to display the prompt box to prompt the user whether to adjust the processing mode of the headset.

In an example, a scene type in which display of the prompt box is triggered may include a noisy scene, a terminal building scene, a railway station scene, a bus station scene, and a road scene.

For example, when a signal strength reaches a set threshold, the scene is determined as the noisy scene. For another example, when a specific sound of airplane station reporting is identified, the scene is determined as the terminal building scene. For still another example, when a sound of train time notification is identified, the scene is determined as the railway station scene. For still another example, when a bus ticket broadcast is identified, the scene is determined as the bus station scene. For still another example, when a tick of a signal light or a horn of a car is identified, the scene is determined as the road scene.

In still another possible scene, after the headset establishes a connection to the terminal device, when the terminal device plays audio by using the headset, the terminal device displays the control interface including the selection control based on the identified current user scene.

Example 2: Two controls control the left earphone and the right earphone.

The terminal device 100 provides a control interface for the user to separately select a processing mode of the left earphone and a processing mode of the right earphone based on a requirement. The processing modes of the left earphone and the right earphone may be different. For example, the left earphone selects the ANC mode, and the right earphone selects the HT mode. The control interface includes a left earphone selection control and a right earphone selection control. For ease of distinguishing, the left earphone selection control is referred to as a first selection control, and the right earphone selection control is referred to as a second selection control. The first selection control is used for the user to select the processing mode of the left earphone, and the second selection control is used for the user to select the processing mode of the right earphone. The first selection control and the second selection control may be in a ring shape, a bar shape, or another shape. The first selection control and the second selection control may be in a same form or different forms. The user selects different processing modes and controls processing strengths by moving a position that is of the control representing the user selection and that is on a display. For shapes of the controls used by the left earphone and the right earphone, refer to the descriptions in Example 1. Details are not described herein again.

Figure 13:
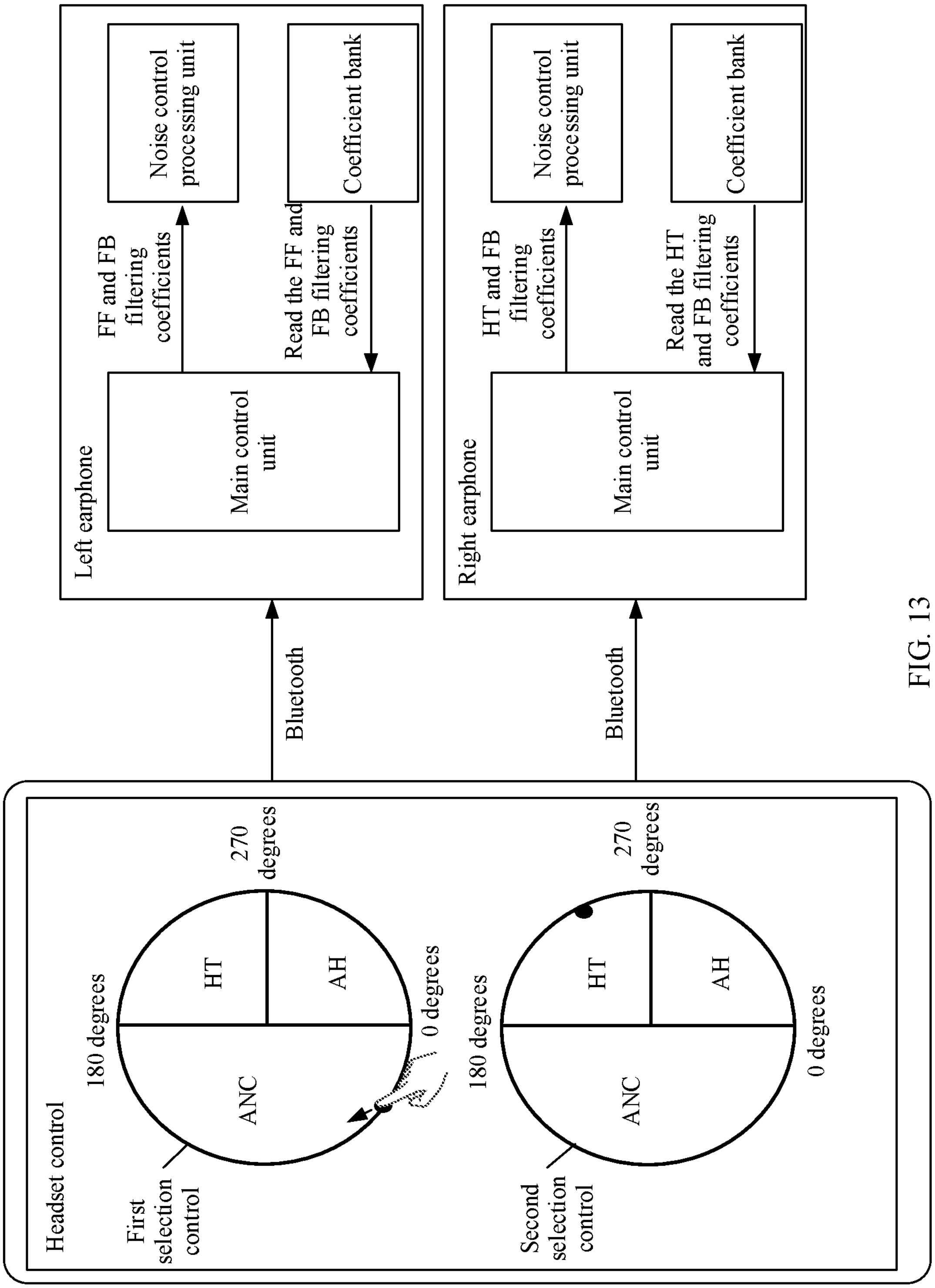
FIG. 13 is a schematic diagram of still another selection control according to an embodiment of this application.

An example in which both the left earphone and the right earphone use a ring-shaped selection control is used for description. As shown in FIG. 13, both the first selection control and the second selection control include a first control and a second control. Two different positions of the second control on the first control correspond to different processing modes, or two different positions of the second control on the first control correspond to different processing strengths in a same processing mode. The control interface shown in FIG. 13 is used as an example. The user may select different processing modes implemented by the left earphone and control processing strengths by moving a position of the second control (a black dot) of the first selection control of the left earphone on the circumference of the first control. The user may select different processing modes implemented by the right earphone and control processing strengths by moving a position of the second control of the second selection control of the right earphone on the first control. In Example 2, the user may select different processing modes, or a same processing strength in a same processing mode, or different processing strengths in a same processing mode for the left earphone and the right earphone, to match ear differences or meet requirements of different applications.

In Example 2, for a manner of triggering the display of the control interface including the first selection control and the second selection control, refer to the descriptions in Example 1. Details are not described herein again.

Example 3: The terminal device performs smart scene detection.

The terminal device identifies a current user scene. The headset uses different processing modes in different scenes. When identifying the scene type of the current external environment as a first scene, the terminal device determines a target mode corresponding to the first scene in the processing modes of the headset, and separately sends a control signal 2 to the left earphone and the right earphone. The control signal 2 indicates the target mode. Different target modes correspond to different scene types.

In this embodiment of this application, the terminal device determines, based on the identified scene, a function to be performed by the headset. An AHA function corresponds to the scene type. A most appropriate function is selected for the scene type. In this way, the user automatically experiences desired effect.

In an example, the scene type may include a walking scene, a running scene, a quiet scene, a multi-person speaking scene, a cafe scene, a subway scene, a train scene, a car scene, a waiting hall scene, a dialog scene, an office scene, an outdoor scene, a driving scene, a strong wind scene, an airplane scene, an alarm sound scene, a horn sound scene, and a crying sound scene.

The terminal device may perform detection classification by using an AI model when performing smart scene detection. The AI model may be constructed in an offline manner, and stored on the terminal device. For example, a microphone on the terminal device records a large amount of noise and sensor data and/or video processing unit (VPU) data in different scenes, and manually marks a scene corresponding to the data. Second, the AI model is constructed through initialization. The model may be one of a convolutional neural network (CNN), a deep neural network (DNN), or a long short-term memory (LSTM) network, or may be a combination of different models. Then, model training is performed by using the marked data to obtain the corresponding AI model. In use, a sound signal of the external environment collected in real time is input to the AI model for calculation to obtain a classification result.

In an example, processing modes applicable to different scene types are listed. The walking scene (HT), the running scene (HT), the quiet scene (HT), the multi-person speaking scene (ANC), the cafe scene (ANC), the subway scene (AH), the train scene (ANC), the waiting hall scene (AH), the dialog scene (AH), the office scene (ANC), the outdoor scene (ANC), the driving scene (ANC), the strong wind scene (ANC), the airplane scene (ANC), the alarm sound scene (AH), the horn sound scene (AH), and the crying sound scene (AH). The brackets indicate the processing modes corresponding to the scene types. For example, in the airplane scene, noise is large when an airplane is flying, and the ANC mode is proper. For another example, in the walking scene, the running scene, and the quiet scene, the HT mode is proper, and a burst event sound may be heard. For another example, in the cafe scene, if the user needs quiet, the ANC mode may be used. For another example, in a light music scene, the HT mode may be used. For another example, in the alarm sound scene (AH), the horn sound scene (AH), and the crying sound scene (AH), a preset sound needs to be heard, and the AH mode is proper.

In an example, in the airplane scene, when identifying the scene type of the current external environment as the airplane scene, the terminal device 100 may send the control signal 2 to the headset. The control signal 2 indicates that the headset needs to perform the ANC function, and indicates the headset to use the ANC mode. After receiving the control signal 2, the left earphone and the right earphone separately perform processing of S501 to S504.

In an example, in the walking scene, when identifying the scene type of the current external environment as the walking scene, the terminal device 100 may send the control signal 2 to the headset. The control signal 2 indicates that the headset needs to perform the HT function, and indicates the headset to use the HT mode. After receiving the control signal 2, the left earphone and the right earphone separately perform processing of S601 to S605.

In another example, in the alarm sound scene, when identifying the scene type of the current external environment as the railway station scene, the terminal device 100 may send the control signal 2 to the headset. The control signal 2 indicates that the headset needs to perform the AH function, and indicates the headset to use the AH mode. After receiving the control signal 2, the left earphone and the right earphone separately perform processing of S801 to S807.

In a possible implementation, after the headset establishes a connection to the terminal device, the terminal device starts scene detection. After completing the detection, the terminal device may further display a detection result to the user such that the user learns of the processing mode of the headset. For example, the detection result is displayed to the user in a form of a prompt box. The detection result may include a detected scene, and may further include a processing mode corresponding to the detected scene. For example, when identifying the scene as the first scene, the terminal device determines the target mode corresponding to the first scene in the processing modes of the headset, and may display the detection result, namely, the first scene and the target mode, to the user, and then separately send the control signal 2 to the left earphone and the right earphone. The control signal 2 indicates the target mode.

In another possible implementation, a function for enabling smart scene detection is configured on the terminal device. In response to a user operation of enabling a smart scene detection function, the terminal device triggers scene detection. When identifying the scene as the first scene, the terminal device determines the target mode corresponding to the first scene in the processing modes of the headset, and separately sends the control signal 2 to the left earphone and the right earphone. The control signal 2 indicates the target mode.

After completing the detection, the terminal device may further display a detection result to the user, so that the user learns of the processing mode of the headset. The detection result may include a detected scene, and may further include a processing mode corresponding to the detected scene. For example, when identifying the scene as the first scene, the terminal device determines the target mode corresponding to the first scene in the processing modes of the headset, and may display the detection result, namely, the first scene and the target mode, to the user, and then separately send the control signal 2 to the left earphone and the right earphone. The control signal 2 indicates the target mode. Optionally, after the detection result is displayed to the user, in response to a user operation of determining the target mode, the control signal 2 is sent to the left earphone and the right earphone.

For example, a function that is configured by the terminal device and that is used to enable smart scene detection may be configured in the control interface of the headset application, or may be configured on a system setting menu bar of the terminal device. For example, the function is configured in the control interface of the headset application. The terminal device may control the processing mode of the headset by identifying the scene. The terminal device may alternatively control the processing mode of the headset by identifying a user operation on the selection control of the control interface. The terminal device may determine, based on a requirement, whether to enable the smart scene detection function. When the smart scene detection function is not enabled, the processing mode of the headset may be manually selected by using Example 1. When the smart scene detection function is enabled, the terminal device 100 identifies the current user scene. After the smart scene detection function is enabled, the user may update a processing mode manual selection interface to another interface, or may display the detection result based on the processing mode manual selection interface.

For example, before the user enables the smart scene detection function, a processing function selected by the user on the terminal device is the HT function. After the smart scene detection function is enabled, the terminal device identifies the current user scene as the airplane scene, and the ANC function is applicable to use. In an example, the user starts the headset application, and the control interface of the headset application is displayed on the display. A ring shape is used as an example. The processing function selected by the user is the HT function, as shown in (a) in FIG. 14A. The control interface includes an option control for enabling or disabling the smart scene detection function. After the user triggers the option control for enabling the smart scene detection function, the user triggers the smart scene detection function, performs scene detection to obtain a detection result, and changes a position of a processing function control representing the user selection to a region belonging to the ANC function. The position of the black dot on the disk may be a default value of the ANC function or a position of the processing strength selected by the user when the ANC function is selected last time. Refer to (b) in FIG. 14A. In (b) in FIG. 14A, for example, the airplane scene is detected. The terminal device 100 separately sends the control signal 2 to the left earphone and the right earphone, where the control signal 2 indicates the ANC function. In another example, the user starts the headset application, and the control interface of the headset application is displayed on the display. A ring shape is used as an example. The processing function selected by the user is the HT function, as shown in (a) in FIG. 14B. The control interface includes an option control for enabling or disabling the smart scene detection function. After the user triggers the option control for enabling the smart scene detection function, the user triggers the smart scene detection function, performs scene detection to obtain a detection result, and displays the detection result in a detection result interface. The detection interface may further include a scene that can be identified by the terminal device and a processing function corresponding to the scene. For example, as shown in (b) in FIG. 14B, the detection result is the airplane scene, and the corresponding processing function is the ANC function. The terminal device 100 separately sends the control signal 2 to the left earphone and the right earphone, where the control signal 2 indicates the ANC function.

In a smart scene detection manner of the terminal device, the target processing strength in the target mode may be determined in any one of the following manners.

Manner 1: The headset uses the default target processing strength in the target mode.

After the terminal device separately sends the control signal 2 to the left earphone and the right earphone, the left earphone is used as an example. After receiving the control signal 2, the left earphone determines the processing mode as the target mode, the control signal 2 does not indicate the target processing strength, and the headset determines to use the default target processing strength. For example, the target mode is the ANC mode. After receiving the control signal 2, the left earphone determines to use the ANC mode, and obtains the default FF filtering coefficient and the default FB filtering coefficient in the ANC mode from the left earphone.

Manner 2: A processing strength used when the target mode is used last time is used as the target processing strength.

In an example, the terminal device determines the target processing strength, and indicates the target processing strength to the left earphone and the right earphone by using the control signal. After performing scene detection and determining the target mode based on the detected scene, the terminal device obtains, as the target processing strength, a processing strength used when the target mode is used last time, and separately sends the control signal 2 to the left earphone and the right earphone, where the control signal 2 indicates the target mode and the target processing strength.

In another example, the headset determines the processing strength in the target mode. After performing scene detection, the terminal device determines the target mode based on the detected scene, and separately sends the control signal 2 to the left earphone and the right earphone, where the control signal 2 indicates the target mode. After receiving the control signal 2, the left earphone and the right earphone determine the processing mode as the target mode, and obtain, as the target processing strength, a stored processing strength used when the target mode is used last time. For example, the target mode is the ANC mode, and the FF filtering coefficient and the FB filtering coefficient stored when the ANC mode is used last time are obtained to perform ANC processing.

Manner 3: The terminal device determines the target processing strength based on the identified scene.

When the function for enabling smart scene detection is not configured on the terminal device, after identifying the scene, the terminal device may determine the target processing strength based on the identified scene.

In an example, processing modes determined in different scenes are the same, and different scenes correspond to different processing strengths. For example, the HT mode is applicable to the walking scene, the running scene, and the quiet scene. When the HT mode is used, the walking scene, the running scene, and the quiet scene separately correspond to different processing strengths. For another example, the ANC mode is applicable to the multi-person speaking scene, the cafe scene, the train scene, the airplane scene, the strong wind scene, and the office scene. In the ANC mode, the multi-person speaking scene, the cafe scene, the train scene, the airplane scene, the strong wind scene, and the office scene separately correspond to different processing strengths. For another example, the AH mode is applicable to the dialog scene, the alarm sound scene, the horn sound scene, and the crying sound scene. When the AH mode is used, the dialog scene, the alarm sound scene, the horn sound scene, and the crying sound scene separately correspond to different processing strengths.

Based on this, the terminal device sends the control signal 2 to the left earphone and the right earphone based on a stored correspondence between scene types, target modes, and processing strengths, where the control signal 2 indicates the target mode and the target processing strength in the target mode. In this way, after receiving the control signal 2, the headset determines, based on the control signal 2, to use the target mode, and determines the filtering coefficient corresponding to the target processing strength. For example, the target mode is the AH mode. The FF filtering coefficient, the FB filtering coefficient, and the HT filtering coefficient are determined based on the target processing strength, and S801 to S807 are performed based on the FF filtering coefficient, the FB filtering coefficient, and the HT filtering coefficient.

Manner 4: The user indicates, to the headset by using the UI control provided by the terminal device, the processing strength used in the target mode.

In an example, after the terminal device performs scene detection, the detection result is displayed in the display interface of the terminal device. The detection result includes the detected scene and the target mode corresponding to the detected scene. The display interface may include a control used to select a processing strength. For ease of description, the control used to select a processing strength is referred to as a strength control. The strength control may include a control 1 and a control 2. Different positions of the control 1 indicate different processing strengths in the target mode. The strength control may be in a ring shape, a bar shape, or another shape. As shown in FIG. 14C, the detected scene is the terminal building scene. For example, the control 1 in the strength control is a ring, and the control 2 is a circular black dot. The user touches and holds the control 2 to move to a position 1 on the control 1. The position 1 indicates the target processing strength selected by the user in the target mode. Then, a control instruction 2 is sent to the left earphone and the right earphone. The control instruction 2 indicates the target mode and the target processing strength corresponding to the position 1.

Optionally, the target mode and the target processing strength may be sent to the left earphone and the right earphone by using different control instructions. After determining the target mode based on the detected scene, the terminal device sends, to the left earphone and the right earphone, the control signal indicating the target mode. After receiving the control signal indicating the target mode, the left earphone and the right earphone use the default processing strength in the target mode, namely, use the default filtering coefficient in the target mode, to implement target processing corresponding to the target mode. When the user touches and holds the control 2 to move to the position 1 on the control 1, the control signal indicating the target processing strength is sent to the left earphone and the right earphone. Further, the left earphone and the right earphone perform the target processing corresponding to the target mode based on the filtering coefficient corresponding to the target processing strength.

Figure 14A:
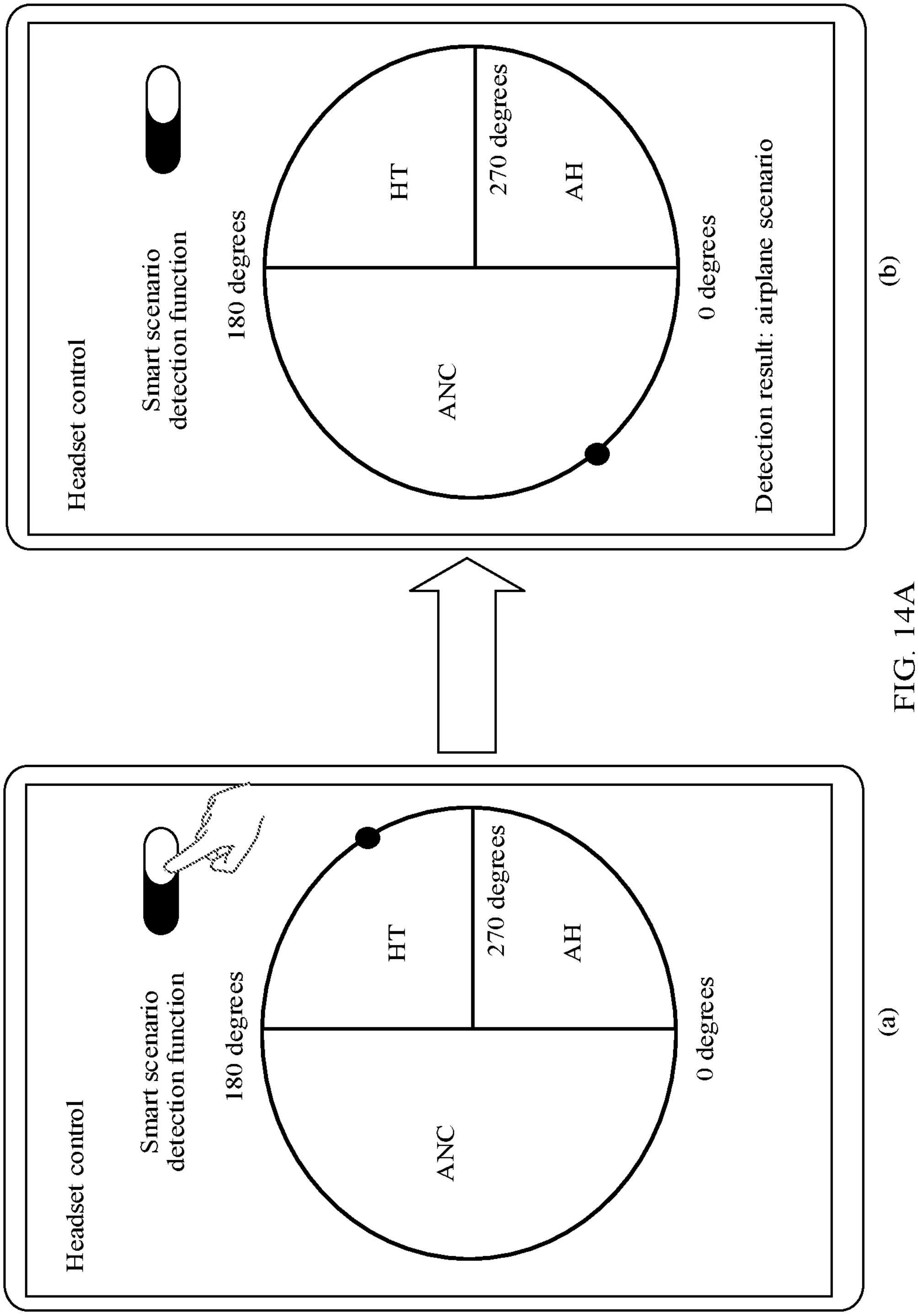
FIG. 14A is a schematic diagram of enabling control of a smart scene detection function according to an embodiment of this application.
Figure 14B:
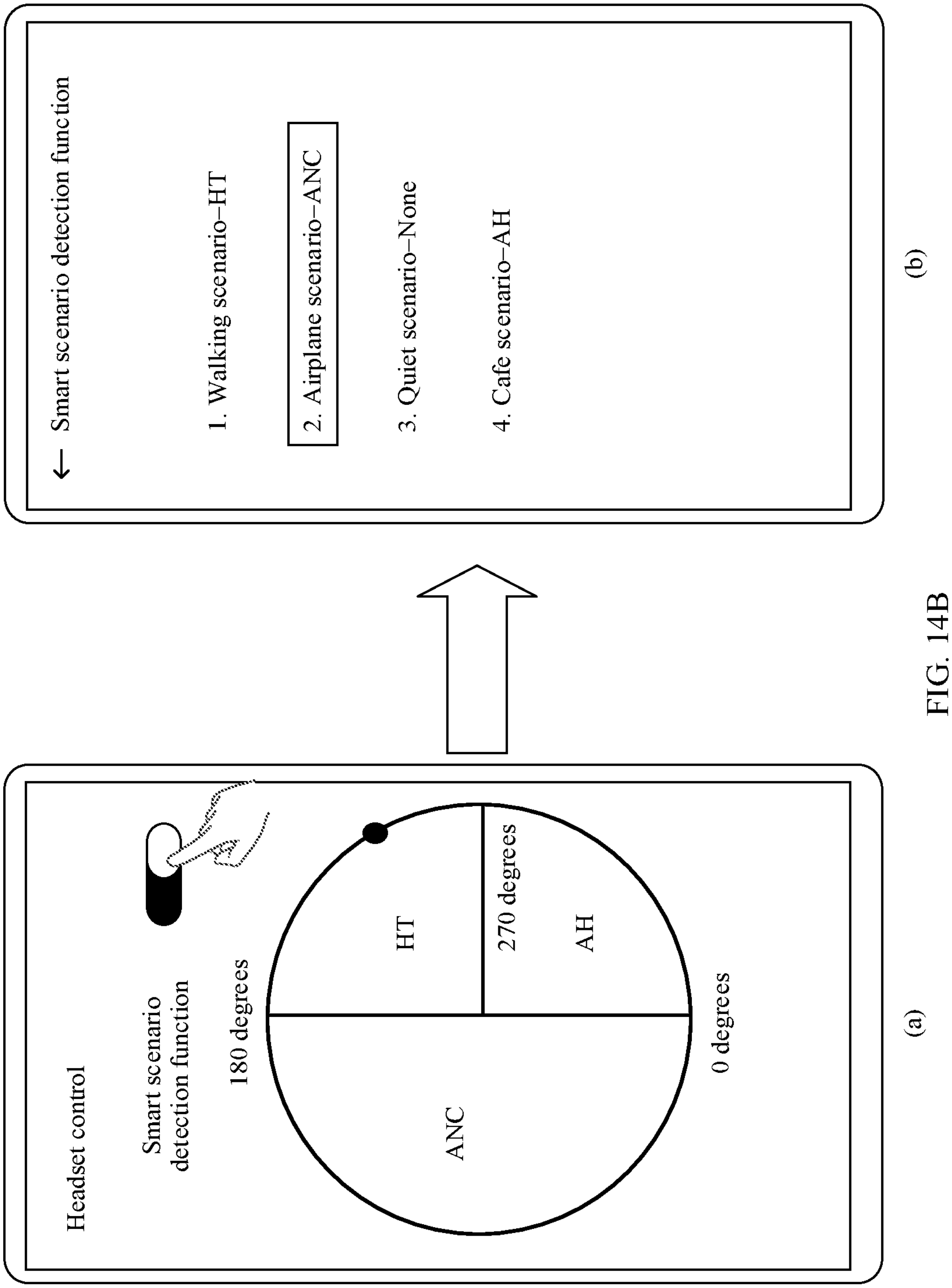
FIG. 14B is another schematic diagram of enabling control of a smart scene detection function according to an embodiment of this application.
Figure 14C:
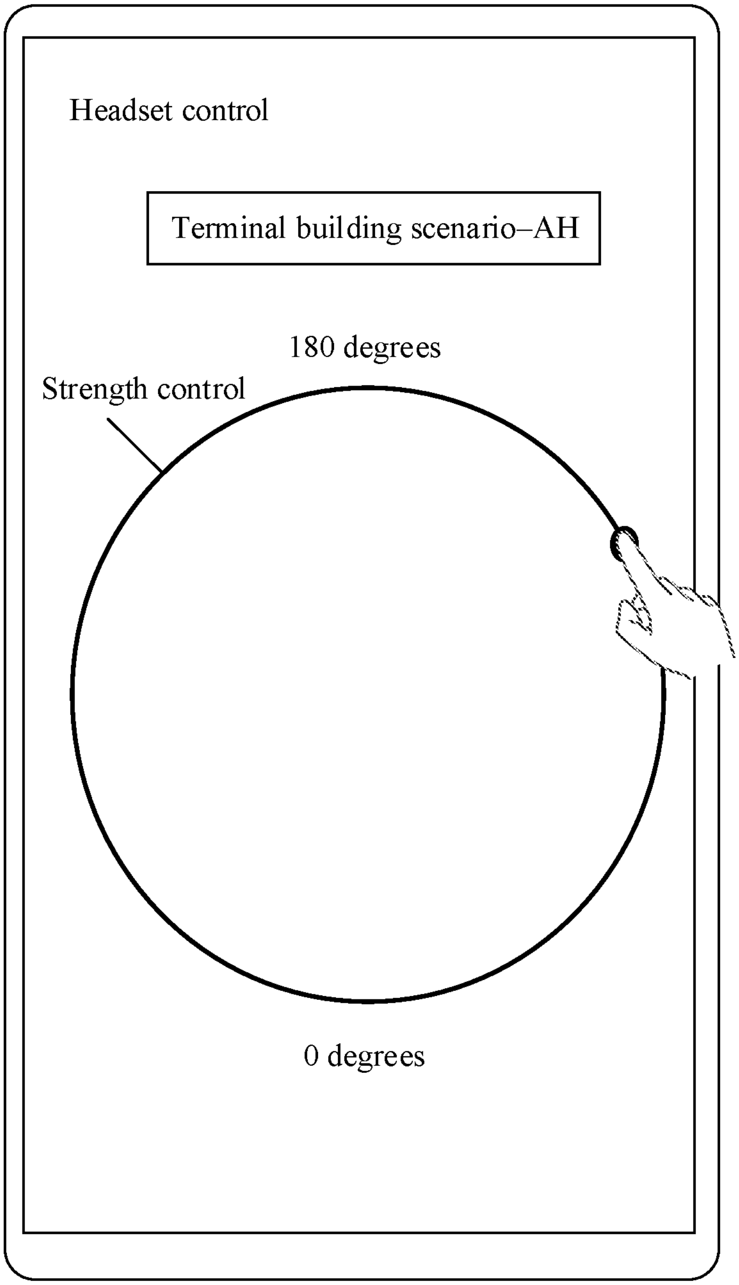
FIG. 14C is a schematic diagram of a headset control interface according to an embodiment of this application.

In another example, still refer to FIG. 14A. After the user triggers the option control for enabling the smart scene detection function, the user triggers the smart scene detection function, performs scene detection to obtain a detection result, and changes a position of a processing function control representing the user selection to a region belonging to the ANC function. The position of the black dot on the disk may be a default value of the ANC function or a position of the processing strength selected by the user when the ANC function is selected last time. The user selects the processing strength in the ANC mode by moving the black dot. In addition, the control signal 2 is sent to the left earphone and the right earphone. The control signal 2 indicates the ANC mode and the target processing strength.

Example 4: Headset scene detection. Different scenes correspond to different processing functions.

The headset has the scene detection function. The headset identifies the current user scene. Processing functions of the headset are different in different detected scene types. In the headset, the left earphone may have the scene detection function, or the right earphone may have the scene detection function, or both the left earphone and the right earphone have the scene detection function. In an example, one of the left earphone and the right earphone is used to perform scene detection. For example, the left earphone performs scene detection, and sends a detection result to the right earphone, so that both the left earphone and the right earphone perform, based on the detection result of the left earphone, processing used to implement a processing function corresponding to the detection result. Alternatively, the right earphone performs scene detection and sends a detection result to the left earphone. Therefore, both the left earphone and the right earphone perform, based on the detection result of the right earphone, processing used to implement a processing function corresponding to the detection result. In another example, both the left earphone and the right earphone perform scene detection, the left earphone performs, based on a detection result of the left earphone, processing used to implement a processing function corresponding to the detection result, and the right earphone performs, based on a detection result of the right earphone, processing used to implement a processing function corresponding to the detection result.

In a possible implementation, enabling of the scene detection function of the headset may be controlled by the user by using the headset or by using the terminal device.

In one manner, a button used to start the scene detection function is disposed on the headset. The user may enable or disable the scene detection function of the headset by touching the button. After the scene detection function of the headset is enabled, the headset identifies the current user scene (or a current headset scene). It is determined based on a correspondence between scenes and processing modes that the processing mode corresponding to the scene is identified to implement the processing function corresponding to the processing mode.

In another manner, the user enables or disables the scene detection function of the headset by a tapping operation on the headset, for example, three consecutive taps. When the scene detection function of the headset is disabled, the headset enables the scene detection function of the headset in response to the three consecutive taps. When the scene detection function of the headset is enabled, the headset disables the scene detection function of the headset in response to the three consecutive taps. After the scene detection function of the headset is enabled, the headset identifies the current user scene (or a current headset scene). It is determined based on a correspondence between scenes and processing modes that the processing mode corresponding to the scene is identified to implement the processing function corresponding to the processing mode.

In still another manner, enabling of the scene detection function of the left earphone or the right earphone is controlled by the terminal device 100. For example, the headset control interface includes a button for enabling or disabling the scene detection function of the headset. The terminal device may determine, based on a user requirement, whether to enable the scene detection function of the headset. When the scene detection function of the headset is not enabled, a processing function that needs to be implemented by the headset may be manually selected by using Example 1. After the scene detection function of the headset is enabled, the headset identifies the scene type of the current external environment. It is determined based on a correspondence between scene types and processing modes that the processing mode corresponding to the scene type is identified to implement the processing function corresponding to the processing mode. The terminal device 100 sends a control signal 3 to the headset 200 in response to a user operation of enabling the scene detection function of the headset. The control signal 3 indicates the headset to enable the scene detection function. The headset 200 starts to perform scene detection based on the control signal 3. The headset 200 determines, based on the detected scene type of the current external environment, a processing function that needs to be performed. For example, if the processing function is the ANC function, the headset 200 performs ANC processing, and performs S501 to S504.

In another possible implementation, after the headset establishes a connection to the terminal device, the headset starts scene detection; or when the headset receives a downlink audio signal sent by the terminal device, the headset starts scene detection.

In Example 4, after the headset detection is completed, a detection result may be further sent to the terminal device. For example, the detection result may be included in indication information and sent to the terminal device. The detection result may include a detected scene and a processing mode corresponding to the scene. When receiving the detection result, the terminal device displays the detection result to the user, so that the user learns of the processing mode of the headset. For example, the detection result is displayed to the user in a form of a prompt box. Optionally, the detection result may include only the detected scene. After receiving the detection result, the terminal device determines the processing mode corresponding to the scene detected by the headset, and displays the scene detected by the headset and the processing mode corresponding to the scene to the user. For example, when identifying the scene as the first scene, the headset determines the target mode corresponding to the first scene in the processing modes of the headset, and may display the detection result, namely, the first scene and the target mode, to the user.

In another example, after the headset detection is completed, the processing function of the processing mode corresponding to the scene is not immediately performed, and the detection result is sent to the terminal device, and the terminal device displays the detection result to the user. In response to a user operation of determining a processing mode, the terminal device sends a confirmation instruction to the headset. When receiving the confirmation instruction, the headset performs the processing function by using the processing mode corresponding to the scene detected by the headset.

For example, the scene type that can be identified by the headset may include a walking scene, a running scene, a quiet scene, a multi-person speaking scene, a cafe scene, a subway scene, a train scene, a car scene, a waiting hall scene, a dialog scene, an office scene, an outdoor scene, a driving scene, a strong wind scene, an airplane scene, an alarm sound scene, a horn sound scene, and a crying sound scene.

In an example, processing modes applicable to different scene types are listed. The walking scene (HT), the running scene (HT), the quiet scene (HT), the multi-person speaking scene (ANC), the cafe scene (ANC), the subway scene (AH), the train scene (ANC), the waiting hall scene (AH), the dialog scene (AH), the office scene (ANC), the outdoor scene (ANC), the driving scene (ANC), the strong wind scene (ANC), the airplane scene (ANC), the alarm sound scene (AH), the horn sound scene (AH), and the crying sound scene (AH). The brackets indicate the processing modes corresponding to the scene types. For example, in the airplane scene, noise is large when an airplane is flying, and the ANC mode is proper. For another example, in the walking scene, the running scene, and the quiet scene, the HT mode is proper, and a burst event sound may be heard. For another example, in the cafe scene, if the user needs quiet, the ANC mode may be used. For another example, in a light music scene, the HT mode may be used. For another example, in the alarm sound scene (AH), the horn sound scene (AH), and the crying sound scene (AH), a preset sound needs to be heard, and the AH mode is proper.

In an example, in the airplane scene, when the scene type is identified as the airplane scene, it is determined that the ANC mode is used, and the left earphone and the right earphone separately perform processing in S501 to S504.

In an example, in the walking scene, when the scene type is identified as the walking scene, it is determined that the HT mode is used, and the left earphone and the right earphone separately perform processing in S601 to S605.

In another example, in the railway station scene, when the scene type is identified as the railway station scene, it is determined that the AH mode is used. The left earphone and the right earphone separately perform processing of S801 to S807.

In a scene detection manner of the headset, the target processing strength in the target mode may be determined in any one of the following manners.

Manner 1: The headset uses the default target processing strength in the target mode.

The headset (the left earphone or the right earphone) determines the processing mode as the target mode based on the detected scene, and determines that the left earphone and the right earphone use the default target processing strength. For example, the target mode is the ANC mode. The left earphone and the right earphone obtain the default FF filtering coefficient and the default FB filtering coefficient in the ANC mode.

Manner 2: A processing strength used when the target mode is used last time is used as the target processing strength.

In an example, the headset (the left earphone or the right earphone) determines the processing strength in the target mode. After the headset performs scene detection, and determines the target mode based on the detected scene, the headset obtains, as the target processing strength, a processing strength stored when the target mode is used last time. For example, the target mode is the ANC mode, and the FF filtering coefficient and the FB filtering coefficient stored when the ANC mode is used last time are obtained to perform ANC processing.

In another example, the terminal device determines the target processing strength, and indicates the target processing strength to the left earphone and the right earphone by using the control signal. After performing scene detection, the headset sends a detection result to the terminal device, so that the terminal device obtains, as the target processing strength, a processing strength used when the target mode is used last time, and separately sends a control signal 4 to the left earphone and the right earphone. The control signal 4 indicates the target processing strength.

Manner 3: The headset determines the target processing strength based on the identified scene.

After identifying the scene, the headset may determine the target processing strength based on the identified scene.

In an example, processing modes determined in different scenes are the same, and different scenes correspond to different processing strengths. For example, the HT mode is applicable to the walking scene, the running scene, and the quiet scene. When the HT mode is used, the walking scene, the running scene, and the quiet scene separately correspond to different processing strengths. For another example, the ANC mode is applicable to the multi-person speaking scene, the cafe scene, the train scene, the airplane scene, the strong wind scene, and the office scene. In the ANC mode, the multi-person speaking scene, the cafe scene, the train scene, the airplane scene, the strong wind scene, and the office scene separately correspond to different processing strengths. For another example, the AH mode is applicable to the dialog scene, the alarm sound scene, the horn sound scene, and the crying sound scene. When the AH mode is used, the dialog scene, the alarm sound scene, the horn sound scene, and the crying sound scene separately correspond to different processing strengths.

In view of this, the left earphone and the right earphone determine the target mode corresponding to the detected scene and the target processing strength in the target mode based on a stored correspondence between scene types, target modes, and processing strengths. In this way, the left earphone and the right earphone obtain the filtering coefficient corresponding to the target processing strength. For example, the target mode is the AH mode. The FF filtering coefficient, the FB filtering coefficient, and the HT filtering coefficient are determined based on the target processing strength, and S801 to S807 are performed based on the FF filtering coefficient, the FB filtering coefficient, and the HT filtering coefficient.

For another example, in different scenes, the headset may further detect an emergency event to determine a target event. For example, the emergency event includes one or more of a wind noise event, a howling event, an emergency event, a human voice event, or a non-emergency event. Different events correspond to different processing strengths. The headset detects scenes and events. In the target mode, different events correspond to different filtering coefficients. ANC is used as an example. Different events correspond to different FF filtering coefficients and/or different FB filtering coefficients. After the left earphone or the right earphone performs scene and event detection, the left earphone and the ANC mode are used as an example. The left earphone may obtain, from the coefficient bank based on the detection result, an FF filtering coefficient or an FB filtering coefficient corresponding to the detected event when the ANC function is implemented. The coefficient bank stores a mapping relationship between processing modes, events, FF filtering coefficients, and FB filtering coefficients. The processing effect of ANC mainly depends on FB filtering and/or FF filtering. For example, the filtering coefficient of the FF filter is controlled based on the detected scene, and the FB filtering coefficient is a fixed value. For another example, the filtering coefficient of the FB filter is controlled based on the detected scene, and the FF filtering coefficient is a fixed value. For still another example, the FF filtering coefficient and the FB filtering coefficient are controlled based on the detected scene. For example, as shown in Table 2, the event includes a howling event, a wind noise event, an emergency event, a human voice event, or a non-emergency event.

TABLE 2

| Processing mode | Event | FF filtering coefficient | FB filtering coefficient | HT filtering coefficient |
|---|---|---|---|---|
| ANC | Howling event | Coefficient FF1 | Coefficient FB1 | |
| | Wind noise event | Coefficient FF2 | Coefficient FB2 | |
| | Emergency event | Coefficient FF3 | Coefficient FB3 | |
| | Non-emergency event | Coefficient FF4 | Coefficient FB4 | |
| | Human voice event | Coefficient FF5 | Coefficient FB5 | |
| HT | Howling event | NA | Coefficient FB6 | Coefficient HT1 |
| | Wind noise event | NA | Coefficient FB7 | Coefficient HT2 |
| | Emergency event | NA | Coefficient FB8 | Coefficient HT3 |
| | Non-emergency event | NA | Coefficient FB9 | Coefficient HT4 |
| | Human voice event | NA | Coefficient FB10 | Coefficient HT5 |
| AH | Howling event | Coefficient FF6 | Coefficient FB11 | Coefficient HT6 |
| | Wind noise event | Coefficient FF7 | Coefficient FB12 | Coefficient HT7 |
| | Emergency event | Coefficient FF8 | Coefficient FB13 | Coefficient HT8 |
| | Non-emergency event | Coefficient FF9 | Coefficient FB14 | Coefficient HT9 |
| | Human voice event | Coefficient FF10 | Coefficient FB15 | Coefficient HT10 |

For example, the headset 200 detects the event sound in the external environment, and may determine, based on the signal collected by the reference microphone, the target event corresponding to the event sound in the external environment. For example, if the signal collected by the reference microphone includes a signal of a preset spectrum, an event corresponding to the signal of the preset spectrum is determined. For example, for the wind noise event, if the signal collected by the reference microphone includes a wind sound signal, namely, if the collected signal includes a signal that matches a spectrum of a wind sound, it is determined that the event corresponding to the detected event sound in the external environment is the wind noise event. When it is determined that the signal collected by the reference microphone includes the signal of the preset spectrum, a spectrum matching manner may be used, or a DNN matching manner may be used.

Figure 15:
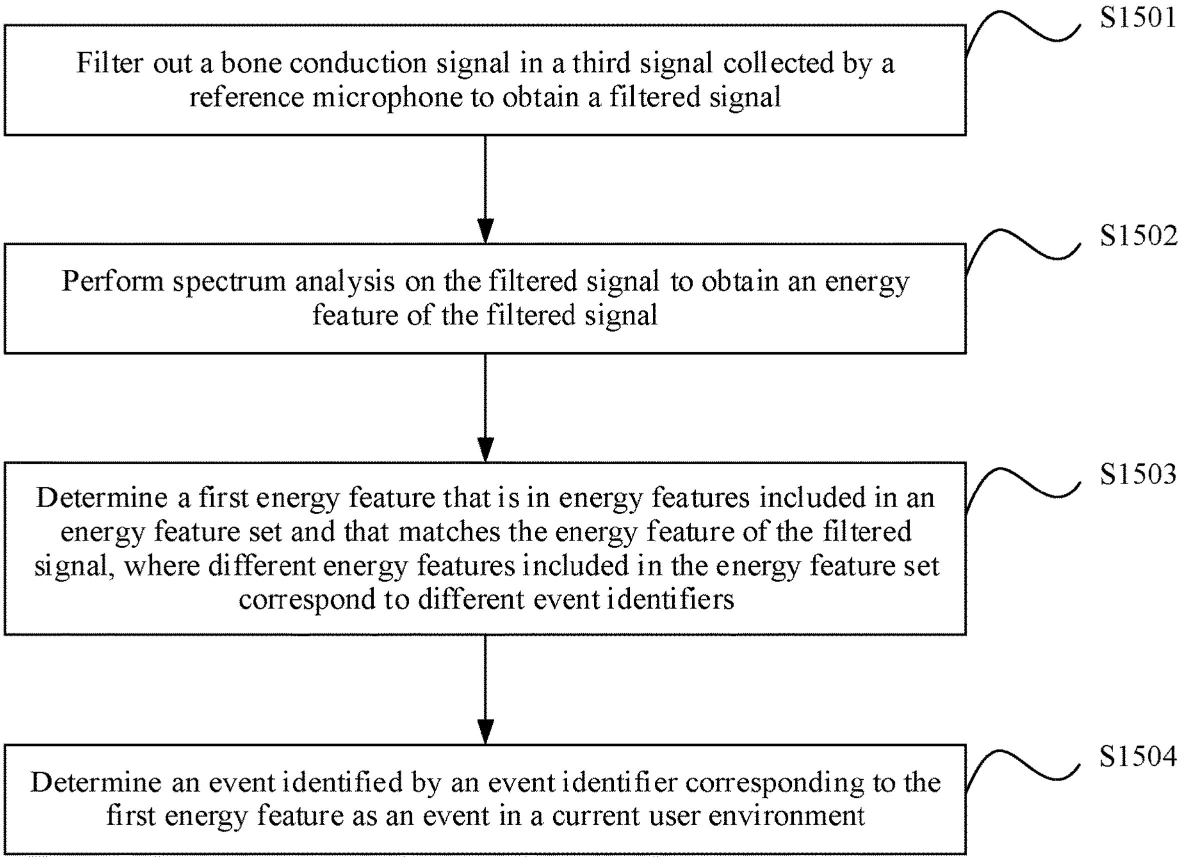
FIG. 15 is a schematic diagram of event detection according to an embodiment of this application.

For example, as shown in FIG. 15, the headset 200 may determine, in the following manner, an event in the current user environment based on the signal collected by the reference microphone. The headset 200 further includes a bone conduction sensor. The bone conduction sensor is configured to collect a bone conduction signal of the headset user. When the user wears the headset 200 and makes a sound, for example, speaking or singing, the bone conduction sensor collects the bone conduction signal, namely, collects a periosteum vibration signal generated when the user speaks, to obtain the bone conduction signal.

Enabling of the scene detection function of the left earphone or the right earphone may be controlled by the terminal device 100, or may be controlled by a user operation on the headset, for example, an operation of tapping the left earphone or the right earphone. Alternatively, the headset includes a bone conduction sensor. A tooth touch sound is generated when the upper and lower teeth of the user touch, so that the bone conduction sensor starts the scene detection function by detecting an audio signal generated when the upper and lower teeth of the user touch.

S1501: Filter out a bone conduction signal in a third signal collected by a reference microphone to obtain a filtered signal, which is briefly referred to as a signal AA1.

In step S1501, the third signal collected by the reference microphone is a signal collected by the reference microphone after the headset starts the scene detection function.

It should be understood that, when the user does not make a sound, for example, the user does not speak or sing when wearing the headset, energy of the bone conduction signal collected by the bone conduction sensor is small. For example, when the energy of the bone conduction signal is less than a specified threshold, S1501 may not be performed, and the signal AA1 is the third signal. In an example, the headset 200 may first determine the energy of the bone conduction signal. If the energy of the bone conduction signal is less than the specified threshold, the filtering operation is not performed. In other words, S1501 is not performed. When it is determined that the energy of the bone conduction signal is greater than or equal to the specified threshold, S1501 is performed.

S1502: Perform spectrum analysis on the filtered signal to obtain an energy feature of the filtered signal.

In other words, the headset 200 performs spectrum analysis on the signal AA1 to obtain the energy feature of the signal AA1. For example, the headset 200 performs spectrum analysis on the signal to obtain energy of an entire frame of the signal AA1 and energy of each bark subband of the signal AA1, to form the energy feature of the signal AA1 represented by a vector.

S1503: Determine a first energy feature that is in energy features included in an energy feature set and that matches the energy feature of the filtered signal, where different energy features included in the energy feature set correspond to different event identifiers.

S1504: Determine the event identified by an event identifier corresponding to the first energy feature as the event in the current user environment, namely, a detection result of event detection.

In an example, the energy feature set may be generated in the following manner: Wind noise detection, burst noise detection, howling detection, and human voice detection are performed on signals collected by the first microphone, the second microphone, and the third microphone, to obtain a wind noise signal, a burst noise signal, and a howling signal. Then, spectrum analysis is separately performed on the wind noise signal, the burst noise signal, the howling signal, and the human voice signal, to obtain a subband energy feature of the wind noise signal, a subband energy feature of the burst noise signal, a subband energy feature of the howling signal, and a subband energy feature of the human voice signal. The subband energy feature of the wind noise signal, the subband energy feature of the burst noise signal, the subband energy feature of the howling signal, and the subband energy feature of the human voice signal form the energy feature set. It should be understood that, in the quiet scene, subband energy of noise is weak.

Optionally, when the first energy feature that is in the energy features included in the energy feature set and that matches the energy feature of the filtered signal is determined, a spectrum matching manner may be used, or a DNN matching manner may be used. For example, when the DNN matching manner is used, a matching degree between the energy feature of the filtered signal and each energy feature included in the energy feature set may be determined by using a DNN, and the event identified by the event identifier corresponding to the first energy feature with a highest matching degree is the detection result.

In this embodiment of this application, the main control unit in the headset 200 may determine the event in the current user environment based on the signal collected by the reference microphone. For example, the main control unit includes a DSP. The DSP is configured to perform S1501 to S1504.

Manner 4: The user indicates, to the headset by using the UI control provided by the terminal device, the processing strength used in the target mode.

Figure 16:
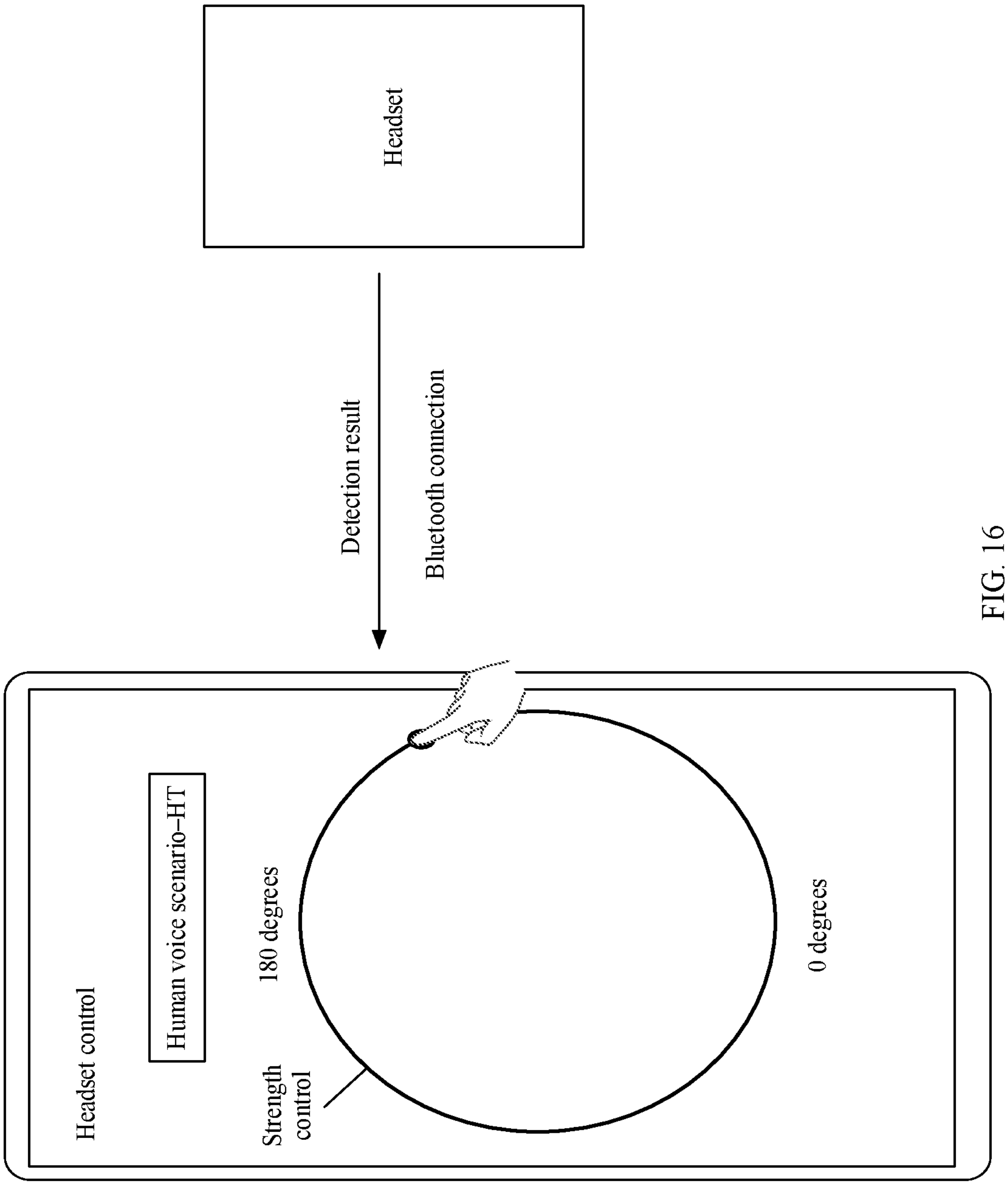
FIG. 16 is a schematic diagram of interaction between a terminal device and a headset in terms of a processing mode and a processing strength according to an embodiment of this application.

In an example, after performing scene detection, the headset sends the detection result to the terminal device. The terminal device displays the detection result to the user. The detection result is displayed in the display interface of the terminal device. The detection result includes the scene detected by the headset and the target mode corresponding to the detected scene. The display interface further includes a control used to select a processing strength. For ease of description, the control used to select a processing strength is referred to as a strength control. The strength control may include a control 1 and a control 2. Different positions of the control 1 indicate different processing strengths in the target mode. The strength control may be in a ring shape, a bar shape, or another shape. As shown in FIG. 16, for example, the strength control is ring. The user touches and holds the control 2 to move to a position 2 on the control 1. The position 2 indicates the target processing strength selected by the user in the target mode. Then, a control instruction 5 is sent to the left earphone and the right earphone. The control instruction 5 indicates the target processing strength corresponding to the position 2. In FIG. 16, for example, the target mode is the HT mode.

In an example, the terminal device 100 sends a control signal 3 to the headset 200 in response to a user operation of enabling the scene detection function of the headset. The control signal 3 indicates the headset to enable the scene detection function. The headset 200 starts to perform scene detection based on the control signal 3 to obtain the detection result. The headset 200 may send the detection result to the terminal device 100, so that the terminal device 100 displays the detection result to the user, and displays, to the user, a processing mode that needs to be used by the headset and that is corresponding to the detected scene.

Further, after the scene detection function of the headset is enabled, the user may update a processing mode manual selection interface to another interface, or may display the detection result based on the processing mode manual selection interface.

Figure 17A:
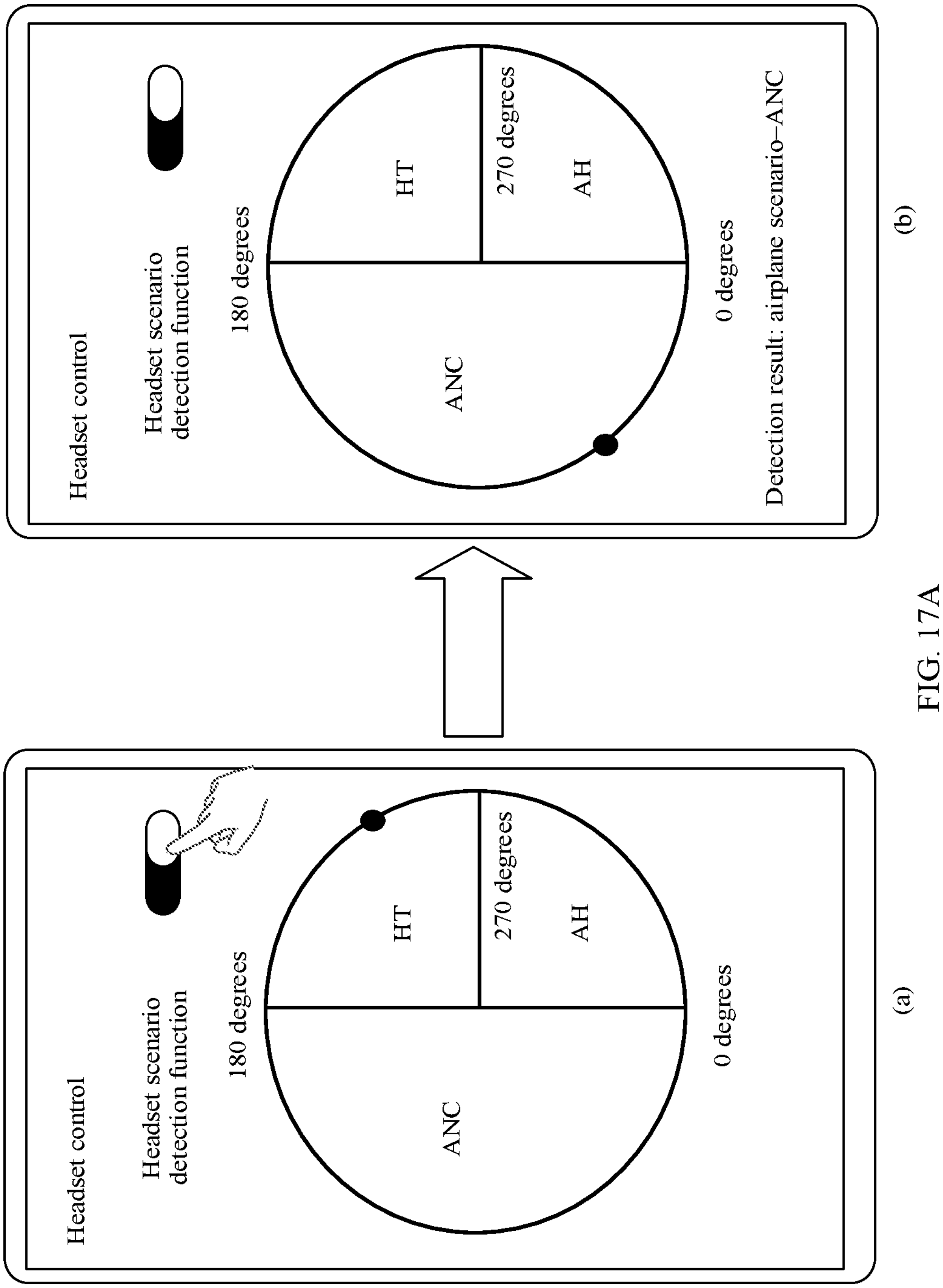
FIG. 17A is a schematic diagram of displaying a scene detection result according to an embodiment of this application.

For example, before the user enables the scene detection function of the headset, the processing function selected by the user on the terminal device is the HT function. After the scene detection function of the headset is enabled, the headset 200 identifies the current user scene as the airplane scene, and the ANC function is proper. The headset sends a detection result, namely, the airplane scene and the ANC function, to the terminal device. In an example, the user starts the headset application, and the control interface of the headset application is displayed on the display. A ring shape is used as an example. The processing function selected by the user is the HT function, as shown in (a) in FIG. 17A. The control interface includes an option control for enabling or disabling the scene detection function of the headset. After the user triggers the option control for enabling the scene detection function of the headset, the terminal device triggers the scene detection function of the headset, and sends the control signal 3 to the headset 200. The control signal 3 indicates the headset to enable the scene detection function. The headset 200 starts to perform scene detection based on the control signal 3 to obtain the detection result. The headset 200 sends the detection result to the terminal device 100. After receiving the detection result, the terminal device 100 changes a position of a processing function control representing the user selection to a region belonging to the ANC function. The user selects the processing strength in the ANC mode by moving the black dot on the disk. Refer to (b) in FIG. 17A. In (b) in FIG. 17A, for example, the airplane scene is detected.

Figure 17B:
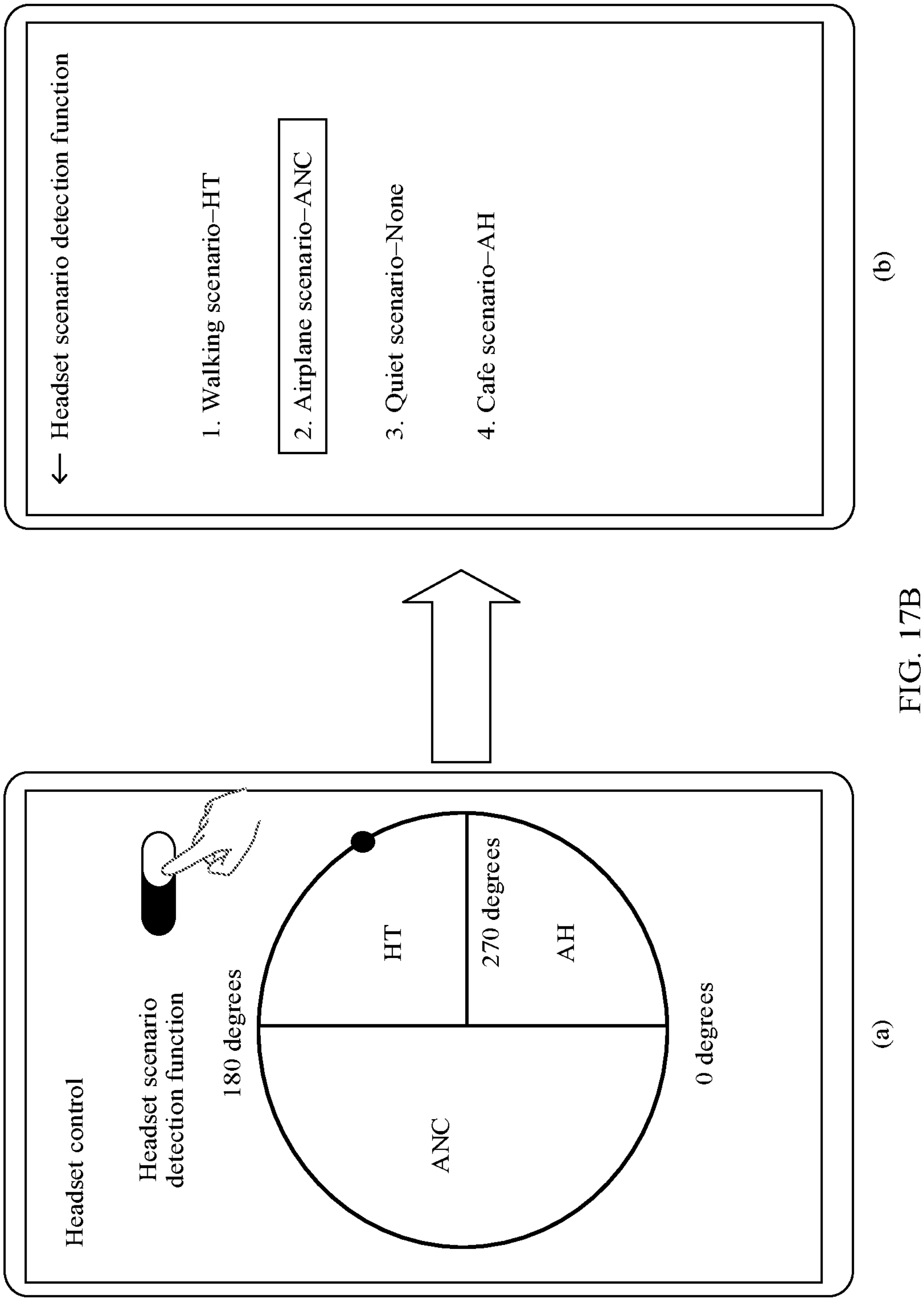
FIG. 17B is a schematic diagram of displaying another scene detection result according to an embodiment of this application.

In another example, the user starts the headset application, and the control interface of the headset application is displayed on the display. A ring shape is used as an example. The processing function selected by the user is the HT function, as shown in (a) in FIG. 17B. The control interface includes an option control for enabling or disabling the scene detection function of the headset. After the user triggers the option control for enabling the scene detection function of the headset, the terminal device triggers the scene detection function of the headset, and sends the control signal 3 to the headset 200. The control signal 3 indicates the headset to enable the scene detection function. The headset 200 starts to perform scene detection based on the control signal 3 to obtain the detection result. The headset 200 sends the detection result to the terminal device 100. After receiving the detection result, the terminal device 100 displays the detection result in the detection result interface. The detection interface may further include a scene that can be identified by the headset and a processing mode corresponding to the scene. The user selects the processing strength in the ANC mode by moving the black dot on the disk. For example, as shown in (b) in FIG. 17B, the detection result is the airplane scene, and the corresponding processing mode is the ANC mode.

Figure 18:
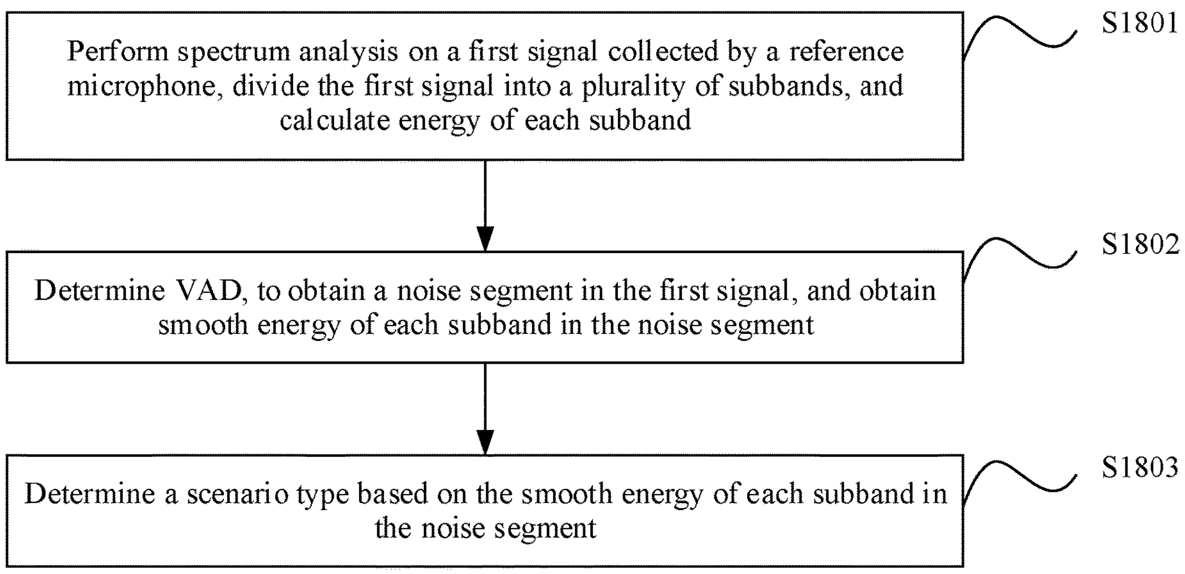
FIG. 18 is a schematic diagram of scene detection according to an embodiment of this application.

For example, in one manner, the headset 200 may perform detection classification by using an AI model when performing scene detection. The AI model may be configured in the headset. In another manner, the scene type may be determined based on the signal collected by the reference microphone. For example, as shown in FIG. 18, the headset 200 may determine, in the following manner, the current user scene based on the signal collected by the reference microphone.

S1801: Perform spectrum analysis on a first signal collected by a reference microphone, divide the first signal into a plurality of subbands, and calculate energy of each subband. For example, the first signal collected by the reference microphone is divided into the subbands in frequency domain by using a bark subband division method, and energy of each subband is calculated.

S1802: Determine VAD, to obtain a noise segment in the first signal, and obtain smooth energy of each subband in the noise segment.

In an example, the VAD determining manner is as follows: calculating a signal cross correlation between the reference microphone and a communication microphone to obtain a cross correlation coefficient A; calculating an autocorrelation coefficient B of the reference microphone; and when A<alpha (a first threshold) and B<beta (a second threshold), determining a signal segment corresponding to the VAD as the noise segment; otherwise, determining a signal segment corresponding to the VAD as a speech segment.

S1803: Determine a scene type based on the smooth energy of each subband in the noise segment.

In an example, a quiet scene, a low-frequency heavy noise scene, and a human voice scene are determined. For the determined noise segment, the following processing is performed to determine the scene type: (1) calculating an energy average value C of a 50-1 kHz subband, an energy average value D of a 1-2 kHz subband, and an energy average value E of a 2-3 kHz subband in the noise segment, and if C/D/E is less than a threshold gamma for N consecutive frames, determining the scene as the quiet scene; (2) a=D/C, and if a is less than a threshold t, C and D are both greater than a threshold k, and for M consecutive frames, a is less than the threshold t, and C and D are both greater than the threshold k, determining the scene as the low-frequency heavy noise scene; or (3) if a is greater than a threshold k and consecutive P frames are not noise frames, determining the scene as the human voice (or music) scene.

Example 5: After determining the processing mode, the headset performs event detection in the processing mode. In the processing mode, different events correspond to different filtering coefficients (namely, processing strengths in the processing mode).

The headset identifies the user operation and determines that the headset 200 selected by the user needs to implement ANC processing, HT processing, or AH processing. The processing mode used by the headset 200 is the ANC mode. In a possible manner, the user operation may be a user operation of tapping the headset. The processing mode is determined as the ANC mode, the HT mode, or the AH mode by using different operations. In another possible manner, a button is disposed on the headset. Different buttons indicate different processing modes. The user presses the button to select the processing mode of the headset. For example, after the headset 200 receives the operation instruction of the ANC mode triggered by the user, the left earphone and the right earphone perform ANC processing, and specifically perform S501 to S504. In still another possible manner, a processing mode that needs to be implemented by the headset is selected, and is controlled by the terminal device 100.

The left earphone or the right earphone may have an event detection function. In an example, one of the left earphone and the right earphone is used to perform event detection. For example, the left earphone performs event detection, and sends a detection result to the right earphone, or the right earphone performs event detection, and sends a detection result to the left earphone. In the ANC mode, different events correspond to different FF filtering coefficients and different FB filtering coefficients. After the left earphone or the right earphone performs event detection, the left earphone is used as an example. The left earphone may obtain, from the coefficient bank based on the detection result, an FF filtering coefficient or an FB filtering coefficient corresponding to the detected event in the ANC mode. For example, Table 2 describes content included in the coefficient bank, and the event includes a howling event, a wind noise event, an emergency event, a human voice event, or a non-emergency event.

It may be understood that, to implement the functions in the foregoing method embodiments, the headset includes a corresponding hardware structure and/or software module for performing each function. A person skilled in the art should be easily aware that, with reference with modules and method steps in the examples described in embodiments disclosed in this application, this application may be implemented by hardware or a combination of hardware and computer software. Whether a function is performed by hardware or hardware driven by computer software depends on particular application scenes and design constraints of the technical solutions.

Figure 19:
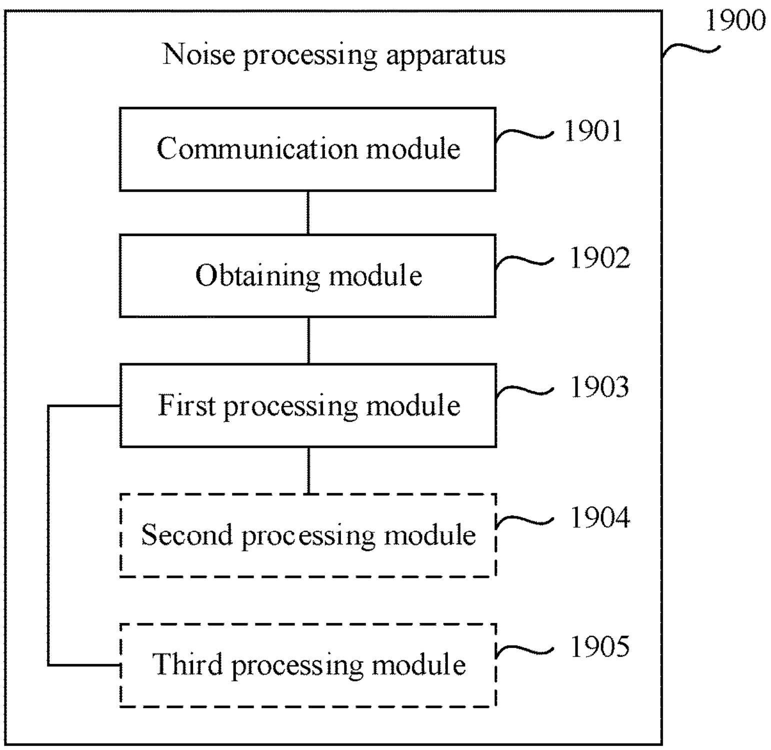
FIG. 19 is a schematic diagram of a structure of a noise processing apparatus 1900 according to an embodiment of this application.

Based on a same idea as the foregoing method, as shown in FIG. 19, an embodiment of this application further provides a noise processing apparatus 1900. The noise processing apparatus 1900 is applied to a headset. The headset has at least two functions of an ANC function, an HT function, or an AH function. The headset includes a first microphone and a second microphone. The first microphone is configured to collect a first signal. The first signal indicates a sound in a current external environment. The second microphone is configured to collect a second signal. The second signal indicates an ambient sound in an ear canal of a user wearing the headset. The noise processing apparatus 1900 may be configured to implement functions of the headset in the foregoing method embodiments, and therefore can implement beneficial effects of the foregoing method embodiments. The apparatus may include a communication module 1901, an obtaining module 1902, and a first processing module 1903.

The communication module 1901 is configured to receive a first audio signal from a terminal device.

The obtaining module 1902 is configured to obtain a target mode, where the target mode is determined based on a scene type of the current external environment, the target mode indicates the headset to perform a target processing function, and the target processing function is one of the active noise control ANC function, the ambient sound hear through HT function, or the augment hearing AH function.

The first processing module 1903 is configured to obtain a second audio signal based on the target mode, the first audio signal, the first signal, and the second signal.

In a possible implementation, the apparatus further includes a playing module, configured to play the second audio signal. The playing module is not shown in FIG. 19.

In a possible implementation, when the target processing function is the ANC function, the second audio signal played by the playing module can weaken user perception of the sound in the current user environment and the ambient sound in the ear canal of the user; when the target processing function is the HT function, the second audio signal played by the playing module can enhance user perception of the sound in the current user environment; or when the target processing function is the AH function, the second audio signal played by the playing module can enhance user perception of an event sound, where the event sound satisfies a preset spectrum.

In a possible implementation, when the target processing function is the ANC function, the second audio signal is obtained based on the first audio signal, a third signal, and a fourth signal, where the third signal is an antiphase signal of the first signal, and the fourth signal is an antiphase signal of the second signal; when the target processing function is the HT function, the second audio signal is obtained based on the first audio signal, the first signal, and the second signal; or when the target processing function is the AH function, the second audio signal is obtained based on the first audio signal, a fifth signal, and a fourth signal, where the fifth signal is an event signal in the first signal, and the event signal satisfies a preset spectrum.

In a possible implementation, the communication module 1901 is further configured to receive a first control instruction from the terminal device, where the first control instruction carries the target mode, and the target mode is determined by the terminal device based on the scene type of the current external environment; and send the target mode to the obtaining module 1902.

In a possible implementation, the communication module 1901 is further configured to receive a second control instruction from the terminal device, where the second control instruction carries a target processing strength, and the target processing strength indicates a processing strength used when the headset performs the target processing function.

The first processing module 1903 is further configured to obtain the second audio signal based on the target mode, the target processing strength, the first audio signal, the first signal, and the second signal.

In a possible implementation, the apparatus further includes a second processing module 1904 configured to determine, based on the first signal, a target event corresponding to an event sound in the current external environment, and determine a target processing strength in the target mode based on the target event, where the target processing strength indicates a processing strength used when the headset performs the target processing function.

The first processing module 1903 is further configured to obtain the second audio signal based on the target mode, the target processing strength, the first audio signal, the first signal, and the second signal.

In a possible implementation, the headset further includes a bone conduction sensor. The bone conduction sensor is configured to collect a bone conduction signal generated by vibration of vocal cords of the user.

The first processing module 1903 is further configured to determine, based on the first signal and the bone conduction signal, the target event corresponding to the event sound in the current external environment.

In a possible implementation, the target event includes a howling event, a wind noise event, an emergency event, or a human voice event.

In a possible implementation, the apparatus further includes a third processing module 1905 configured to identify the scene type of the current external environment as a target scene based on the first signal, and determine the target mode of the headset based on the target scene, where the target mode is a processing mode corresponding to the target scene.

In a possible implementation, the target scene includes one of a walking scene, a running scene, a quiet scene, a multi-person speaking scene, a cafe scene, a subway scene, a train scene, a waiting hall scene, a dialog scene, an office scene, an outdoor scene, a driving scene, a strong wind scene, an airplane scene, an alarm sound scene, a horn sound scene, and a crying sound scene.

In a possible implementation, the communication module 1901 is further configured to send indication information to the terminal device, where the indication information carries the target mode; and receive a third control signal from the terminal device, where the third control signal includes a target processing strength in the target mode, and the target processing strength indicates a processing strength used when the headset performs the target processing function.

The first processing module 1903 is further configured to obtain the second audio signal based on the target mode, the target processing strength, the first audio signal, the first signal, and the second signal.

In a possible implementation, when the target processing function is the ANC function, a larger target processing strength indicates weaker user perception of the sound in the current user environment and the ambient sound in the ear canal of the user; when the target processing function is the HT function, a larger target processing strength indicates stronger user perception of the sound in the current user environment; or when the target processing function is the AH function, a larger target processing strength indicates stronger user perception of the event sound included in the sound in the current user environment.

In a possible implementation, the headset is a left earphone, or the headset is a right earphone.

In a possible implementation, the target mode indicates the headset to perform the ANC function. The first processing module 1903 is further configured to perform first filtering processing on the first signal to obtain a first filtering signal; filter out the first audio signal included in the second signal to obtain a first filtered signal; perform audio mixing processing on the first filtering signal and the filtered signal to obtain a third audio signal; perform third filtering processing on the third audio signal to obtain a fourth audio signal; and perform audio mixing processing on the fourth audio signal and the first audio signal to obtain the second audio signal.

In a possible implementation, a filtering coefficient used for the first filtering processing is a filtering coefficient associated with the target processing strength for the first filtering processing in the case of the ANC function; or a filtering coefficient used for the third filtering processing is a filtering coefficient associated with the target processing strength for the third filtering processing in the case of the ANC function.

In a possible implementation, the target mode indicates the headset to perform the HT function. The first processing module 1903 is further configured to perform first signal processing on the first signal to obtain a first processed signal, where the first signal processing includes second filtering processing; perform audio mixing processing on the first processed signal and the first audio signal to obtain a fifth audio signal; filter out the fifth audio signal included in the second signal to obtain a second filtered signal; perform third filtering processing on the second filtered signal to obtain a third filtered signal; and perform audio mixing processing on the third filtered signal and the fifth audio signal to obtain the second audio signal.

In a possible implementation, a filtering coefficient used for the second filtering processing is a filtering coefficient associated with the target processing strength for the second filtering processing in the case of the HT function; or a filtering coefficient used for the third filtering processing is a filtering coefficient associated with the target processing strength for the third filtering processing in the case of the HT function.

In a possible implementation, the target mode indicates the headset to perform the AH function. The first processing module 1903 is further configured to perform second filtering processing on the first signal to obtain a second filtering signal, and perform enhancement processing on the second filtering signal to obtain a filtering enhancement signal; perform first filtering processing on the first signal to obtain a first filtering signal; perform audio mixing processing on the filtering enhancement signal and the first audio signal to obtain a sixth audio signal; filter out the sixth audio signal included in the second signal to obtain a fourth filtered signal; perform third filtering processing on the fourth filtered signal to obtain a fifth filtered signal; and perform audio mixing processing on the fifth filtered signal, the sixth audio signal, and the first filtering signal to obtain the second audio signal.

In a possible implementation, a filtering coefficient used for the first filtering processing is a filtering coefficient associated with the target processing strength for the first filtering processing in the case of the AH function; a filtering coefficient used for the second filtering processing is a filtering coefficient associated with the target processing strength for the second filtering processing in the case of the AH function; or a filtering coefficient used for the third filtering processing is a filtering coefficient associated with the target processing strength for the third filtering processing in the case of the AH function.

It may be understood that, to implement the functions in the foregoing method embodiments, the terminal device includes a corresponding hardware structure and/or software module for performing each function. A person skilled in the art should be easily aware that, with reference with modules and method steps in the examples described in embodiments disclosed in this application, this application may be implemented by hardware or a combination of hardware and computer software. Whether a function is performed by hardware or hardware driven by computer software depends on particular application scenes and design constraints of the technical solutions.

Figure 20:
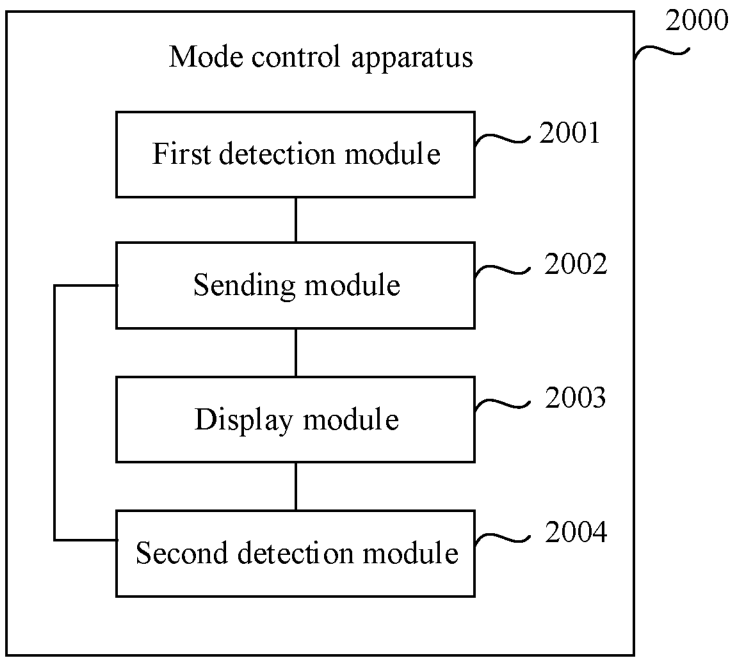
FIG. 20 is a schematic diagram of a structure of a mode control apparatus 2000 according to an embodiment of this application.

Based on a same idea as the foregoing method, as shown in FIG. 20, an embodiment of this application further provides a mode control apparatus 2000. The mode control apparatus 2000 is applied to the terminal device 100, and may be configured to implement a function of the terminal device in the foregoing method embodiments. Therefore, beneficial effects of the foregoing method embodiments can be implemented.

The mode control apparatus 2000 includes a first detection module 2001 and a sending module 2002, and may further include a display module 2003 and a second detection module 2004.

The first detection module 2001 is configured to: when identifying a scene type of a current external environment as a target scene, determine a target mode based on the target scene.

The target mode is one of processing modes supported by a headset. Different processing modes correspond to different scene types. The processing modes supported by the headset include at least two of an active noise control ANC mode, an ambient sound hear through HT mode, or an augment hearing AH mode.

The sending module 2002 is configured to send the target mode to the headset. The target mode indicates the headset to implement a processing function corresponding to the target mode.

In a possible implementation, the apparatus further includes: the display module 2003, configured to: when the target mode is determined based on the target scene, display result prompt information, where the result prompt information is used to prompt a user that the headset implements the processing function corresponding to the target mode.

In a possible implementation, the display module 2003 is configured to: before a first control signal is sent to the headset, display selection prompt information, where the selection prompt information is used to prompt the user whether to adjust the processing mode of the headset to the target mode.

The second detection module 2004 is configured to detect a user operation of selecting the processing mode of the headset as the target mode.

In a possible implementation, the display module 2003 is further configured to display a first control and a second control. Different positions of the second control on the first control indicate different processing strengths in the target mode.

The second detection module 2004 is further configured to: before the sending module 2002 sends the first control signal to the headset, detect a user operation of touching and holding the second control to move to a first position on the first control. The first position of the second control on the first control indicates a target processing strength in the target mode.

The sending module 2002 is further configured to send the target processing strength to the headset. The target processing strength indicates a processing strength used when the headset implements the processing function corresponding to the target mode.

In a possible implementation, the first control is in a ring shape. When the user touches and holds the second control to move on the first control in a clockwise direction, the processing strength in the target mode increases; or when the user touches and holds the second control to move on the first control in an anticlockwise direction, the processing strength in the target mode increases.

In a possible implementation, the first control is in a bar shape. When the user touches and holds the second control to move from top to bottom on the first control, the processing strength in the target mode increases; when the user touches and holds the second control to move from bottom to top on the first control, the processing strength in the target mode increases; when the user touches and holds the second control to move from left to right on the first control, the processing strength in the target mode increases; or when the user touches and holds the second control to move from right to left on the first control, the processing strength in the target mode increases.

In a possible implementation, when the target processing function is the ANC function, a larger target processing strength indicates weaker user perception of the sound in the current user environment and the ambient sound in the ear canal of the user; when the target processing function is the HT function, a larger target processing strength indicates stronger user perception of the sound in the current user environment; or when the target processing function is the AH function, a larger target processing strength indicates stronger user perception of the event sound included in the sound in the current user environment.

Figure 21:
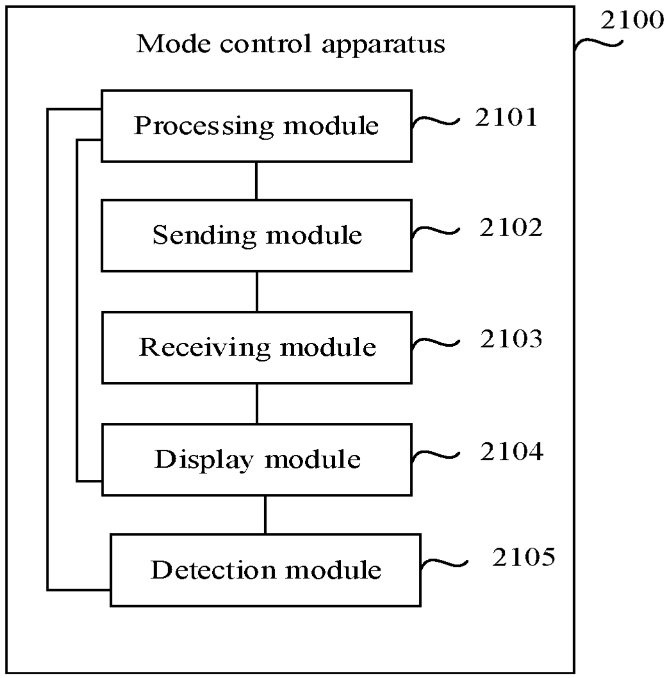
FIG. 21 is a schematic diagram of a structure of a mode control apparatus 2100 according to an embodiment of this application.

Based on a same idea as the foregoing method, as shown in FIG. 21, an embodiment of this application further provides a mode control apparatus 2100. The mode control apparatus 2100 is applied to the terminal device 100, and may be configured to implement a function of the terminal device in the foregoing method embodiments. Therefore, beneficial effects of the foregoing method embodiments can be implemented. The mode control apparatus 2100 includes a processing module 2101, a sending module 2102, a receiving module 2103, a display module 2104, and a detection module 2105.

The processing module 2101 is configured to obtain a target mode. The target mode is one of processing modes supported by a headset. The processing modes supported by the headset include at least two of an active noise control ANC mode, an ambient sound hear through HT mode, or an augment hearing AH mode.

The processing module 2101 is further configured to determine a target processing strength in the target mode based on a scene type of a current external environment. Different scene types correspond to different processing strengths in the target mode.

The sending module 2102 is configured to send the target processing strength to the headset. The target processing strength indicates a processing strength used when the headset implements a processing function corresponding to the target mode.

In a possible implementation, the apparatus further includes the receiving module 2103, configured to receive the target mode sent by the headset.

In a possible implementation, the apparatus further includes the display module 2104, configured to display a selection control, where the selection control includes the processing modes supported by the headset; and detect a user operation of selecting the target mode from the processing modes of the headset by using the selection control.

In a possible implementation, the display module 2104 is further configured to: before the processing module 2101 determines the target processing strength in the target mode based on the scene type of the current external environment, if the receiving module 2103 receives the target mode sent by the headset, display selection prompt information, where the selection prompt information is used to prompt the user whether to adjust the processing mode of the headset to the target mode.

The apparatus further includes the detection module 2105 configured to detect a user operation of selecting and adjusting the processing mode of the headset as the target mode.

In a possible implementation, when the target processing function is the ANC function, a larger target processing strength indicates weaker user perception of the sound in the current user environment and the ambient sound in the ear canal of the user; when the target processing function is the HT function, a larger target processing strength indicates stronger user perception of the sound in the current user environment; or when the target processing function is the AH function, a larger target processing strength indicates stronger user perception of the event sound included in the sound in the current user environment.

Figure 22:
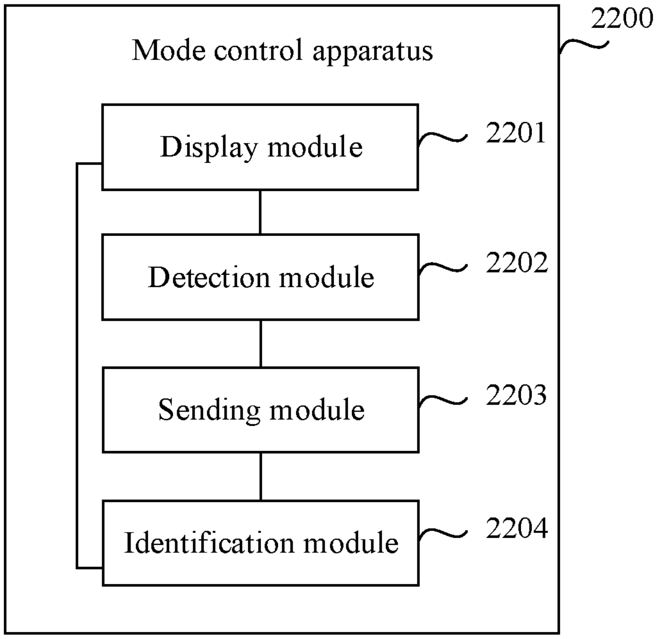
FIG. 22 is a schematic diagram of a structure of a mode control apparatus 2200 according to an embodiment of this application.

Based on a same idea as the foregoing method, as shown in FIG. 22, an embodiment of this application further provides a mode control apparatus 2200. The mode control apparatus 2200 is applied to the terminal device 100, and may be configured to implement a function of the terminal device in the foregoing method embodiments. Therefore, beneficial effects of the foregoing method embodiments can be implemented. The mode control apparatus 2100 includes a display module 2201, a detection module 2202, a sending module 2203, and an identification module 2204.

The display module 2201 is configured to display a first interface. The first interface includes a first selection control. The first selection control includes processing modes supported by a first target earphone and processing strengths corresponding to the processing modes supported by the first target earphone. The processing modes of the first target earphone include at least two of an ANC mode, an ambient sound HT mode, or an augment hearing AH mode.

The detection module 2202 is configured to detect a first operation performed by a user on the first interface. The first operation is generated when the user selects, by using the first selection control, a first target mode from the processing modes supported by the first target earphone and selects a processing strength in the first target mode as a first target processing strength.

The sending module 2203 is configured to send the first target mode and the first target processing strength to the first target earphone. The first target mode indicates the first target earphone to implement a processing function corresponding to the first target mode. The first target processing strength indicates a processing strength used when the first target earphone implements the processing function corresponding to the first target mode.

In a possible implementation, the display module 2201 is further configured to: before the first interface is displayed, display selection prompt information. The selection prompt information is used for the user to choose whether to adjust the processing mode of the first target earphone.

The detection module 2202 is further configured to detect a user operation of selecting and adjusting the processing mode of the first target earphone.

In a possible implementation, the apparatus further includes the identification module 2204 configured to: before the display module 2201 displays the first interface, identify a scene type of a current external environment as a target scene, where the target scene adapts to a scene type in which the processing mode of the first target earphone needs to be adjusted.

In a possible implementation, the apparatus further includes the identification module 2204 configured to: before the display module 2201 displays the first interface, identify that the terminal device triggers the first target earphone to play audio.

In a possible implementation, the detection module 2202 is further configured to: before the display module displays the first interface, detect that the terminal device establishes a connection to the first target earphone.

In a possible implementation, before the display module 2201 displays the first interface, if it is detected that the terminal device establishes a connection to the first target earphone, the detection module 2202 detects a second operation performed by the user on a home screen.

The home screen includes an icon of a first application. The second operation is generated when the user touches the icon of the first application. The first interface is a display interface of the first application.

In a possible implementation, the first selection control includes a first control and a second control. Any two different positions of the second control on the first control indicate two different processing modes of the first target earphone, or any two different positions of the second control on the first control indicate different processing strengths in a same processing mode of the first target earphone.

The first operation is generated when the user moves a first position of the second control on the first control in a region corresponding to the first target mode. The first position corresponds to the first target processing strength in the first target mode.

In a possible implementation, the first control is in a ring shape. The ring includes at least two arc segments. The second control located in different arc segments indicates different processing modes of the first target earphone. Different positions of the second control on a same arc segment indicate different processing strengths in a same processing mode of the first target earphone.

Alternatively, the first control is in a bar shape. The bar includes at least two bar segments. The second control located in different bar segments indicates different processing modes of the first target earphone. Different positions of the second control on a same bar segment indicate different processing strengths in a same processing mode of the first target earphone.

In a possible implementation, the detection module 2202 is further configured to detect a third operation performed by the user on the first interface. The first interface further includes a second selection control. The second selection control includes processing modes supported by a second target earphone and processing strengths corresponding to the processing modes supported by the second target earphone. The processing modes supported by the second target earphone include at least two of an active noise control ANC mode, an ambient sound hear through HT mode, or an augment hearing AH mode. The third operation is generated when the user selects, by using the second selection control, a second target mode from the processing modes of the second target earphone and selects a processing strength in the second target mode as a second target processing strength. When the first target earphone is a left earphone, the second target earphone is a right earphone, or when the first target earphone is a right earphone, the second target earphone is a left earphone.

The sending module 2203 is further configured to send the second target mode and the second target processing strength to the second target earphone. The second target mode indicates the second target earphone to implement a processing function corresponding to the second target mode. The second target processing strength indicates a processing strength used when the second target earphone implements the processing function corresponding to the second target mode.

Figure 23:
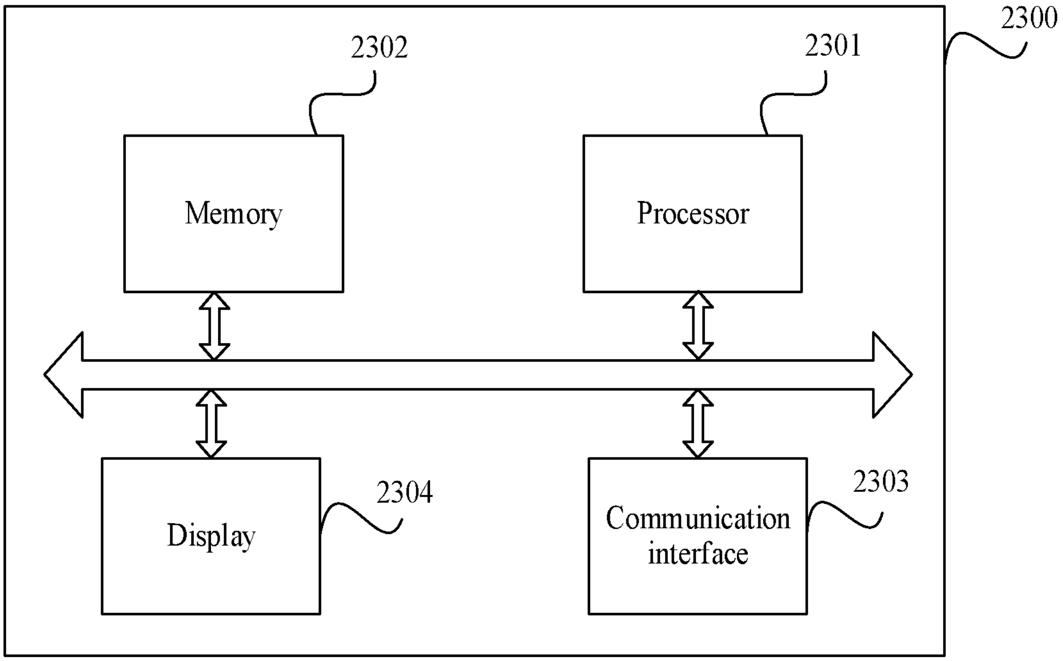
FIG. 23 is a schematic diagram of a structure of a terminal device 2300 according to an embodiment of this application.

In view of this, an embodiment of this application further provides a terminal device. As shown in FIG. 23, the terminal device includes a processor 2301, a memory 2302, a communication interface 2303, and a display 2304. The memory 2302 is configured to store instructions or a program executed by the processor 2301, store input data required by the processor 2301 to run instructions or a program, or store data generated after the processor 2301 runs instructions or a program. The processor 2301 is configured to run the instructions or the program stored in the memory 2302 to perform a function performed by the terminal device in the foregoing method.

In a possible scene, the processor 2301 is configured to perform functions of the first detection module 2001, the sending module 2002, the display module 2003, and the second detection module 2004. Alternatively, the processor 2301 is configured to perform functions of the first detection module 2001 and the second detection module 2004. A function of the sending module 2002 is implemented by the communication interface 2303. A function of the display module 2003 may be implemented by the display 2304.

In another possible scene, the processing module 2101, the sending module 2102, the receiving module 2103, the display module 2104, and the detection module 2105 may be implemented by the processor 2301. Alternatively, the processor 2301 may be configured to perform functions of the processing module 2101 and the detection module 2105. Functions of the sending module 2102 and the receiving module 2103 may be implemented by the communication interface 2303. A function of the display module 2104 may be implemented by the display 2304.

In still another possible scene, the display module 2201, the detection module 2202, the sending module 2203, and the identification module 2204 may be implemented by the processor 2301. Alternatively, functions of both the detection module 2202 and the identification module 2204 may be implemented by the processor 2301. A function of the sending module 2203 may be implemented by the communication interface 2303. A function of the display module 2201 may be implemented by the display 2304.

It should be understood that the processor mentioned in embodiments of this application may be a CPU, or the processor may be another general-purpose processor, a DSP, an application-specific integrated circuit (ASIC), a field-programmable gate array (FPGA) or another programmable logic device, a transistor logic device, a hardware component, or any combination thereof. The general purpose processor may be a microprocessor or any regular processor or the like.

The method steps in embodiments of this application may be implemented in a hardware manner, or may be implemented in a manner of executing software instructions by the processor. The software instructions may include a corresponding software module. The software module may be stored in a RAM, a flash memory, a ROM, or PROM, an EPROM, an EEPROM, a register, a hard disk, a removable hard disk, a CD-ROM, or a storage medium of any other form well-known in the art. For example, a storage medium is coupled to a processor, so that the processor can read information from the storage medium or write information into the storage medium. Certainly, the storage medium may be a component of the processor. The processor and the storage medium may be disposed in an ASIC. In addition, the ASIC may be located in a terminal device. Certainly, the processor and the storage medium may exist in the terminal device as discrete components.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer programs or instructions. When the computer programs or the instructions are loaded and executed on a computer, the procedures or the functions according to embodiments of this application are all or partially implemented. The computer may be a general-purpose computer, a dedicated computer, a computer network, user equipment, or another programmable apparatus. The computer programs or instructions may be stored in a computer-readable storage medium, or may be transmitted from one computer-readable storage medium to another computer-readable storage medium. For example, the computer programs or instructions may be transmitted from one website, computer, server, or data center to another website, computer, server, or data center in a wired manner or in a wireless manner. The computer-readable storage medium may be any usable medium accessible by a computer, or a data storage device, such as a server or a data center, integrating one or more usable media. The usable medium may be a magnetic medium, for example, a floppy disk, a hard disk, or a magnetic tape, may be an optical medium, for example, a digital video disc (digital video disc, DVD), may be a semiconductor medium, for example, a solid-state drive (solid state drive, SSD), or the like.

In embodiments of this application, unless otherwise stated or there is a logic conflict, terms and/or descriptions between different embodiments are consistent and may be mutually referenced, and technical features in different embodiments may be combined based on an internal logical relationship thereof, to form a new embodiment. In addition, the terms "include", "have", and any variant thereof are intended to cover non-exclusive inclusion, for example, include a series of steps or units. Methods, systems, products, or devices are not necessarily limited to those steps or units that are literally listed, but may include other steps or units that are not literally listed or that are inherent to such processes, methods, products, or devices.

Although this application is described with reference to specific features and embodiments thereof, it is clear that various modifications and combinations may be made to them without departing from the spirit and scope of this application. Correspondingly, the specification and accompanying drawings are merely examples for description of the solutions defined by the appended claims, and are considered as any of or all modifications, variations, combinations or equivalents that cover the scope of this application.

It is clearly that, a person skilled in the art can make various modifications and variations to this application without departing from the scope of this application. This application is intended to cover these modifications and variations provided that they fall within the scope of protection defined by the following claims and their equivalent technologies.

What is claimed is:

1. A method comprising:

receiving, from a terminal device, a first audio signal;

receiving, from the terminal device, a first control instruction carrying a target mode that is based on a scene type of a current external environment, wherein the target mode indicates a headset to perform a target processing function, and wherein the target processing function is one of an active noise control (ANC) function, an ambient sound hear through (HT) function, or an augment hearing (AH) function;

sending, to the terminal device, indication information carrying the target mode;

receiving, from the terminal device in response to the indication information, a second control instruction carrying a target processing strength in the target mode, wherein the target processing strength indicates a processing strength when the headset performs the target processing function;

collecting, by a first microphone of the headset, a first microphone signal indicating a sound in the current external environment;

collecting by a second microphone of the headset, a second microphone signal indicating an ambient sound in an ear canal of a user wearing the headset; and obtaining a second audio signal based on the target mode, the target processing strength, the first audio signal, the first microphone signal, and the second microphone signal.

2. The method of claim 1, wherein the first control instruction further carries an ANC identifier, an HT identifier, or an AH identifier.

3. The method of claim 2, wherein a target event corresponding to an event sound in the current external environment is based on the first microphone signal, wherein the target processing strength in the target mode is based on the target event, wherein different processing strengths correspond to different events, and wherein the second audio signal is based on the target processing strength.

4. The method of claim 3, further comprising: collecting, by a bone conduction sensor of the headset, a bone conduction signal that is based on vibration of vocal cords of the user, wherein the target event is based on the bone conduction signal.

5. The method of claim 4, wherein the target event comprises one of a howling event, a wind noise event, an emergency event, or a human voice event.

6. The method of claim 1, wherein the headset comprises a left earphone or a right earphone.

7. The method of claim 1, wherein obtaining the target mode comprises identifying the scene type as a target scene based on the first microphone signal, wherein the target mode is based on the target scene, wherein the target mode is a processing mode corresponding to the target scene, and wherein different processing modes correspond to different scene types.

8. The method of claim 7, wherein the target scene comprises one of a walking scene, a running scene, a quiet scene, a multi-person speaking scene, a cafe scene, a subway scene, a train scene, a waiting hall scene, a dialog scene, an office scene, an outdoor scene, a driving scene, a strong wind scene, an airplane scene, an alarm sound scene, a horn sound scene, or a crying sound scene.

9. The method of claim 7, further comprising:

sending, to the terminal device, indication information carrying the target mode;

receiving, from the terminal device, a third control instruction comprising the target processing strength in the target mode; and further obtaining the second audio signal based on the target processing strength.

10. The method of claim 1, wherein when the target mode indicates the headset to perform the AH function, the method comprises:

performing first filtering processing on the first microphone signal to obtain a first filtering signal;

performing second filtering processing on the first microphone signal to obtain a second filtering signal;

performing enhancement processing on the second filtering signal to obtain a filtering enhancement signal;

performing first audio mixing processing on the filtering enhancement signal and the first audio signal to obtain a third audio signal;

filtering out the third audio signal comprised in the second microphone signal to obtain a first filtered signal;

performing third filtering processing on the first filtered signal to obtain a second filtered signal; and performing second audio mixing processing on the second filtered signal, the third audio signal, and the first filtering signal to obtain the second audio signal.

11. The method of claim 10, wherein a first filtering coefficient for the first filtering processing is associated with the target processing strength for the first filtering processing in a case of the AH function, a second filtering coefficient for the second filtering processing is associated with the target processing strength for the second filtering processing in the case of the AH function, or a third filtering coefficient for the third filtering processing is associated with the target processing strength for the third filtering processing in the case of the AH function.

12. A target headset, comprising:

a first microphone configured to collect a first microphone signal indicating a sound in a current external environment;

a second microphone configured to collect a second microphone signal indicating an ambient sound in an ear canal of a user wearing the target headset;

a processor coupled to the first microphone and the second microphone and configured to:

receive, from a terminal device, a first audio signal;

receive, from the terminal device, a first control instruction carrying a target mode based on a scene type of the current external environment, wherein the target mode indicates the target headset to perform a target processing function, and wherein the target processing function is one of an active noise control (ANC) function, an ambient sound hear through (HT) function, or an augment hearing (AH) function;

send, to the terminal device, indication information carrying the target mode;

receive, from the terminal device in response to the indication information, a second control instruction carrying a target processing strength in the target mode, wherein the target processing strength indicates a processing strength when the target headset performs the target processing function; and obtain a second audio signal based on the target mode, the target processing strength, the first audio signal, the first microphone signal, and the second microphone signal; and a speaker coupled to the processor and configured to play the second audio signal.

13. The target headset of claim 12, wherein the first control instruction further carries an ANC identifier, an HT identifier, or an AH identifier.

14. The target headset of claim 13, wherein the target headset comprises a left earphone or a right earphone.

15. The target headset of claim 13, wherein a target event corresponding to an event sound in the current external environment is based on the first microphone signal, wherein a target processing strength in the target mode is based on the target event, wherein different processing strengths correspond to different events, and wherein the processor is further configured to obtain the second audio signal based on the target mode, the target processing strength, the first audio signal, the first microphone signal, and the second microphone signal.

16. The target headset of claim 13, wherein a target event corresponding to an event sound in the current external environment is based on the first microphone signal, wherein a target processing strength in the target mode is based on the target event, wherein different processing strengths correspond to different events, and wherein the processor is further configured to obtain the second audio signal based on the target processing strength.

17. The target headset of claim 16, wherein the target headset further comprises a bone conduction sensor configured to collect a bone conduction signal generated by vibration of vocal cords of the user, and wherein the target event corresponding to the event sound in the current external environment is based on the first microphone signal and the bone conduction signal.

18. The target headset of claim 12, wherein the processor is further configured to identify the scene type of the current external environment as a target scene based on the first microphone signal, wherein the target mode of the target headset is based on the target scene, wherein the target mode is a processing mode corresponding to the target scene, and wherein different processing modes correspond to different scene types.

19. The target headset of claim 18, wherein the target scene comprises one of a walking scene, a running scene, a quiet scene, a multi-person speaking scene, a cafe scene, a subway scene, a train scene, a waiting hall scene, a dialog scene, an office scene, an outdoor scene, a driving scene, a strong wind scene, an airplane scene, an alarm sound scene, a horn sound scene, or a crying sound scene.

20. The target headset of claim 18, wherein the processor is further configured to:

send, to the terminal device, indication information carrying the target mode;

receive, from the terminal device, a third control signal comprising the target processing strength in the target mode; and obtain the second audio signal based on the target mode, the target processing strength, the first audio signal, the first microphone signal, and the second microphone signal.

* * * * *